(12) United States Patent
Bloom

(10) Patent No.: US 9,050,550 B2
(45) Date of Patent: Jun. 9, 2015

(54) AERODYNAMIC SEPARATION NOZZLE

(71) Applicant: Tenoroc LLC, Pointe Vedra, FL (US)

(72) Inventor: Michael R. Bloom, Kasota, MN (US)

( * ) Notice: Subject to any disclaimer, the term of this patent is extended or adjusted under 35 U.S.C. 154(b) by 303 days.

(21) Appl. No.: 13/654,652

(22) Filed: Oct. 18, 2012

(65) Prior Publication Data

US 2013/0139545 A1   Jun. 6, 2013

Related U.S. Application Data

(63) Continuation of application No. 13/172,399, filed on Jun. 29, 2011, now Pat. No. 8,313,547, which is a continuation of application No. 12/249,779, filed on Oct. 10, 2008, now Pat. No. 8,016,901.

(60) Provisional application No. 61/080,672, filed on Jul. 14, 2008.

(51) Int. Cl.

| | |
|---|---|
| *B01D 45/12* | (2006.01) |
| *B01D 50/00* | (2006.01) |
| *B01D 45/04* | (2006.01) |
| *B01D 51/10* | (2006.01) |
| *B01D 53/00* | (2006.01) |
| *B01D 53/24* | (2006.01) |

(52) U.S. Cl.
CPC ............... *B01D 45/04* (2013.01); *B01D 50/00* (2013.01); *B01D 51/10* (2013.01); *B01D 45/12* (2013.01); *B01D 53/002* (2013.01); *B01D 53/24* (2013.01)

(58) Field of Classification Search
CPC ........ B01D 45/00; B01D 45/12; B01D 50/00; B01D 51/00; B01D 51/10

USPC ........................................... 55/392, 394, 461
See application file for complete search history.

(56) References Cited

U.S. PATENT DOCUMENTS

| | | | |
|---|---|---|---|
| 2,900,797 | A | 8/1959 | Kurata et al. |
| 2,951,554 | A | 9/1960 | Becker |
| 3,362,131 | A | 1/1968 | Becker et al. |
| 3,509,932 | A | 5/1970 | Chambers |
| 3,559,373 | A | 2/1971 | Garrett |
| 3,708,964 | A | 1/1973 | Becker et al. |
| 3,853,528 | A | 12/1974 | Wodrich et al. |
| 3,877,892 | A | 4/1975 | Bley et al. |

(Continued)

OTHER PUBLICATIONS

International Search Report and Written Opinion for PCT/US08/079640, Feb. 12, 2009.

(Continued)

*Primary Examiner* — Robert A Hopkins
(74) *Attorney, Agent, or Firm* — Thompson Hine LLP

(57) ABSTRACT

Multiple designs and methods for aerodynamic separation nozzles and systems for integrating multiple aerodynamic separation nozzles into a single system are disclosed herein. These aerodynamic separation nozzles utilize a combination of aerodynamic forces and separation nozzle structure to induce large centrifugal forces on the gases that in combination with the structure of the nozzle are used to separate heavier constituents of the process gas from lighter constituents. In some embodiments a number of separation nozzles are combined into a single system suitable for dynamic processing of a process gas. In other embodiments the separation nozzles are temperature controlled to condition the incoming gas to a temperature in order to encourage a phase change in certain constituents of the gas to occur within the nozzle to further enhance separation.

20 Claims, 28 Drawing Sheets

(56) References Cited

U.S. PATENT DOCUMENTS

| | | |
|---|---|---|
| 3,989,483 A | 11/1976 | Becker et al. |
| 4,235,606 A | 11/1980 | Becker et al. |
| 4,541,845 A | 9/1985 | Michel-Kim |
| 4,551,157 A | 11/1985 | Becker et al. |

OTHER PUBLICATIONS

Heppe, R.R., Thesis: "Investigation of a Variable Geometry Supersonic Diffuser", California Institute of Technology, May 1947.

Falkovich, V., "A Class of de Laval Nozzles", NACA, Technical Memo 1236, Oct. 1949.

Hansen, C.F., et al., "Condensation of Air in Supersonic Wind Tunnels and its Effects on Flow About Models", NACA, Technical Note 2690, Apr. 1952.

Duff, K., Thesis., "Non-Equilibrium Condensation of Carbon Dioxide in Supersonic Nozzles", MIT, Jan. 1966.

Touryan, K. J., et al., "Gas Dynamic Problems in Isotope Separation", Report on a Workshop Held in Albuquerque New Mexico, Dec. 4-5, 1974.

Guy, T.B., "Correlation of the Probe-Induced Molecular Separation Effect in Supersonic Gas Mixtures", J. Phys. D; Appl. Phys., vol. 8, pp. 2208-2223, 1975.

Wyslouzil, B.E., et al., "Effect of Carrier Gas Pressure on Condensation in a Supersonic Nozzle", Phys. Fluids 6 (8), Aug. 1994.

Atkinson, D.B., et al., "Design and Characterization of Pulsed Uniform Supersonic Expansions for Chemical Applications", Rev. Sci. Instrum. 66 (9), pp. 4434-4446, Sep. 1995.

Li, W. et al.' "The Effect of Cluster Formation on Mass Separation in Binary Molecular Beams", Journal of Chem. Phys., vol. 112, No. 7, Feb. 2000.

Tafreshi, H.V., et al., "A Simple Nozzle Configuration for the Production of Low Divergence Supersonic Cluster Beam by Aerodynamic Focusing", Aerosol Science and Technology 36: 593-606, 2002.

Menon, S., "Hydrocarbon Droplet Condensation in a Convergent-Divergent Nozzle", Final Report Submitted to General Electric Power System Under GE Purchase Order 180016747, Apr. 2002.

Jugroot, M., et al., "Numerical Investigation of Interface Region Flows in Mass Spectrometers: Neutral Gas Transport", J. Phys. D: Appl. Phys. 37, pp. 1289-1300, 2004.

Day, J.C., Thesis: "Numerical Simulation of a Microfabricated Gas Preconcentrator for Environmental Monitoring", University of Maryland, 2005.

Ono, L.K., Thesis: "Study of Secondary Ion Emission from Si Target Bombarded by Large Cluster Ion", Kyoto University, Feb. 16, 2004.

Pinkel, I.I., Equations for the Design of Two-Dimensional Supersonic Nozzles, NACA, Report No. 907, Jun. 1948.

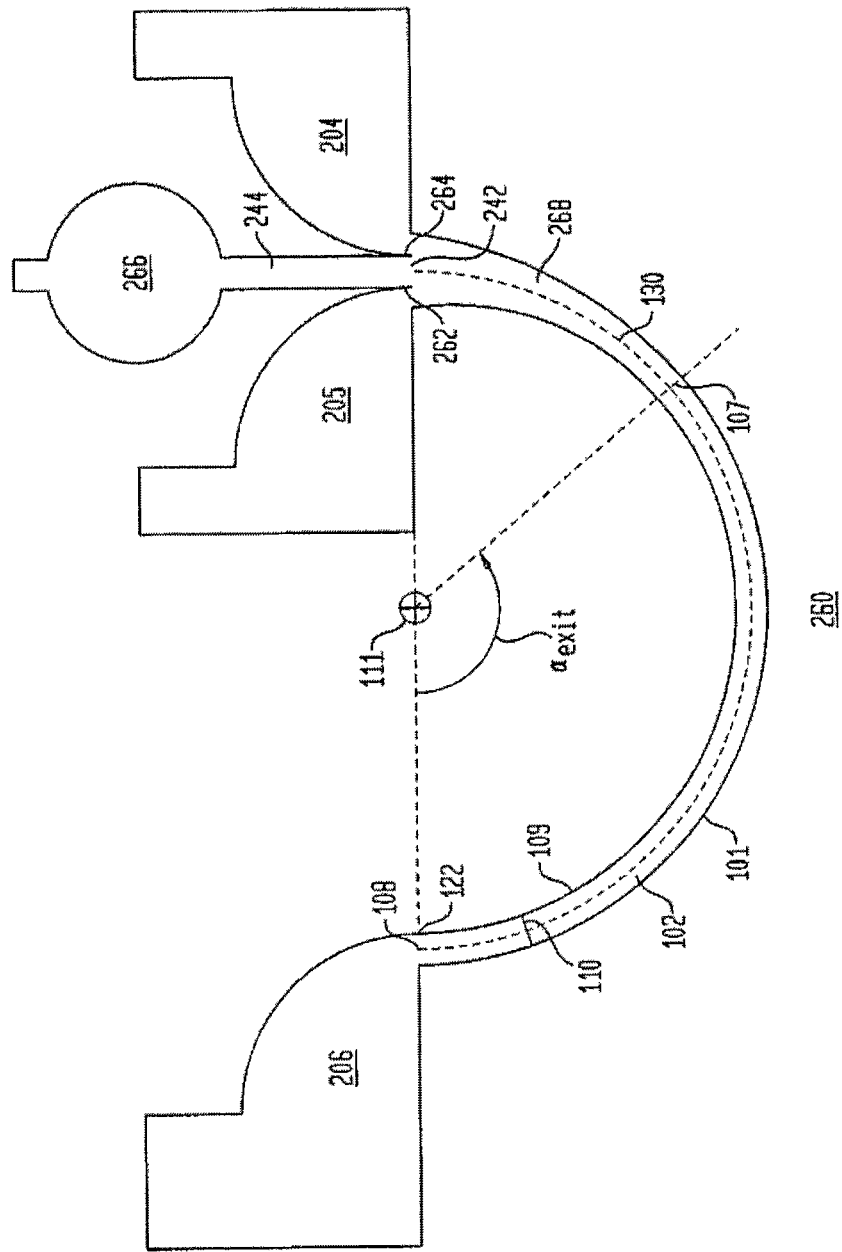

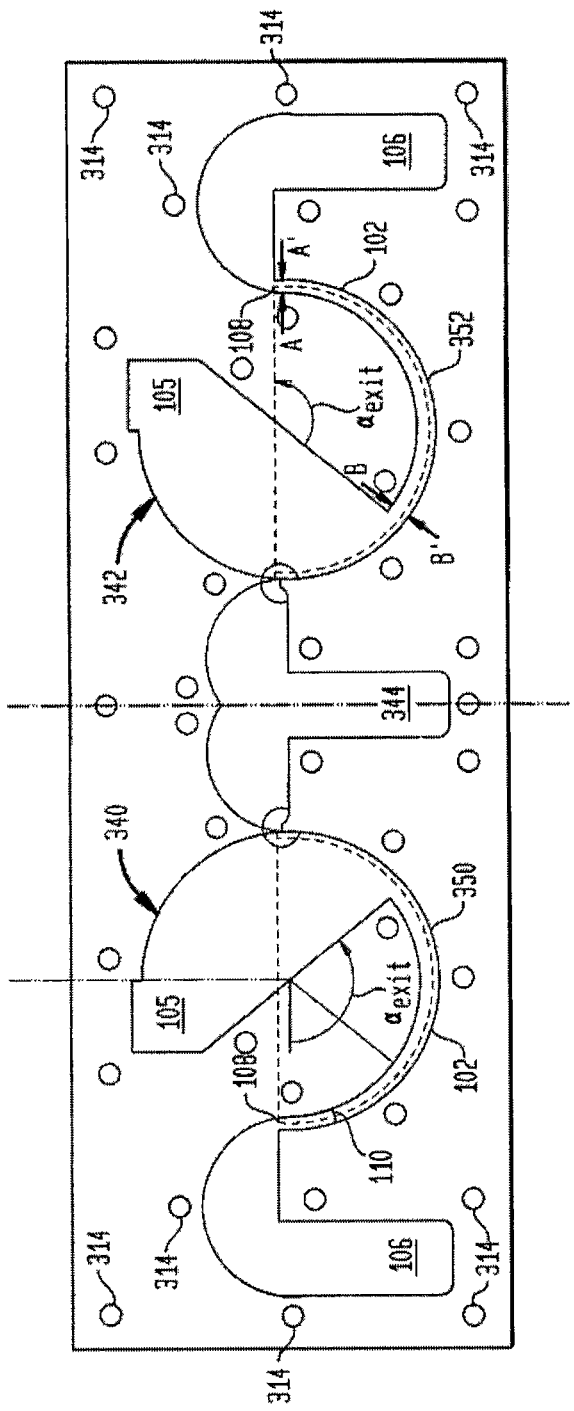

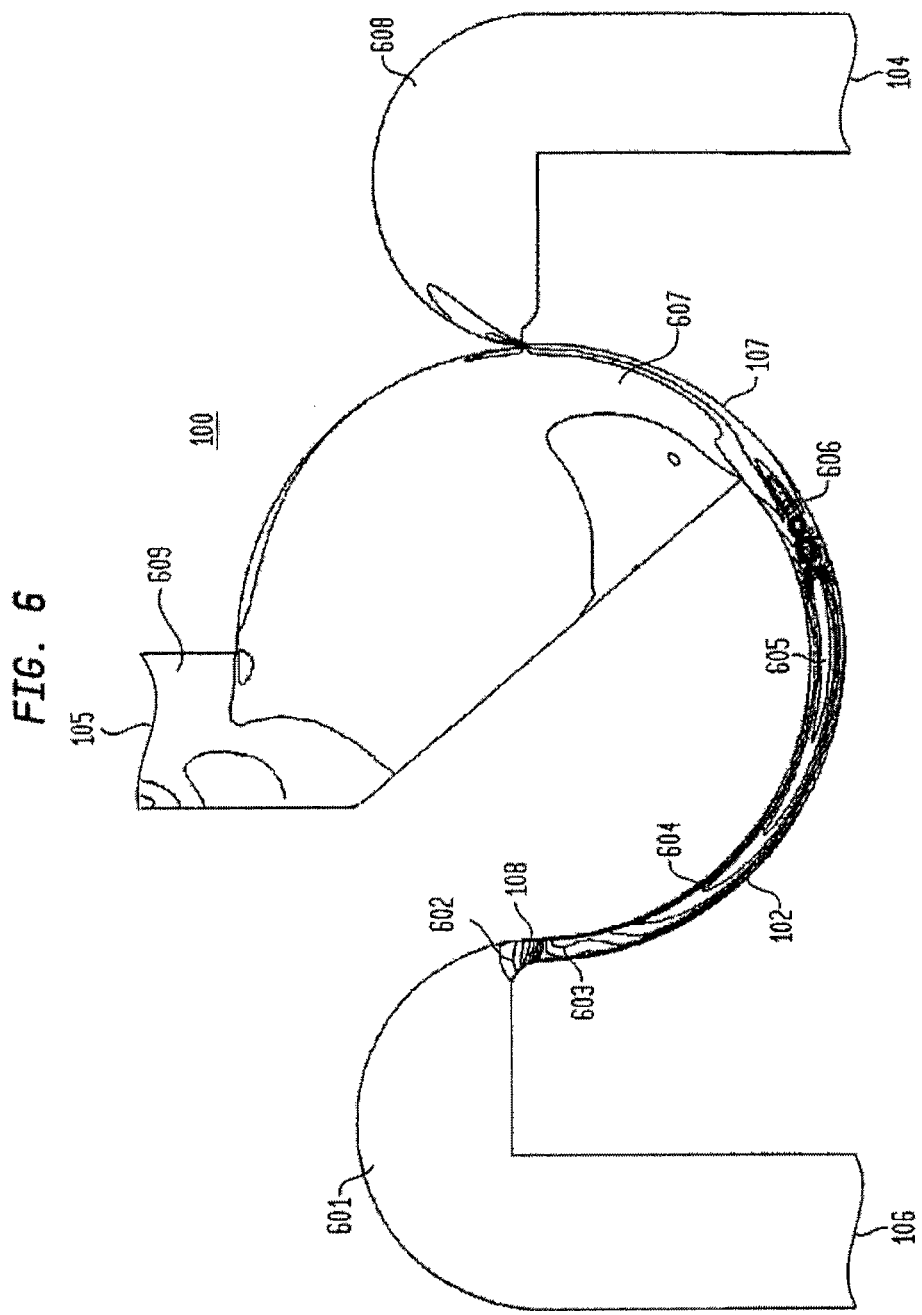

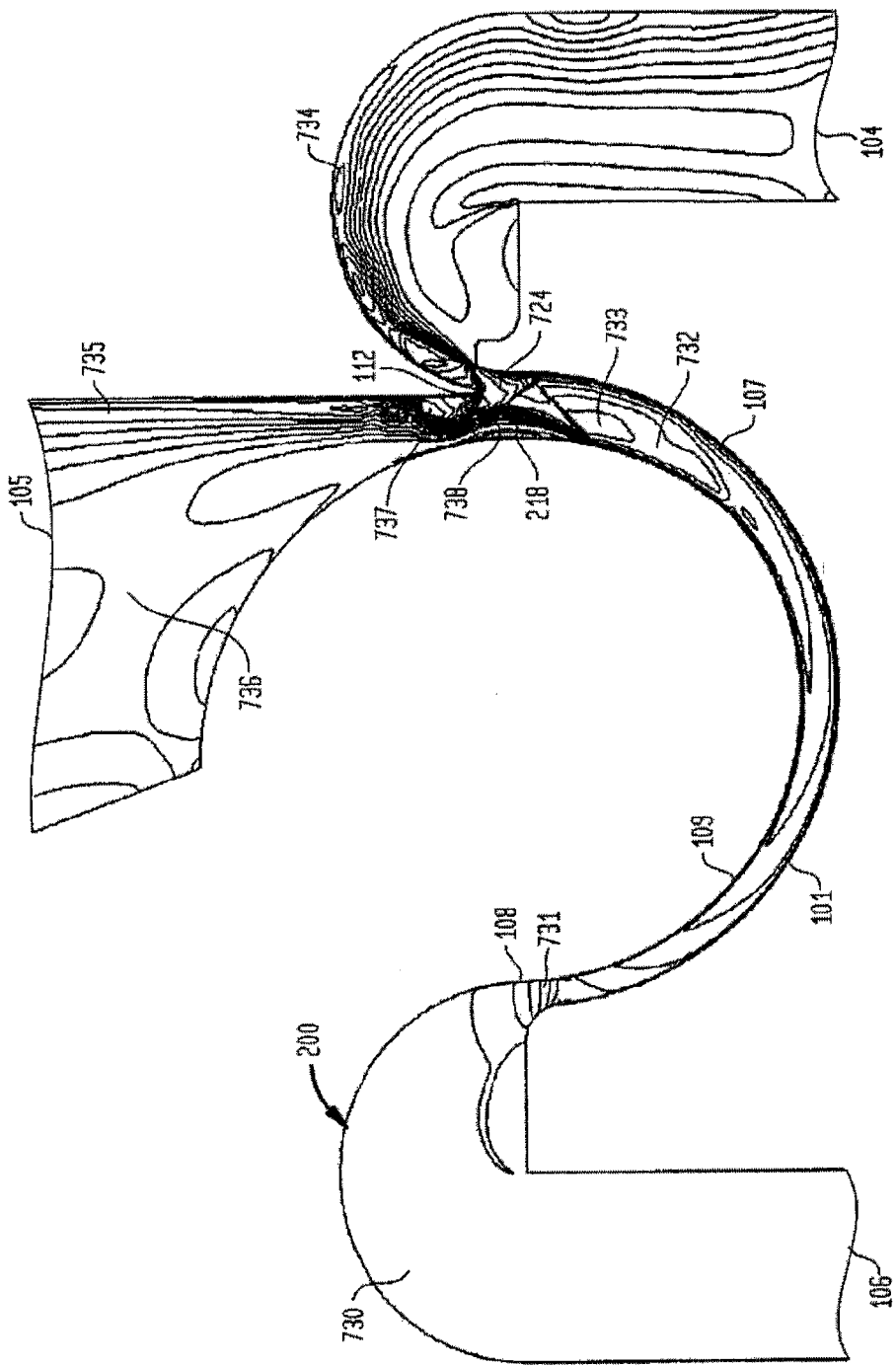

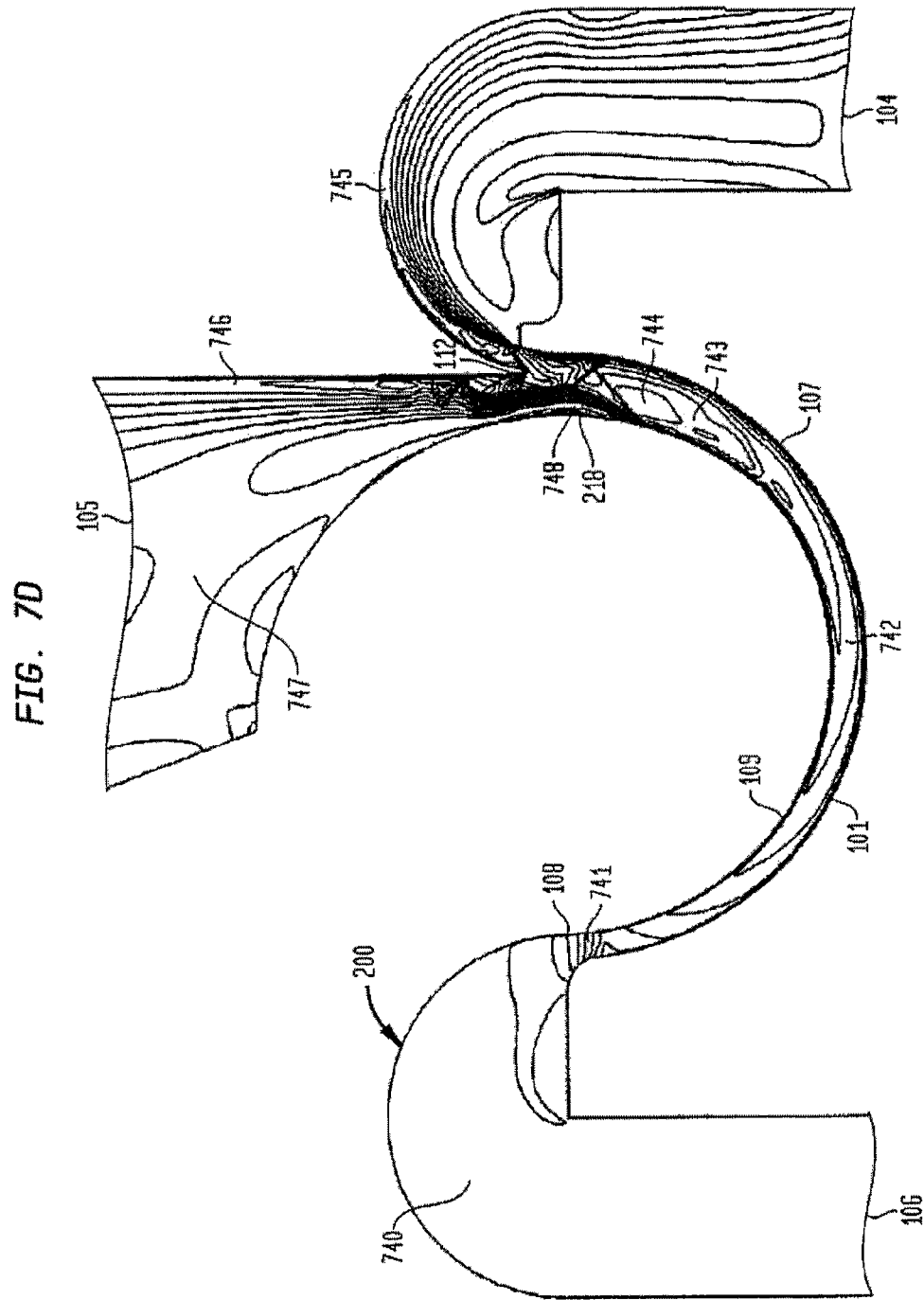

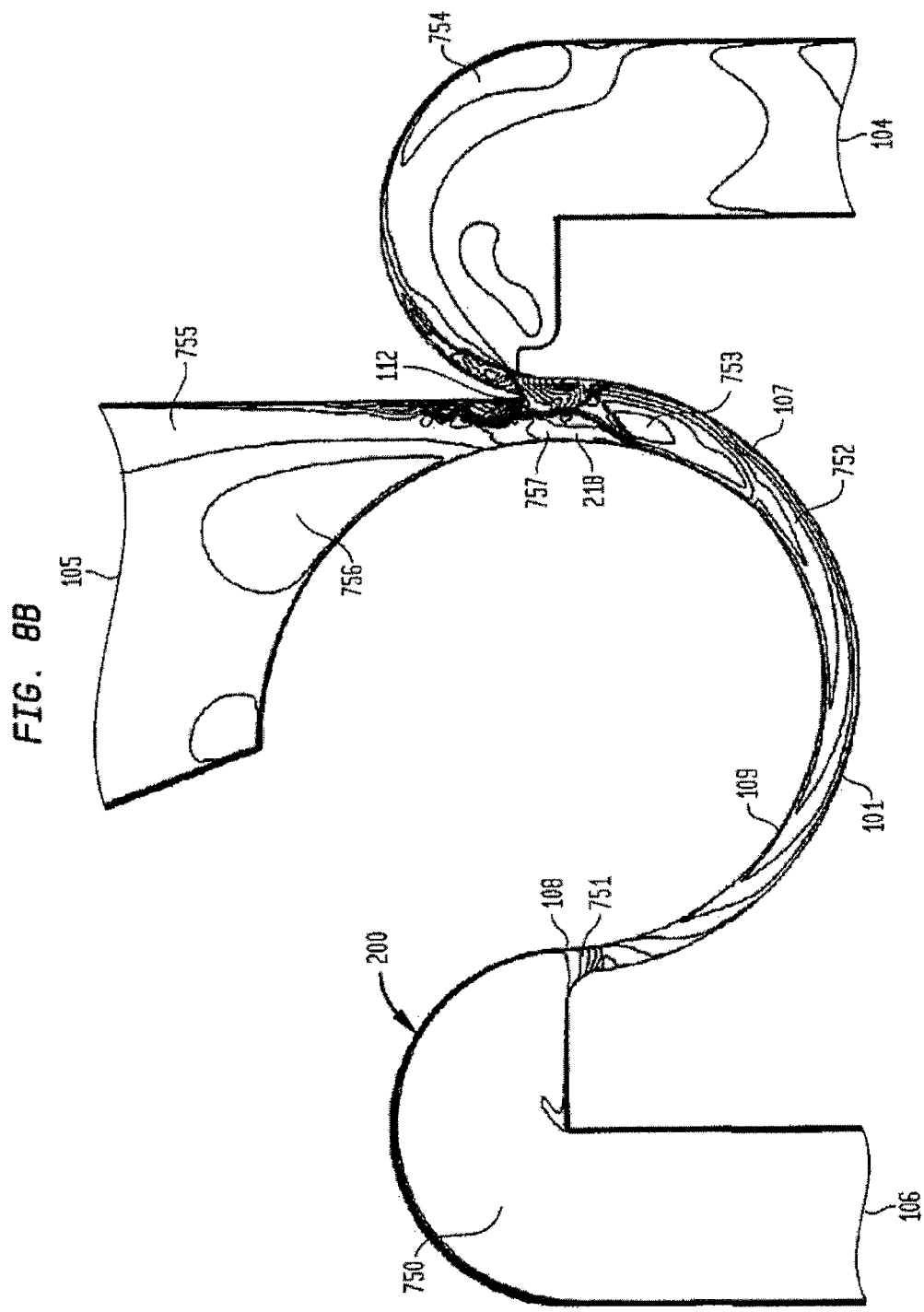

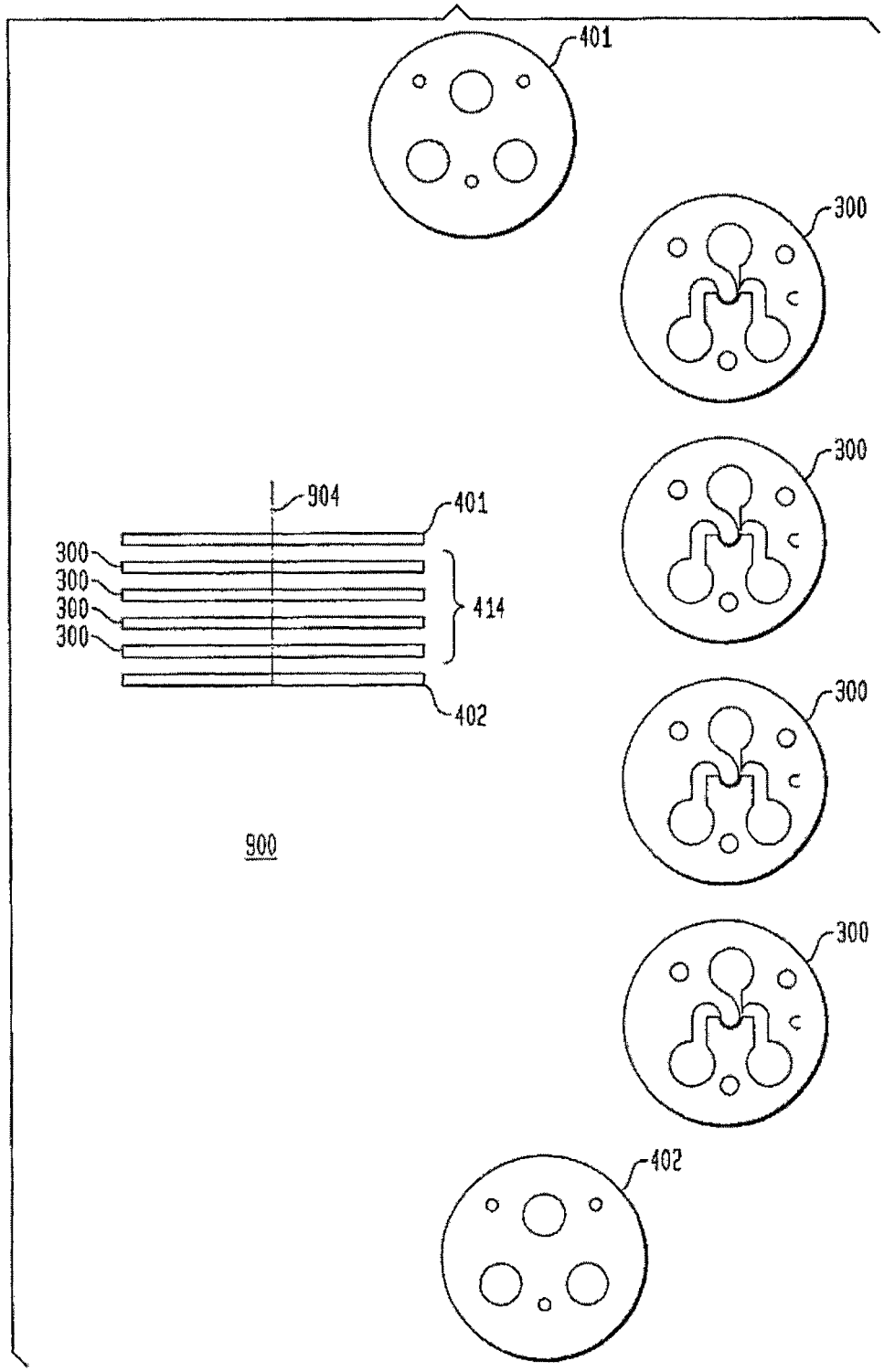

FIG. 14A
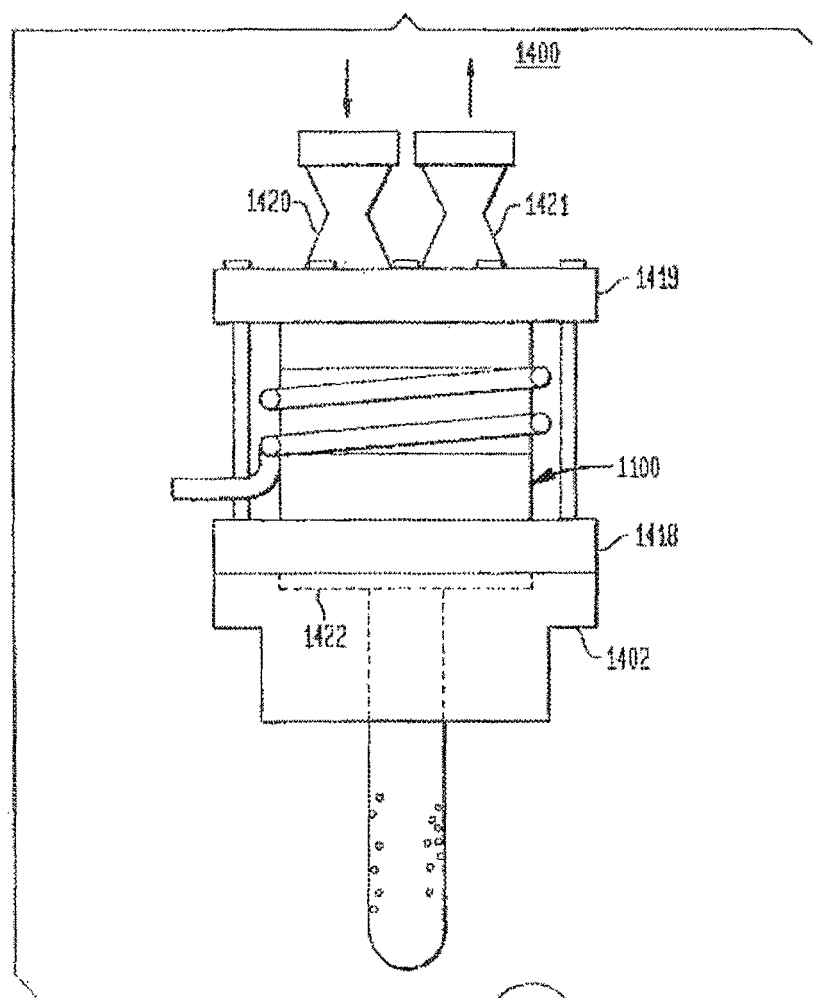
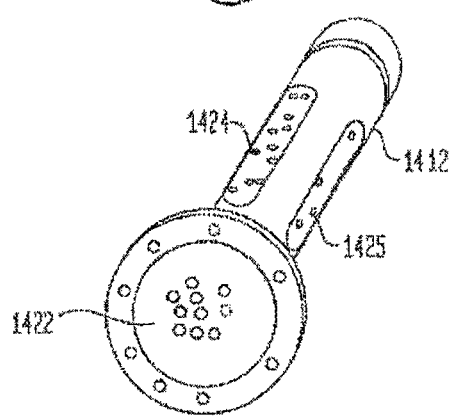
FIG. 14B

2400

AERODYNAMIC SEPARATION NOZZLE

CROSS-REFERENCE TO RELATED APPLICATIONS

This application is a continuation of U.S. Ser. No. 13/172,399, filed Jun. 29, 2011, now pending, which is a continuation of U.S. Ser. No. 12/249,779, filed Oct. 10, 2008, now U.S. Pat. No. 8,016,901, which claims the benefit of U.S. Provisional Application 61/080,672, filed Jul. 14, 2008. Each patent application identified above is incorporated here by reference in its entirety to provide continuity of disclosure.

TECHNICAL FIELD

The subject matter described herein relates to devices, systems, and methods related to the separation and concentration or depletion of various constituents of a flow or gas, including gas species, particles, and so forth.

BACKGROUND

Aerodynamic separation of gas constituents is useful for a number of industrial and commercial applications. An aerodynamic separation nozzle, or, as used herein, a separation nozzle, uses aerodynamic effects and forces generated by high speed flow through structures to apply large centrifugal and aerodynamic forces to gases flowing through those structures to urge the various gas species that comprise a separation gas to be separated (i.e. process gas) apart thereby enabling separation of the gas species. The combination of the centrifugal forces and the design of the structure are adapted to the type of gas species being separated. In particular, the invention disclosed herein in its various embodiments preferentially separates and isolates the constituents of a process gas into heavier and lighter species that are suitable for concentration and collection. In one aspect the aerodynamic separation nozzle utilizes temperature control of the nozzle to enhance separation efficiency. In another aspect, the aerodynamic separation nozzle utilizes pre-conditioning of the incoming gas stream to enhance separation efficiency. In still other aspects combinations of the foregoing are used to enhance separation efficiency.

1 Industrial Applicability

The system and method has potential applicability to a wide range of different industrial and commercial applications. The following brief synopsis is intended only to provide background on some exemplary applications to assist a person of ordinary skill in the art in understanding this disclosure more fully.

1.1 Natural Gas Processing

Natural gas provides more than one-fifth of all the primary energy used in the United States. Much of the raw natural gas is sub-quality and exceeds pipeline specifications for carbon dioxide, hydrogen sulfide, and nitrogen content, and much of this low-quality natural gas cannot be produced economically with present processing technology.

A number of industry trends are affecting the natural gas industry. Despite the current high price of natural gas, long-term demand is expected to overcome supply, requiring new gas fields to be developed, including gas fields not being used because of their low-quality products. In the future, the proportion of the gas supply that must be treated to remove contaminants before introduction into the pipelines will increase.

Amine gas treating, or acid gas removal, refers to a group of processes that use aqueous solutions of various amines to remove carbon dioxide ($CO_2$) and hydrogen sulfide ($H_2S$) from gases. It is a common unit process used in refineries, petrochemical plants, gas-processing plants, and gasification plants. Gases containing carbon dioxide and/or hydrogen sulfide are commonly referred to as acid gases or sour gases in the hydrocarbon processing industries.

A typical amine gas treating process includes an absorber unit and a regenerator unit in addition to other ancillary equipment. In the absorber unit, the down-flowing amine solution absorbs $CO_2$ and $H_2S$ from the up-flowing sour natural gas to produce a gas that meets specifications for $CO_2$ and $H_2S$ content that exits the absorber unit. The resultant 'rich' amine is then routed into a regenerator (a stripper with a reboiler) to produce regenerated or 'lean' amine that is recycled for reuse in the absorber.

A similar process is used in the steam reforming process of hydrocarbons to produce gaseous hydrogen for subsequent use in the industrial synthesis of ammonia. Amine treating is one of the commonly used processes for removing excess carbon dioxide in the final purification of the gaseous hydrogen.

Problems associated with amine treating include the energy expense of the process, the chemical expense of the process (due to evaporative loss of amine), the inability to process highly contaminated $CO_2$ gases, and the emission of gases during the regeneration stage to the atmosphere.

As of 2005, according to the EPA there are 287 acid gas removal ("AGR") units operating in the natural gas industry in the United States. These AGR units collectively emit 634 million cubic feet (MMcf) of methane to the atmosphere annually, averaging 6 thousand cubic feet per day (Mcf/day) of methane per individual AGR unit. Methane is a known greenhouse gas, collectively less in quantity in the atmosphere when compared to carbon dioxide, but having about 20 times the heat insulation properties than carbon dioxide, and has a life-span in the atmosphere of 12 years on average.

One need in industry today and for the future, is an acid-gas removal technology that can process high-levels of contaminants efficiently and does not require chemicals for absorption, and does not emit contaminants to the atmosphere. The present system and method is capable of separating $CO_2$ and $H_2S$ from a sour natural gas stream without the need to use an amine based process thereby eliminating the need for costly, polluting AGR units.

1.2 Carbon Dioxide Capture

Extensive efforts have recently been directed toward capturing $CO_2$ emitted from large point sources such as fossil fuel power plants and other fossil fuel powered thermal generation units. There are a number of processes that have been posited for commercial use at large point sources of $CO_2$ including the same amine process described above for removing $CO_2$ from sour natural gas. However, the same limitations caused by the operation of AGR units are present when using the process to capture carbon being emitted from a large point source. Further, additional technologies such as scrubbers, electrostatic precipitators and flue gas de-sulfurization is needed to remove sulfur dioxide ($SO_2$) and particulate matter from the flue gas. In the case of large point source emitters, a separation nozzle can be employed to remove all of the contaminants in the exhaust stream, thereby allowing the concentration of the various gases and particulates in separate streams for final processing and in the case of carbon capture plants, sequestration of the $CO_2$.

1.3 Oxygen Concentration

Many persons having diminished lung capacity need to breath either pure or enriched oxygen as part of their therapy. Traditionally, when persons need continuous oxygen therapy, they use an oxygen concentrator that use typically a molecular sieve, such as a zeolite, to remove nitrogen from ambient air, thereby concentrating oxygen for use in the therapy. These oxygen concentrators are typically less expensive than liquid oxygen canisters, and thus are more commonly used for home administration of oxygen therapy. However, oxygen concentrators capable of supplying more than 1-2 liters per minute of oxygen are typically larger, bulkier units that are not suitable for portable use and require large quantities of energy to operate. Thus, most patients who require oxygen therapy when outside the home must use traditional liquid oxygen bottles that are heavy and potentially dangerous. The present separation nozzle can provide the performance of an oxygen concentrator by separating ambient air into its constituent gases, thus concentrating the oxygen present in ambient air to a level suitable for oxygen therapy, without the need for bulky, power-intensive molecular sieves.

2 Background of the Invention

An alternative separation process using aerodynamic techniques in conjunction with a specified nozzle geometry was developed E. W. Becker for uranium isotopic enrichment. Separation nozzles of this type are generally referred to as a Becker process nozzle for isotopic enrichment. This Becker process nozzle depends upon diffusion driven by pressure gradient effect, similar to the gas centrifuge in order to separate gas constituents. In order to achieve effective separation of isotopes, the centrifugal forces generated in a Becker process nozzle must be increased. The centrifugal forces are typically increased by including a cut gas or separation enhancing gas that allows the process gas to accelerate faster within the Becker process nozzle and thus generate greater centrifugal forces to enhance separation. In a Becker process nozzle, the gas mixture of the process gas and the carrier gas is compressed and then directed along a curved wall at high velocity through a convergent-divergent nozzle. The heavier molecules move preferentially out toward the wall relative to those containing the lighter molecules. At the end of the curved wall, a skimmer splits the overall gas jet into a light enriched fraction and a light depleted fraction, which are withdrawn separately. By nature of the Becker process nozzle design process, the use of a balance gas to accelerate the velocity of the process gas and the gas to be separated, and focus on isotope separation, the expansion of the process gas is quite large as the expansion gas exits the relatively short convergent-divergent nozzle and the gaseous expansion of the process gas is controlled by suction control rather than geometric expansion ration control.

Generally the curved nozzle wall of the Becker process nozzle may have a radius of curvature as small as 0.0004 inch. Production of these tiny nozzles by manufacturing is technically demanding, and the overall process typically includes stages having multiple vessels containing hundreds of separation elements, gas distribution manifolds, gas coolers to remove the heat of compression, and centrifugal compressors to pressurize the flow.

Diffusion across a streamline, used by a Becker process nozzle, is analogous to the diffusion against a gravitational or centrifugal force. So all separation processes in the gas occur in directions perpendicular to the streamlines because no net material transport takes place across the streamline. If a streamline is curved, this implies that the gas is being accelerated, and that a pressure gradient or force must exist perpendicular to the streamline.

The Becker process nozzle is typically adapted for use in the separation of isotopes of heavier atomic weight. In this application, it is important for the designers to maintain higher speeds. One approach to this is to introduce a balance or separation gas to the process gas passing through the Becker process nozzle. The balance gas is typically lighter gas such as hydrogen or helium. The purpose of the balance gas is two fold. First the lighter balance gas lowers the overall molecular weight of the process gas thereby allowing the process gas to accelerate faster. Second, the lighter balance gas exerts a differential drag force on the heavier and lighter isotopes. This differential drag force is used to enhance the separation of the isotopes.

The use of a balance gas, however, requires the Becker process nozzle to adopt a characteristic form, namely a relatively short expansion nozzle that exits into a stagnation zone. Thus it is necessary for those of ordinary skill in the art when using a Becker process nozzle to maintain a relatively short expansion nozzle length in order to separate isotopes in a relatively short flight time through the nozzle since a longer nozzle would have a tendency to separate out all of the isotopes from the balance gas as opposed to separating isotopes, thus changing isotope enrichment to a gas process.

As a result of these requirements and design constraints, the Becker process nozzle has a number of significant limitations that have reduced its applicability to general purpose gas separation including:

1. The small size of the curvature wall requires that the nozzle and skimmer components are also minute in size, requiring the components be made of foil material and bonded to assemble even one nozzle. Nano-fabrication is required to form the nozzles, with specifications to the 0.001 mm tolerance.
2. The operating pressure of the separation gas is at several bar, usually below 6 bar. The addition of specialized compressors in the cascade add energy to the operating costs to maintain the process at separation pressure.
3. The flow stream along the curvature wall has little if any centrifugal force acting on that streamline, so the 95/5 mixture along the curvature wall dilutes the concentrating heavy isotope stream at extraction, thereby reducing the separation factor by dilution.
4. To reduce the cost of the processing, the add-in hydrogen gas must be cleaned at the end of the process for reflux back into the system, adding another separation process to the cascade.

Another alternative separation technique disclosed in the prior art is the use of a Pitot probe in a supersonic gas mixture, first explained by Fenn and Reis (1963), of the type exemplified in the following U.S. Pat. No. 3,465,500 to Fenn (1969) and U.S. Pat. No. 3,616,596 to Campargue (1971). It was disclosed that at suitably low Reynolds numbers in a free-expansion jet of nitrogen/hydrogen gas mixture, the gas entering the probe was enriched in the heavier of the two species due to the stagnation effects at the probe tip. It had previously been considered that gas samples taken by such probe effect contained the two-molecular composition of the free-expansion jet that had been separated by radial diffusion effects in the jet upstream of the probe. However, in later experimentation by Rothe (1966), it was revealed that the magnitude of the probe-induced separation measured by Fenn and Reis was up to 50 times greater than that due to radial diffusion in the free jet alone. This determination revealed that it was the shock front preceding the probe that caused lighter specie to follow streamlines around the probe, while heavier specie passed into the probe inlet. This effect has been experimentally and theoretically tested for the separation effect causing minor separation of isotopes, primarily for the potential use in uranium isotope enrichment. Due to the small degree of separation caused by a single probe, the method has not progressed to any commercial degree.

M. R. Bloom, the present inventor, in the early 1990's developed gas-gas separation device using a centrifuge based method for the separation of lower molar weight gas mixtures commonly found in the energy and chemical industry sectors. The mechanical device of his work is described in U.S. Pat. No. 5,902,224 to Bloom (the '224 patent), for a device used for gas mixture separation. In the '224 patent, a centrifuge device is described for the separation of components of low-molar weight gas mixtures, including natural gas, air, and contaminated air. In this centrifuge device construction, a narrow-gap centrifuge is built consisting of many individual and stacked plates that are spaced from one another to form the centrifuge rotor, and the central area at the axis of rotation for this centrifuge is an open expansion chamber that extends through the height of the centrifuge. The '224 patent discloses a narrow gap centrifuge with a stationary housing, a rotor with multiple, stacked, inverted pyramidal plates that form channels between the plates. As lighter constituents are separated from the gas mixture they travel down through the device for extraction.

Although the embodiments of the present device and method are described in combination with and in some cases contrasted to the theory and method of this previous art, this is not intended to limit the claimed invention in any sense.

3 Summary of Invention

The present aerodynamic separation nozzle (separation nozzle) has been focused upon optimizing a number of parameters to tailor the characteristics of the separation nozzle to separate different constituents of the process gas. The separation nozzle possesses six main operating or design parameters governing the separation of constituents: (1) $\Delta M$ being the difference in mass between gas components and also in the case of partial condensation of constituents of the process gas, differences between phase particles and gas; (2) the development of velocity in the nozzle; (3) the average inlet temperature of the gas into the nozzle; (4) the length of gas expansion within the nozzle; (5) the radius of curvature of the divergent section of the nozzle; and, (6) temperature of the separation nozzle and the surfaces of the separation nozzle facing the flow of the process gas through the separation nozzle. There are a number of secondary and operating or design parameters that also govern the performance of a separation nozzle as known to those of ordinary skill in the art informed by the present disclosure. In the various embodiments of the present separation nozzle, these six parameters or separation factors, are controlled and used to tailor the separation nozzle to control the performance of the separation nozzle and overall quality of constituent separation, also described herein as the separation performance of the separation nozzle. In one embodiment, the process gas entering the separation nozzle is conditioned to enhance separation performance by cooling the process gas.

In another embodiment, cooling the body of the separation nozzle enhances the performance of the separation nozzle. In this embodiment, the body or physical structure of the separation nozzle is held at a reduced temperature. Reducing the temperature of the separation nozzle body in one aspect reduces and minimizes shock effects occurring in the separation nozzle thereby increasing the overall velocity of the process gas within the separation nozzle and enhancing the separation effects. In still another embodiment a combination of a cooled separation nozzle body is combined with pre-conditioned or cooled process gas entering the separation nozzle.

In yet another embodiment, the separation factors are controlled to effect the quality of gas separation through the relationship of the gas inlet temperature and the temperature of the nozzle to further reduce the temperature of the gas to phase change of the highest-boiling point component of the gas. The development of the proper separation nozzle geometry to effect supersonic cooling and increased temperature exchange from the gas has evolved where the process gas maintains supersonic flow for a majority of the distance through the curving portion of the separation nozzle. Embodiments of this separation nozzle design, having a longer supersonic expansion region, results in a reduction in shock effects occurring at the exit of the curving expansion portion of the separation nozzle.

This design and development of the separation nozzle geometry and operation, and hence tailoring of the separation parameters, has been triangulated using CFD to model the gas flow characteristics, along with numerically modeling those gas characteristics, and experimental testing of the separation nozzle to verify the CFD and numerical calculation for flow rate, pressure, temperature, and separation effect. This allows the creation of a set of design tools and design methodology that allows the optimization of various embodiments of the separation nozzle to provide enhanced separation performance tailored to the specific requirements of the process gas and desired constituents to be separated.

Other embodiments of the present separation nozzle are directed to the combination of the separation nozzle with other separation nozzles and other supporting equipment in order to create a system incorporating the separation nozzle, adapted to achieve desired separation performance with respect to a particular process gas and desired separation constituents.

In some embodiments of the separation nozzles, a heat exchanger is integrated into the nozzle design and allows the use of a refrigerant to control the temperature of the nozzle, and subsequently the temperature of the gas through the supersonic expansion process. In some of these embodiments, a system of separation nozzles is created to connect the heat exchanger in the separation nozzle to a vessel that collects separated heavy fractions evolving from the separation process in the separation nozzle. Thus, in some embodiments of the separation nozzle with a heat exchanger, temperature loss through the system is managed by using the heavy fraction exiting from the separation nozzle as a refrigerant to condition the incoming process gas. In these embodiments, this thermal management increases the overall efficiency of the separation nozzle system as a whole.

In one aspect, the device and method comprises an aerodynamic separation nozzle that is designed to cause gas velocity through the curved expansion nozzle element of the separation nozzle, to be at a supersonic velocity up to the flow-fractioning skimmer plane, by which the gas significantly drops pressure and temperature through expansion. In these embodiments, the expansion ratio of the nozzle extends through the curved geometry of the divergent section of the nozzle through at least 120° of gas flow travel, and possibly up to 180° of gas flow travel. Beyond the expansion exit of the nozzle throat in these embodiments, the geometry of the divergent channel gradually expands to two separate supersonic diffusers, divided by a leading-edge skimmer for overall flow division, and two separate gas fractions evolve into their respective diffuser to be extracted from the nozzle as two separated flow streams, separated such that with respect to one constituent gas the one flow stream is enriched while the other flow stream is depleted.

In another aspect of separation nozzle system, the pressurized inlet gas or process gas may be cooled by an external heat exchanger from its originating temperature prior to entering the separation nozzle. In these embodiments, the cooled and pressurized inlet gas entering the nozzle becomes supersonic in velocity through expansion. Expansion of the gas decreases the density of the gas and the expansion gas results in significant cooling of the moving gas through supersonic velocity.

Another embodiment of this device and method is to precool the inlet gas to the aerodynamic separation nozzle by an external heat exchanger that is positioned upstream of the nozzle, and the nozzle itself is cooled through the action of a refrigerant that circulates through a heat exchanger that encompasses the nozzle. In this embodiment, the separation nozzle-body can be regulated in temperature in a range from about 133° R to about 540° R or more by having the refrigerant acting on the stagnant temperature of the expansion nozzle. Further, in applications for gas separation where a condensable fraction is to be separated by phase in the expansion nozzle, generally the inlet gas has a higher temperature value than the separation nozzle body temperature value. In this manner, energy is extracted from the inlet process gas through the expansion process as the process gas passes through the expansion nozzle, and that energy is transferred from the gas to the separation nozzle body. The heat in turn is removed from the separation body via a refrigerant for energy removal. Still further, the refrigerant can be controlled as to its flow rate to control the overall temperature of the separation nozzle body, thereby enabling the control of the temperature ratio between the inlet process gas and the separation nozzle body, which of course modulates the overall heat transfer from the inlet gas to the separation nozzle body.

As used herein, the stagnation temperature of an expansion nozzle is calculated as the mean temperature of the gas passing through the expansion nozzle in a sonic-supersonic state between the nozzle throat 108 and the skimmer 112. The stagnation temperature of an expansion nozzle is a function of at least the stagnation temperature of the gas entering the nozzle, the nozzle material temperature the degree of expansion ratio between the nozzle throat 108 and the expansion nozzle exit 107 or Type-2 nozzle exit 208 depending on the embodiment of the expansion nozzle considered.

Another embodiment of the separation nozzle device and method is to have the refrigerant provided in the heat exchange component of this invention as either a condensed gas that has been separated from the gas flow, or as a liquid refrigerant such as liquid nitrogen. In the case of an embodiment using separated condensed gas, that refrigerant may be drawn from a vessel combined with the separation nozzle using a metering pump and delivered by a fill pipe to the heat exchanger of the nozzle in a flow-controlled manner. Further, the amount of refrigerant flow may be controlled by a control unit that utilizes a sensor signal to increase or decrease the flow of refrigerant required to maintain the desired level of temperature of the nozzle.

Another aspect of the device and method is to have the coolant provided to the heat exchanger component of the nozzle as a cryogenic gas wherein a liquid cryogen or condensed gas is vaporized to act as the temperature medium. In this application, refrigerant as a liquid is stored in a reservoir vessel that has an adjustable resistive heater that vaporizes the liquid refrigerant at a controlled rate and volume of produced refrigerant gas. The refrigerant gas is then piped through a feed line to the nozzle heat exchanger where the heat transfer occurs between the inlet gas and the nozzle body. Similarly, the flow volume of the cryogenic gas refrigerant can be regulated by a control unit that utilizes a sensor signal to increase or decrease the refrigerant flow required to maintain the level of nozzle cooling from 133° R to 540° R.

Another embodiment of this device and method is to have the aerodynamic separation nozzle configured into a separation cascade arrangement where the inlet gas enters the separation cascade of successive aerodynamic separation nozzles, and is separated of some of its constituents through successive inter-cascade flows that produce a product stream and a waste stream. The operation of the various embodiments of a cascade system of separation nozzles is specified by the type of application, wherein the cascade is at least two successive stages and may be as many as 20 or more stages selected according to the separation performance of each separation nozzle stage and the desired quality of the outlet gas products. In some embodiments, the cascade system is operated from the initial pressure of the inlet gas, wherein the gas pressure of the processing gas is reduced through each stage as is specified by the separation nozzle geometry. In other embodiments, an individual stage pump is used to repressurize the gas prior to each successive separation nozzle stage. The stage pump thus recovers the pressure that is reduced in the expansion process at the prior separation nozzle stage. In other embodiments, the design of the separation nozzle stages of the cascade varies and is separately sized from the bottom to the top of the cascade thereby allowing the flow volume at each stage to be regulated by each stage's nozzle geometry to control the throughput of the gas and adapted to accommodate the residual pressure of the process gas exiting the earlier stage as an inlet to the current stage and maintain relative pressure ratios across the separation nozzle by adjusting the total volume and physical geometry of the separation nozzle.

An embodiment of the present device and method is fabricated to be a supersonic nozzle that is curved in its divergent section, whereby process gas is expanded through a nozzle throat becoming less dense and achieving supersonic velocity. The flow of the process gas through the curved divergent nozzle results in curved supersonic streamlines within the nozzle. This results in a pressure gradient established within the curved divergent section of the expansion nozzle that is perpendicular to the curved supersonic streamlines within the curved divergent expansion nozzle section of the separation nozzle. The pressure gradient thus urges heavier, more massive species or constituents of the process gas toward the outer wall of the curved divergent nozzle while lighter species are urged toward the inner wall of the curved divergent nozzle. In still other embodiments, the separation nozzle assembly is held or controlled to a temperature that is different compared to the inlet gas temperature. Gas fractions or constituents of the process gas flow in this curved supersonic condition of flow either release or gain heat through heat transfer and aerodynamic processes. In one aspect, the separation nozzle assembly is held at a reduced temperature to increase the velocity of the process gas flow resulting in increased separation performance.

In another aspect the heat transfer from the process gas is used to encourage the condensation of at least one species or constituents within the process gas. This heat transfer allows a different phase state to form in the process gas compared to the remaining gaseous fraction. The condensed constituents in the curved expansion nozzle effectively cross the supersonic streamlines in a radial and perpendicular direction to the supersonic streamlines, thereby moving from smaller pressure to larger pressure, and subsequently less dense gaseous fractions may move from larger pressure to smaller pressure by radial perpendicular movement. The partial condensation of at least one constituent of the process gas results in increased separation performance.

Another aspect of this device and method is to cause separation of components or constituents of a gas through preconditioning the temperature and pressure of the gas upstream of an aerodynamic separation nozzle, and then causing a secondary temperature and pressure change to occur within the nozzle, due to supersonic cooling and having the temperature of the nozzle at a different range compared to the inlet gas temperature. Further, through the geometry of the nozzle, causing a separation of the flow within the nozzle yields two separate flows; one being concentrated in the phase-changed fraction, and the other being depleted of the phase-changed fraction.

Finally, the device and method of this invention is configured to economically separate a gas of its components on a continuous operation, so that the device and method can be used for commercial applications.

BRIEF DESCRIPTION OF THE DRAWINGS

The accompanying figures depict multiple embodiments of a device and method for the separation of constituents from a flow. A brief description of each figure is provided below. Elements with the same reference numbers in each figure indicate identical or functionally similar elements.

FIG. 2b is a perspective view of another embodiment of a Type-2 separation nozzle incorporating a dual skimmer configuration.

FIG. 3b is a perspective view of a pair of the Type-1 separation nozzles configured into an embodiment nozzle plate.

FIG. 6 is a view of a CFD portrayal of gas temperature through an embodiment of a Type-1 nozzle with ambient process gas and ambient nozzle.

FIG. 7c is a view of the results of Computational Fluid Dynamics (CFD) analysis of gas flow mach velocity through an embodiment of a Type-2 nozzle with heated process gas and cooled nozzle.

FIG. 7d is a view of CFD results of gas flow mach velocity through an embodiment of a Type-2 nozzle with cooled process gas and cooled nozzle.

FIG. 8b is a view of CFD estimates of gas temperature through an embodiment of a Type-2 nozzle with cooled process gas and cooled nozzle.

FIG. 9 is a schematic view of an embodiment of a Type-2 nozzle assembly that is formed of several bonded nozzle plates.

FIG. 14a is an assembly view of embodiments of a nozzle module and heat exchanger adapted to join with an inlet distribution tube for mounting on a phase tube assembly.

FIG. 14b is a view of a distribution manifold with integral orifice plate.

DETAILED DESCRIPTION

Figure 1:
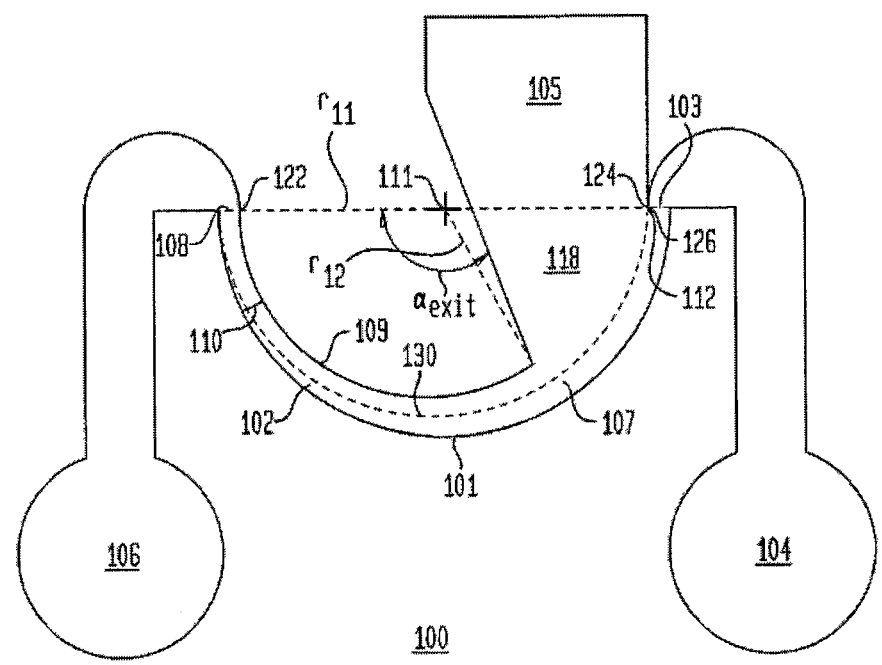
FIG. 1 is a perspective view of a Type-1 separation nozzle.

Multiple embodiments of a system, device, and method for the separation of constituents of a flow are presented herein. Those of ordinary skill in the art can readily use this disclosure to create alternative embodiments using the teaching contained herein.

Vernacular

The following terms used herein are defined as follows.

The term "gas" or "process gas" as used herein is used as a general term to refer to any gas that is input to an aerodynamic nozzle for separation, including enriched or depleted gas that has previously exited a prior separation nozzle. In some embodiments, a gas contains particulate matter or condensed vapor (i.e. liquid phase) that are substantially entrained in the flow or vapor creating a multi-phase flow. In other embodiments, the gas contains a mixture of gases and isotopes suitable for enrichment. In one embodiment, the gas comprises a process gas and a balance gas, wherein the process gas is targeted for either enrichment or depletion and the balance gas is used to enhance the aerodynamic effects of the separation system. Enriched or depleted gas indicates that the gas contains, respectively, either a greater concentration of the indicated gas species or a reduced concentration of the indicated gas species.

As used herein, the term "oblique shock wave" is a flow structure created by flow through a curved duct or nozzle whereby a flow that is substantially uniform and parallel is turned by action of the duct walls into another flow that is also substantially parallel but is compressed and has a different direction. To achieve the oblique shock wave, the walls of a nozzle are formed in such a way to form the desired streamline such that there is only a single expansion wave, where the "reflected" wave drops out and is canceled due to interactions with the incoming wave. See e.g., Applied Mathematical Sciences, Vol. 21, *Supersonic Flow and Shock Waves*, R. Courant, K. O. Friedrichs, Chap. IVB, pg. 282-286.

When discussing the present application and the separation nozzle and separation nozzle system, the reader will note that in some circumstances the term separation nozzle is used independently and in other circumstances is used in conjunction with the adjective Type-n where n is an integer number. The Type-n adjectives are used to highlight features that characterize specific embodiments of what is generally described as a separation nozzle. Thus the term separation nozzle refers to features common between all embodiments of the described separation nozzles that are apparent to those of ordinary skill in the art, while discussions relating to embodiments of the separation nozzle, described as Type-n separation nozzles, discuss features that are unique to that particular embodiment as well as common features of all embodiments of the separation nozzle.

As used herein, the term "state" when used in reference to a physical object is intended to define the various parameters of that particular physical object or dynamic system. For example, when referring to a gas, the state of the gas includes various parameters or states associated with the gas such as pressure, temperature, composition or constituent ratios, density, enthalpy, entropy, velocity, and acceleration.

The following terms and definitions are used to describe the flow of a gas or fluid, or mixture of a gas, liquid, and/or solids: mean velocity vector at a location means the mean or average of the instantaneous velocity vectors associated with the flow at a given location. For example, in a channel with fully developed flow, the mean velocity vector across the channel would integrate the velocity vectors of the flow from both the free stream portion of the flow as well as the relatively slower contributions from the boundary layer. The magnitude of the velocity vector is the total velocity of the velocity vector at a given location.

4 Separation Nozzle

Various embodiments of the separation nozzle are described below. These embodiments are variously adapted based on the characteristics of the process gas that is inlet into the separation nozzle, and the nozzle parameters are selected in order to enhance the desired separation performance to allow a portion of the process gas to be separated into a flow that is enriched with a constituent of the process gas and a flow that is depleted with respect to a constituent of the process gas. In this manner the separation nozzle allows the selective concentration or depletion of desired gas species.

4.1 Type-1 Separation Nozzle

FIG. 1 is a perspective view of an embodiment of a Type-1 separation nozzle, or as referred to herein a Type-1 nozzle 100. In FIG. 1, the basic geometry of the Type-1 nozzle 100 can be seen; with the inlet gas reservoir 106 being upstream of the nozzle throat 108. The inlet gas reservoir 106 is adapted to receive the process gas entering the separation nozzle. As with all of the various embodiments discussed herein, the term flow path is used when referring to the flow of the process gas through a given separation nozzle from the inlet gas reservoir 106 until the flow exits the extents of the separation nozzle at the various diffusers and the upstream direction is generally against the mean velocity of the flow (i.e. toward the inlet gas reservoir 106) while downstream is generally in the direction of the mean velocity of the flow (i.e. toward the diffusers).

The Type-1 nozzle 100 comprises a divergent expansion nozzle, or simply an expansion nozzle 102 that is fluidically coupled to the nozzle throat 108 to accept the flow of the process gas and an expansion nozzle exit 107. As used herein, the term fluidically coupled indicates that a connection is made between the recited elements that are adapted to allow the transport of a fluid (including gases and multi-phase flows without limitation) between the recited elements. The length of the expansion nozzle 102 along the flow path is defined between the nozzle throat 108 to the expansion nozzle exit 107. The expansion nozzle exit 107 exhausts the flow into an over-expanded region 118 that in the embodiment depicted in FIG. 1 is a portion of the expansion diffuser 105. The flow path of the process gas through Type-1 nozzle 100 after entering the nozzle throat 108 is generally along the separation flow path 130 that is defined along the nominal flow path from the nozzle throat 108 through the expansion nozzle 102 and the expansion nozzle exit 107 to the skimmer 112, which in the embodiment shown passes through the over-expanded region 118.

When describing the various embodiments of the separation nozzle, an angle ($\alpha$) is used to describe and identify the location of various features and characteristics of the separation nozzle. This angle, denoted using the symbol ($\alpha$), shown in FIG. 1 and common to all depictions of the various embodiments of the separation nozzle detailed herein, is calculated from an arbitrary nozzle midpoint 111. The nozzle midpoint 111 is defined along a phantom or construction line drawn between a perpendicular drawn from at a first point 122 to a second point 126, which in the embodiment depicted is co-located at the tip 124 of the skimmer. The first point 122 of the construction line is located at the interior wall of the nozzle throat 108 at the point where the nozzle throat 108 transitions to the expansion wall 109. In cases where the skimmer 112 is shifted above or below the ($\alpha$) equals 180 degrees, the second point 126 is defined as the intersection between the construction line and a perpendicular line that intersects the tip 124 of the skimmer 112 where the construction line intersects the deflection wall 101 as the deflection wall 101 crosses about 180 degrees. In the embodiment depicted, the second point 126 of the construction line is coincident with the tip 124 of the separation skimmer 112. The angle ($\alpha$)=0 degrees is defined along the radius ($r_{11}$) between the nozzle midpoint 111 and the first point 122. The angle ($\alpha$) has a positive sense defined in the direction of the flow path. Those of ordinary skill in the art will note that the nozzle midpoint 111 is not the actual midpoint of the separation nozzle, rather it is an arbitrary construct used to provide a reference or fiducial indicator for establishing locations of specific elements in the figure.

The embodiment of the expansion nozzle exit 107, depicted in FIG. 1, is oriented with a nozzle exit angle ($\alpha_{exit}$) about 120° downstream of the nozzle throat 108. The radius $r_{12}$ is drawn from the nozzle midpoint 111 to the intersection of the expansion nozzle exit 107. In the embodiment depicted, the deflection wall 101 has a substantially constant radius, while the expansion wall 109 has a slight helical profile that expands the total volume of the separation flow path 130 as the angle (α) increases along the flow path in order to allow the flow to expand and accelerate within the expansion nozzle 102. In other embodiments, those of ordinary skill in the art will use a variable radius deflection wall 101 and variable radius expansion wall 109, or other generally curvilinear profiles or combinations thereof in order to achieve the desired flow characteristics for the process gas when it reaches the expansion nozzle exit 107.

Continuing with the embodiment of the Type-1 nozzle 100 depicted in FIG. 1, the deflection diffuser 104 is also oriented downstream of the expansion nozzle exit 107, and is downstream of the separator skimmer 112. The skimmer 112 separates the process gas into two separate flows, a first flow that passes into the deflection diffuser 104 and a second flow that passes into the expansion diffuser. In the embodiment of the Type-1 nozzle 100 depicted in FIG. 1, the first flow passing into the deflection diffuser is urged by the skimmer 112 or the flow is cut into the skimmer throat 103 before passing into the deflection diffuser 104.

The Type-1 nozzle 100 is configured with a curved divergent expansion nozzle section, the expansion nozzle 102, traversing along the flow path from the nozzle throat 108 to the expansion nozzle exit 107. The radius of curvature of the separation flow path 130 within the expansion nozzle 102 is substantially defined by the curvature of the deflection wall 101. The expansion nozzle 102 is constrained in the planar dimensions of FIG. 1 by the deflection wall 101 and the expansion wall 109. The expansion nozzle 102 is defined within the extents of the expansion nozzle, namely that inscribed within the angle ($\alpha_{exit}$) between the nozzle throat 108 and the expansion nozzle exit 107.

The radius of curvature of the deflection wall 101 depicted in FIG. 1 is generally constant through all angles (α) through the length of the expansion nozzle 102 to the skimmer 112. The expansion wall 109 in the embodiment of the Type-1 nozzle 100 depicted in FIG. 1 is a generally helical curve that gradually reduces in radius as the angle (α) increases. The separation between the deflection wall 101 and the expansion wall 109 determines the overall expansion ratio (calculated between the nozzle throat 108 and the expansion nozzle exit 107) and the expansion rate (i.e. the rate of change of the expansion ratio calculated as a function of angle (α) of the expansion nozzle). As used herein, the term radius of curvature defines the radius of curvature at a given point on a curved line, and the definition thus, in some circumstances, varies continuously along different locations on an arc such that different points of the arc defined by the radius of curvature have different radius lengths and even different centers. A curvature ratio ($r_r$) is defined as the ratio of the radius of curvature of the expansion wall 109 ($r_e$) relative to the radius of curvature of the deflection wall 101 ($r_d$) where ($r_r$) is given by Eq. 1:

$$r_r = \frac{r_e}{r_d} \qquad \text{Eq. 1}$$

Downstream of the expansion nozzle exit 107 is a stagnation zone or over-expanded region 118. That over-expanded region 118 is defined in the embodiment of the Type-1 nozzle 100 depicted in FIG. 1 as the region between the expansion nozzle exit 107 and a plane coincident with the tip 124 of the skimmer 112 orientated substantially perpendicular to the flow, or in the embodiment depicted, oriented to intersect both the plane of the tip 124 and the arbitrary nozzle midpoint 111.

Process gas flow in the Type-1 separation nozzle 100 begins with inlet process gas entering the Type-1 separation nozzle 100 at the inlet gas reservoir 106. The inlet process gas is pressurized at a desired pressure dictated by the natural pressure of the process gas supply source, performance of a pump upstream of the inlet gas reservoir 106, or the pressure remaining in the process gas after it passes through a separation nozzle located upstream of the inlet gas reservoir 106.

The inlet gas reservoir 106 is adapted using the skills of one of ordinary skill in the art to minimize the gas-flow velocity while maintaining the inlet gas pressure, or stagnation pressure, so that the gas velocity in the inlet gas reservoir is, relative to the nozzle, slight in velocity and is pressurized by the gas. In some embodiments, not depicted, flow structures are used to substantially straighten and orient the flow prior to entry of the process gas into the nozzle throat 108. In other embodiments, the walls and floor and ceiling (not shown in FIG. 1) that define the inlet gas reservoir 106 includes or is thermally connected to one or more heat transfer devices allowing, in part, the process gas passing through the inlet gas reservoir 106 to be conditioned. In other embodiments, the walls and floor and ceiling of the inlet gas reservoir 106 are thermally connected to one or more heat transfer devices to allow the temperature of the separation nozzle body to be held at a desired temperature, which in one embodiment is a reduced or lower temperature.

The process gas flows from the inlet gas reservoir 106 through the nozzle throat 108 into the expansion nozzle 102. The velocity of the process gas increases to the velocity of sound in that particular gas state, i.e. greater than or equal to Mach 1 (M>=1), and as such, the pressure decreases in value and the gas flow thins in its density as a function of the Mach value of the gas. The downstream curved expansion nozzle 102 has an outer boundary wall, or a deflection wall 101, that is a constant radius of curvature determined from the nozzle midpoint 111 of the nozzle configuration, and the expansion nozzle 102 has an inner boundary wall or expansion wall 109 that is a decreasingly smaller-radius from the nozzle throat 108 to the expansion nozzle exit 107. The expansion nozzle exit 107 in the embodiment depicted is located at an angle $\alpha_{exit}$ of about 130 degrees from the nozzle throat 108. In other embodiments the expansion nozzle exit 107 is located at an angle $\alpha_{exit}$ of between about 120 degrees to about 180 degrees. In still other embodiments the expansion nozzle exit 107 is greater than about 180 degrees. In some embodiments wherein the expansion nozzle exit 107 is greater than an angle ($\alpha_{exit}$) of 180 degrees the skimmer 112 is shifted upward greater than an angle ($\alpha_{exit}$) of about 180 degrees.

The radius of the expansion wall 109 to the nozzle midpoint 111 varies continuously as a function of the angle (α) in order to achieve the desired expansion ratio for a given separation nozzle geometry. For many of the embodiments depicted herein, the expansion ratio varies from a minimum of about 1.7 to a maximum of about 4.3. In other embodiments the expansion ratio of a given expansion nozzle 102 varies from about 1.5 to about 4.5, in still other embodiments the expansion ratio of a given expansion nozzle 102 is greater than about 4.5. The expansion ratio for a given separation nozzle embodiment is a function of many variables known to those of ordinary skill in the art. The expansion nozzle 102 is configured by those of ordinary skill in the art based on the process gas, and the state of the process gas at various points in the Type-1 nozzle 100 to be about optimally or fully expanded, meaning that the separation flow path 130 through the expansion nozzle 102 is substantially neither over-expanded nor under-expanded. Similarly, since the flow is neither over-expanded nor under-expanded, there is no flow separation in the flow. This flow condition is also characterized as a nonseparated flow or a non-recirculating or nonrecirculation region of the flow. In other embodiments, a majority of the separation flow path 130 through the expansion nozzle 102 is fully expanded, and only a fraction of the separation flow path 130 within the expansion nozzle 102 is either over-expanded or under expanded. In one embodiment, less than about twelve percent (12%) of the separation flow path 130 within the expansion nozzle 102 is either over-expanded or under expanded. In another embodiment, less than about twenty-five percent (25%) of the separation flow path 130 within the expansion nozzle 102 is either over-expanded or under expanded. In another embodiment, less than about forty percent (40%) of the separation flow path 130 within the expansion nozzle 102 is either over-expanded or under expanded.

Downstream, in the over-expanded region 118, the flow separates from the expansion wall 109 and forms a separated layer. Inside the separated layer, it is common for a recirculation zone to form, whereby higher pressure gas from the over-expanded region 118 flows upstream against the separation flow path 130 along the surface of the expansion wall 109 while a portion of the re-circulating gas is entrained by the main process gas flow along the separation flow path 130, causing a characteristic recirculation flow pattern.

Within the expansion nozzle 102, as the process gas is accelerated along the separation flow path 130 by the expansion nozzle 102, it increases in velocity. In the embodiment shown, the velocity of the process gas increased within the separation nozzle to be greater than or about equal to the speed of sound in the medium, Mach>=1. As well known to those of ordinary skill in the art, the supersonic flow conditions within the expansion nozzle 102 results in both a reduction of the process gas pressure and temperature. The expansion ratio and length of the expansion nozzle 102 along the separation flow path 130 are tailored by one of skill in the art with knowledge of the process gas and by controlling the pressure of the process gas at the inlet gas reservoir 106 and the pressure at the expansion diffuser 105 and the deflection diffuser 104. In this manner, one or ordinary skill in the art has the tools to manipulate and control the state (the coupled variables pressure, temperature and velocity) of the process gas within the separation nozzle.

In this manner of configuration, the expansion ratio of the expansion nozzle 102 from the nozzle throat 108 to the expansion nozzle exit 107 is developed in the main by the widening of the expansion-deflection wall separation distance between the expansion wall 109 to the deflection wall 101. This dimension, shown on FIG. 1, is called in the various embodiments depicted herein the throat dimension 110. This increase in the expansion wall 109 to deflection wall 101, or an increase in the overall separation distance i.e. the throat dimension 110 creates, in part, the expansion ratio at various points of the expansion nozzle 102 being determined as a function of the angle ($\alpha$).

Due, in part, to the expansion ratio changing as a function of ($\alpha$) the expansion nozzle 102 a first pressure differential develops across the channel or throat dimension 110 whereby a lower pressure is manifest in the vicinity of the expansion wall 109 while a region of greater pressure is manifest in the vicinity of the deflection wall 101. This pressure differential across the width of the channel, i.e. along the throat dimension 110, is further increased, in part, due to the centripetal acceleration of the process gas as the deflection wall 101 forces the process gas flowing through the expansion nozzle 102 along the separation flow path 130 to turn along the surface of the deflection wall 101. The combination of centripetal force caused by the curved nature of the deflection wall 101 combined with the pressure difference caused by the expansion of the expansion nozzle 102 by the change in curvature of the expansion wall 109 results in the concentration of heavier constituents of the separation toward the deflection wall 101 and lighter constituents of the process gas toward the expansion wall 109. Although the process gas state and constituents have an impact on separation performance, this combination of reduced pressure on the expansion wall with deflection occurring along the deflection wall induce the constituents of the process gas to concentrate across the channel, namely the separation distance or throat dimension 110.

The process gas accelerates at the nozzle throat 108 since the nozzle throat 108 is the narrowest point in the gas flow expansion, and the gas continues to accelerate as a function of the angle ($\alpha$) as the throat dimension 110 increases along the separation nozzle 102 until the process gas reaches the nozzle exit. As mentioned previously, in some embodiments the expansion wall 109 change radius as a function of the angle ($\alpha$), in other embodiments the expansion wall 109 and the deflection wall 101 both change radius, while in still other embodiments only the deflection wall 101 increases in order to increase the throat dimension 110 as a function of the angle ($\alpha$).

In embodiments of the Type-1 nozzle 100, the process gas flow near downstream of the expansion nozzle exit 107 generates one or more oblique shock waves as the flow enters the over-expanded region 118. The shocks generally dissipate the velocity of the gas to less than sonic conditions, and allow the flow to recover both temperature and pressure. However, the bulk of the process gas flow, i.e. a beam of gas, continues generally along the separation flow path 130 to the skimmer 112. The skimmer 112 divides the process gas into two distinct flows separated by the body of the skimmer 112. The first portion of the divided flow continues through the skimmer throat 103 and further diminishes in velocity to be extracted from the Type-1 nozzle 100 through the deflection diffuser 104. The remainder of the process gas flows on the other side of the skimmer 112 and collects in the expansion diffuser 105 for extraction from the Type-1 nozzle 100. Within the over-expanded region 118, a recirculation region forms near the expansion nozzle exit 107 on the expansion wall 109. Further details of this aerodynamic effect are described below in the section titled Nozzle Flow.

4.2 Type-2 Separation Nozzle

Figure 2A:
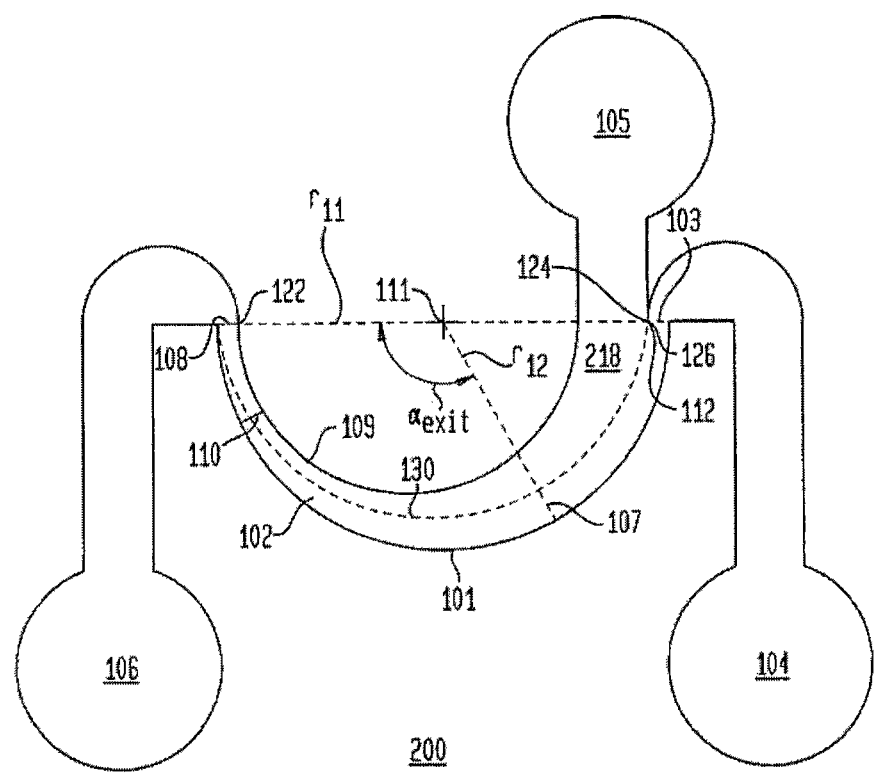
FIG. 2a is a perspective view of a Type-2 separation nozzle.

FIG. 2a is a perspective view of the nozzle geometry of an embodiment of a Type-2 nozzle 200. The Type-2 nozzle 200 reduces the volume of the over-expanded portion of the Type-2 nozzle 200 after the expansion nozzle exit 107, to create a Type-2 over-expanded region 218. Thus, the Type-2 nozzle 200 depicted provides a more gradually tapering transition from the expansion nozzle exit 107 to the Type-2 over-expanded region 218 as compared to the over-expanded region 118 associated with the embodiments of the Type-1 nozzle 100. This extends the overall supersonic condition of the process gas further along the flow path through the Type-2 over-expanded region 218, shown in FIG. 2a, as highlighted in the flow analysis described in the section on titled Nozzle Flow below. As in the Type-1 nozzle 100 described previously, the divergent expansion nozzle, or simply expansion nozzle 102, extends from the nozzle throat 108 to the expansion nozzle exit 107 along the separation flow path 130.

The flow of the process gas in the Type-2 nozzle 200, depicted in FIG. 2a, is also over-expanded in the Type-2 over-expanded region 218 after the expansion nozzle exit 107. This means that the flow of the process gas within the over-expanded region is at least partially separated from at least the expansion wall 109 in the embodiment shown. In other embodiments the flow of the process gas is separated from either or both the expansion wall 109 and the deflection wall 101 depending on the respective geometries of the various embodiments of the Type-2 nozzle 200. In the Type-2 nozzle 200, the volume of the Type-2 over-expanded region 218 immediately downstream of the skimmer 112 is reduced as compared to the similar over-expanded region 118 shown in the Type-1 nozzle 100. This relatively reduced Type-2 over-expanded region 218 the size of the overall flow separation from the expansion wall 109 and there is a corresponding reduction in the size of the recirculation zone that forms within the over-expanded region and allowing a greater portion of the overall flow through the expansion nozzle 102 to remain supersonic and deflected toward the deflection wall 101.

As a result of the extended supersonic flow condition created by the extension of the expansion nozzle 102, the reduced pressure of the process gas results in a cooled or sub-temperature region within the Type-2 nozzle 200 where the flow is maintained at a reduced temperature due to aerodynamic velocity and expansion effects and is extended up to the region of the Type-2 nozzle 200 skimmer 112. In still another embodiment of the Type-2 nozzle 200, so a portion is upstream of the expansion nozzle, the skimmer 112 is placed within the expansion nozzle 102, upstream of the expansion nozzle exit 107.

The Type-2 nozzle 200 also utilizes a rounded, continuous linear, or gentle transition along the expansion wall 109 from the expansion nozzle exit 107 into the Type-2 over-expanded region 218. This is compared to the relatively abrupt transition, piecewise linear transition along the expansion wall 109 present depicted in the Type-1 nozzle 100 described above. In fact, as shown in more detail in the Nozzle Flow section below the Type-2 over-expanded region 218 results in significantly less pressure and temperature recovery and increased velocity of the process gas flow along the separation flow path 130. This means that the mean velocity of the process gas flow through the Type-2 over-expanded region 218 at a greater velocity, with significant portions of the flow greater than Mach 1.0 when the beam of gas exhausted from the expansion nozzle exit 107 impinges the skimmer 112. As a result of the extended supersonic flow condition created by Type-2 over-expanded region 218, the reduced pressure of the process gas results in a cooled or sub-temperature region within the Type-2 nozzle 200 where the flow is at a reduced temperature due to velocity effects, is extended up to the region of the Type-2 nozzle 200 skimmer 112. Thus, in the case of a separation nozzle adapted to at least partially condense one or more of the constituents of the process gas flow, the reduced temperature recovery allows either partial or full delay in the re-vaporization of the condensate until after the process gas passes downstream of the skimmer throat 103.

In the embodiment of the Type-2 nozzle 200 depicted in FIG. 2a, the expansion nozzle exit 107 located at the angle ($\alpha_{exit}$) of about 130 degrees. In other embodiments the expansion nozzle exit 107 is located at an angle ($\alpha_{exit}$) of between about 120 degrees to about 180 degrees. In still other embodiments the expansion nozzle exit 107 is greater than about 180 degrees. In some embodiments wherein the expansion nozzle exit 107 is greater than an angle ($\alpha_{exit}$) of 180 degrees the skimmer 112 is shifted upward greater than an angle ($\alpha_{exit}$) of about 180 degrees.

The embodiment of the supersonic Type-2 nozzle 200 depicted is configured with embodiments of features identified previously in the embodiments of the Type-1 nozzle 100 presented above, including: an inlet gas reservoir 106, a expansion diffuser 105, and a deflection diffuser 104, a deflection wall 101, an expansion wall 109, an expansion nozzle exit 107, (at an angle ($\alpha_{exit}$) of at least about 120° degrees from the nozzle throat 108), a separation skimmer 112, with tip 124, a nozzle throat 108, a skimmer throat 103, and the expansion nozzle 102. The tip 124 of the separation skimmer 112 in one embodiment is a substantially sharp tip with a radius of curvature less than about 0.05". In another embodiment the tip 124 of the separation skimmer 112 is a substantially sharp tip with a radius of curvature less than about 0.01". In still another embodiment, the tip 124 of the separation skimmer 112 has a radius of curvature less than about 0.0002".

4.3 Twin Skimmer Separation Nozzle

Another embodiment of an aerodynamic separation nozzle is depicted in FIG. 2b. This embodiment depicts a twin skimmer nozzle 260 or a separation nozzle that utilizes a combination of centrifugal force, aerodynamic forces, and explicit shock effects to enhance separation of the gas species. As apparent to one of ordinary skill in the art, the other embodiments of the separation nozzle presented herein also utilize, in part, shock effects from the beam of process gas flow impacting the skimmer 112 to cause separate and concentrate of the constituents of the gas.

As readily apparent to those of ordinary skill in the art, embodiments of the twin skimmer nozzle 260 are adaptable to perform in a similar manner to a Type-1 nozzle 100 or a Type-2 nozzle 200. The twin skimmer nozzle 260, similar to the other embodiments of the separation nozzles described herein, has a twin skimmer inlet reservoir 206 for acceptance of the process gas to be separated. As known to those of skill in the art, some embodiments of the present separation nozzle, including the twin skimmer nozzle 260 described in this section may also include a balance gas mixed with the gas to separated to create a process gas that comprises a mixture of the constituents of the process gas and the balance gas to modulate the aerodynamic and transport properties of the mixed gas. Similar in operation to the other embodiments of the separation nozzle, the incoming process gas is pressurized and present in the twin skimmer inlet reservoir 206. The pressure differential urges the gas into the nozzle throat 108.

After entering the nozzle throat 108, the process gas flow along the separation flow path 130 through the expansion nozzle 102. The expansion nozzle 102 causes the process gas to accelerate, with commensurate reduction in pressure and temperature using the same principles described with respect to the Type-1 nozzle 100 and Type-2 nozzle 200 embodiments described in more detail above. Similarly, the expansion nozzle 102 is adapted by one of ordinary skill in the art to achieve a desired expansion ratio for the process gas to accelerate to the desired velocity and, in some embodiments, to achieve a desired aerodynamically induced cooling due to the expansion of the process gas within the expansion nozzle 102.

In contrast to the embodiments of the Type-1 nozzle 100 and the Type-2 nozzle 200, the twin skimmer nozzle 260 utilizes a pair of skimmers, namely a deflection skimmer 264 and an expansion skimmer 262. The tips of both the deflection skimmer 264 and the expansion skimmer 262 in the embodiment depicted protrude slightly through the channel exit 242 into the twin-skimmer over-expanded region 268. In other embodiments, not depicted, the expansion nozzle 102 extends to an angle ($\alpha_{exit}$) of about 180 degrees and the tips of both the deflection skimmer 264 and the expansion skimmer 262 extend into the expansion nozzle 102 past the expansion nozzle exit 107. In still other embodiments, also not depicted, the deflection skimmer 264 and the expansion skimmer 262 are parallel to the channel exit 242. In still other embodiments, also not depicted, the deflection skimmer 264 and the expansion skimmer 262 are above the plane defined by the channel exit 242.

In the embodiment of the twin skimmer nozzle 260 depicted in FIG. 2b, the expansion nozzle exit 107 located at the angle ($\alpha_{exit}$) of about 130 degrees. In other embodiments the expansion nozzle exit 107 is located at an angle ($\alpha_{exit}$) of between about 120 degrees to about 180 degrees. In still other embodiments the expansion nozzle exit 107 is greater than about 180 degrees. In some embodiments wherein the expansion nozzle exit 107 is greater than an angle ($\alpha_{exit}$) of 180 degrees the deflection skimmer 264 and expansion skimmer 262 are shifted upward greater than an angle ($\alpha_{exit}$) of about 180 degrees.

The deflection skimmer 264 and the expansion skimmer 262 produce shock structures in the gas stream near the channel exit 242. These shock structures further enhance separation effects. The initial stratification of the process gas flow or stream occurs when it accelerates and passes through the expansion nozzle 102 at high speed, in a similar manner to the other embodiments of the separation nozzle, such as the Type-1 nozzle 100 and the Type-2 nozzle 200 described above. This stratification causes the heavier species to migrate toward the deflection wall 101, away from the center channel 244 of the twin skimmer nozzle 260. Due to the supersonic velocity of the gas, shock structures or standing pressure waves are formed off of the tips of the deflection skimmer 264 and the expansion skimmer 262. These shock structures encourage the flow already along the expansion wall 109 and deflection wall 101 to continue flowing in that direction through the channel exit 242, while the center path through the shock structures and the channel exit 242 accumulates higher mass species due to momentum required to pass through the overlapping shock structures. Thus, the twin skimmer nozzle 260 has three separate outputs: a first heavy steam of the most pure separated gas collected at a twin skimmer deflection diffuser 204, a second heavy stream at the center diffuser 266 via the center channel 244, and a light stream collected at an a twin skimmer expansion diffuser 205.

4.4 Nozzle Plate

Figure 3A:
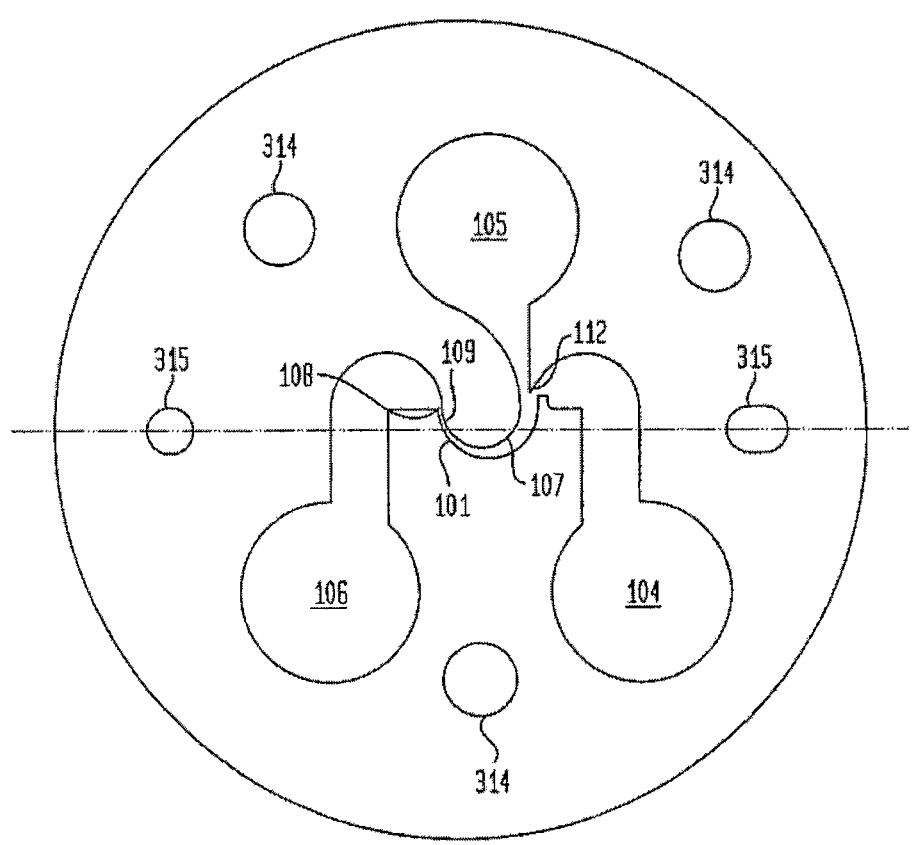
FIG. 3a is a perspective view of a single Type-2 separation nozzle confided into an embodiment of a nozzle plate.

FIG. 3a is a perspective view of an embodiment of the Type-2 nozzle 200 geometry configured into a nozzle plate 300. The nozzle plate 300 in this embodiment is depicted as a circular plate, although other shapes are readily adaptable using the knowledge of one of ordinary skill in the art. In one embodiment, the nozzle plate 300 material is selected to be substantially thermal or heat-conductive. The overall thickness of the nozzle plate 300 is adapted to be a ratio relative to the nozzle throat 108 such that the area of the nozzle throat 108 determines the mass flow rate of the gas, based on the density, pressure, and temperature of the gas as known to those of ordinary skill in the art.

The nozzle plate 300 comprises features typified by an embodiment of the Type-2 nozzle 200, such as an inlet gas reservoir 106, a deflection diffuser 104, an expansion diffuser 105, an expansion wall 109, an expansion nozzle exit 107, a deflection wall 101, and a skimmer 112. The nozzle plate 300 further comprises mounting bolt holes 314, and locating pin holes 315. In this embodiment, the nozzle plate 300 comprises a trio of mounting bolt holes 314 and a pair of locating pin holes 315. The locating pin holes 315 are adapted using techniques known to those of ordinary skill in the art to locate within a desired tolerance, each nozzle plate 300 relative to other structures surrounding the nozzle plate 300, including other adjoining nozzle plates 300 (not shown in FIG. 3a) that are assembled to increase the overall height of the separation nozzle. Similarly the mounting bolt holes 314 are placed and fabricated with sufficient tolerance to allow bolts or other fasteners to be run through the mounting bolt holes 314 of each nozzle plate 300 and other mounting structures that have been located by locating pins placed through the locating pin holes 315. The bolts that run through the mounting bolt holes 314 of the embodiment depicted provide compressive forces to the nozzle plate 300 to assist in forming an effective seal with other nozzle plates 300 and other supporting structures while the locating pins that are inserted within the locating pin holes 315 laterally constrain movement of the nozzle plate 300. Persons of ordinary skill in the art may adapt the embodiment of locating pin holes 315 and mounting bolt holes 314 to accomplish different goals, and in some embodiments even remove the either or both of the locating pin holes 315 and mounting bolt holes 314.

The nozzle plate 300 is fabricated using techniques known to those of ordinary skill in the art, including fabrication processes such as machining, electro-discharge machining, laser ablation machining, forming, forging, extruding, and photo-lithographic etching. Fabrication processes that result in close-tolerances and smooth surfaces are desirable, and in the case of smaller separation nozzle embodiments, advantages are gained from the electro-discharge and etching processes has additional utility. The nozzle plate 300 in one embodiment uses a relatively highly thermally conductive material to enhance temperature control of the nozzle surface and, in some embodiments, allow heat transfer to occur between the nozzle plate 300 and the process gas contained within the separation nozzle.

4.4.1 Twin Nozzle Plate

In another embodiment of the present system and method, a pair of separation nozzles are integrated into a single nozzle plate, in a twin nozzle plate 330 configuration, an embodiment of which is depicted in FIG. 3b. The twin nozzle plate 330 comprises a left Type-1 nozzle 340 and right Type-1 nozzle 342 that are both embodiments of the Type-1 nozzle 100 with adaptation for use in a twin nozzle plate 330 configuration.

The left Type-1 nozzle 340 and the right Type-1 nozzle 342 are both embodiments of a general Type-1 nozzle 100 configured with a shared heavy diffuser 344. The right Type-1 nozzle 342 is a mirror of the left Type-1 nozzle 340 and thus the respective left separation flow path 350 and right separation flow path 352 are oriented so the gas flows together to a common center where the shared heavy diffuser 344 is placed. In another embodiment, the left Type-1 nozzle 340 and right Type-1 nozzle 342 share a combined inlet reservoir (not shown) such that the respective nozzle inlet gas reservoirs 106 are combined into a single shared or combined inlet reservoir where inlet process gas enters the separation nozzle and flows into the nozzle throat 108.

The embodiments of the left Type-1 nozzle 340 and right Type-1 nozzle 342 depicted in FIG. 3b in one embodiment are adapted for the separation of a silicon process gas, such as silane ($SiH_4$). In this application embodiment, the pressure at the inlet reservoirs 106 is approximately 60 psig. The nozzle throat 108 in this embodiment has a cross-sectional area measured at its narrowest point with a planar width of about 0.0065" along the dimension (A-A') shown in FIG. 3b, and a height of about 0.195" (B-B'). The expansion nozzle 102 tapers continuously from the nozzle throat 108 through an angle ($\alpha_{exit}$) of about 130 degrees at the expansion nozzle exit 107. The expansion nozzle exit 107, in the embodiment depicted, has a planar width of about 0.0115" along the dimension (B-B') and a height of about 0.195".

In these embodiments the channel height of the left Type-1 nozzle 340 and right Type-1 nozzle 342 is a constant defined by the thickness of the twin nozzle plate 330. The top and bottom surfaces of the left Type-1 nozzle 340 and right Type-1 nozzle 342 are defined by the interior surfaces of a top plate (not shown) and a bottom plate (not shown) that are affixed to the upper and lower surfaces of the twin nozzle plate 330 via one or more mounting bolt holes 314 or other means for affixing and bonding such plates known to those of ordinary skill in the art.

When the process gas enters the expansion nozzle 102, there is a short period of turbulent transition upon entry past the nozzle throat 108. However, this initial turbulence quickly smoothes out and the flow begins to accelerate with differential velocities developing across the throat dimension 110 due to viscous wall effects within the nozzle throat 108 and within the expansion nozzle 102 for the first several degrees down the flow path through the first angle ($\alpha$) of about 45 degrees. As the flow through the expansion nozzle 102 fully develops toward the nozzle throat or expansion nozzle exit 107, a relatively high Mach flow is generated and maintained in the core of the flow so the magnitude of the mean velocity vector of the flow near the expansion nozzle exit 107 is greater than Mach 1.0. As described above, the flow of the process gas within the expansion nozzle 102 is substantially nonseparated without any substantial or significant recirculation due to the full expansion of the process gas within the expansion nozzle 102.

As can be readily seen by those of ordinary skill in the art, a variety of nozzle plate configurations comprising multiple separation nozzles of the various separation nozzle types presented herein are combinable. In one illustrative example, a penta-nozzle plate comprises five separate Type-2 nozzles 200 thereby enabling a single nozzle assembly comprising penta-nozzle plates to provide five separate separation nozzles for use. Other configurations of multiple separation nozzles, including separation nozzles of various embodiments and configurations adapted to a variety of flow rates are readily adapted by those of ordinary skill in the art.

4.5 Nozzle Module

Figure 4A:
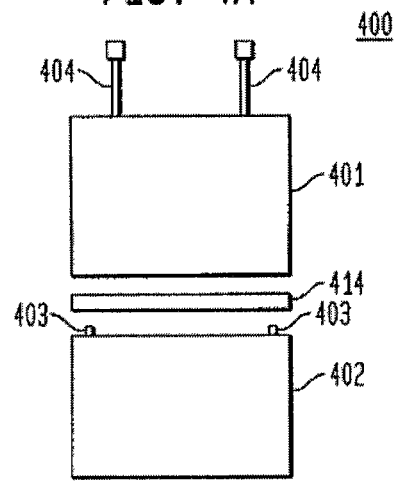
FIG. 4a is a perspective side-view of an embodiment of a separation nozzle module.

FIG. 4a is a perspective side-view of an embodiment of a nozzle module 400. The nozzle module 400 is used to mount a nozzle plate assembly 414 and provide fluidic and thermal connections to the separation nozzle. The nozzle plate assembly 414 is comprised of one or more nozzle plates 300 that are aligned via the locating pin holes 315 and mounting bolt holes 314 such that the desired overall separation nozzle thickness is achieved. The nozzle module is further comprised of an upper module end 401, a lower module end 402, fastening bolts 404, and the nozzle module locating pins 403. The nozzle module locating pins 403 and the locating pin holes 315 in nozzle plates 300 that comprise the nozzle plate assembly 414 are adapted to provide a locating fit the individual nozzle plates 300 and the lower module end 402. In other embodiments, the module locating pins 403 continue through the nozzle plate assembly 414 and also locate the upper module end 401. In the embodiment depicted in FIG. 10, the nozzle module 400 is formed into a substantially canister shaped package. In this manner a canister or nozzle module 400 forms a separation nozzle assembly that provides the separation nozzles assembled into a modular element that is suitable for connection to external fluid handling devices or pre- and post-processing elements such as a pre-conditioning system like the nucleate generation conditioning system 2500 shown in FIG. 24.

The fastening bolts 404 in the embodiment depicted are adapted to freely run through the mounting bolt holes 314 on the nozzle plates 300 that comprise the nozzle plate assembly 414 and fastening into threaded holes in the lower module end 402. In other embodiments the fastening bolts 404 are through bolts that are tightened via an external threaded nut. Persons of ordinary skill in the art recognize that other methods are available for fixing the upper module end 401 to the nozzle plate assembly 414 and the lower module end 402, including for example, crimping, welding, soldering, brazing, taping, gluing, diffusion bonding, cementing, epoxies, adhesives, cam locks, and spring loading.

In one embodiment, the nozzle module 400 is fabricated from a relatively thermally conductive material, and the upper module end 401 and lower module end 402 are adapted to contain and seal the nozzle plate 300 against high-pressure or vacuum leaks. In still other embodiments, the upper module end 401 and the lower module end 402 are adapted to include a thermal management system to control the heat transfer from the nozzle module 400. The thermal management system in one embodiment comprises a series of passages within or in a thermally conductive wrapping around the nozzle module 400 to remove or transfer heat from the nozzle module 400. In another embodiment, the thermal management system includes a series of radiators or other passive, and semi-passive cooling systems. In still another embodiment, the thermal management system includes resistive heaters. In yet another embodiment, combinations of the foregoing and other heat transfer systems known to those of ordinary skill in the art are used to manage heat flow to and from the nozzle module 400.

Figure 4B:
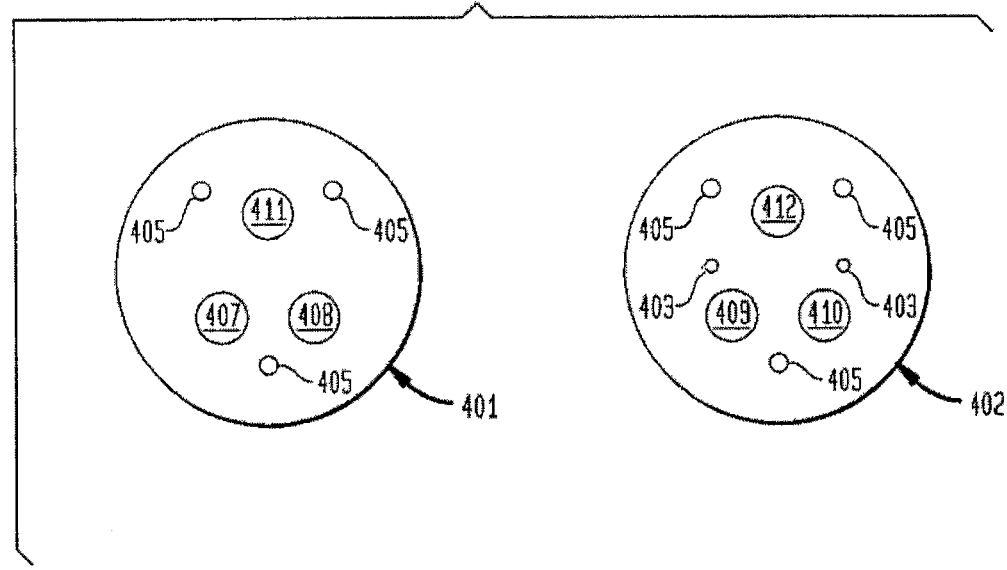
FIG. 4b is a perspective top-side view of an embodiment of the elements of a separation nozzle module assembly incorporating a Type-2 separation nozzle.

FIG. 4b shows two views of embodiments of the upper module end 401 and lower module end 402 of the nozzle plate assembly 414. The upper nozzle module end 401 is fabricated from thermally conductive material, and comprises three reservoir ports; the inlet reservoir port 407, the heavy reservoir port 408, and the light reservoir port 411. Each of the reservoir ports 407, 408, and 411 are fitted for pipe fittings at the top of the upper module end 401, and below each fitting of each of the reservoir ports, 407, 408, and 411 pass through the length of the upper module end 401 and exit the upper module end 401 at its bottom or lower face that when assembled with the nozzle module 400 abuts the upper surface of the nozzle plate assembly 414.

The lower module end 402 similarly comprises three ports, the lower inlet port 409, the lower light port 412, and the lower heavy port 410 that align with the respective inlet gas reservoir 106, the deflection diffuser 104, and expansion diffuser 105 present in the nozzle plate 300 that comprise the nozzle plate assembly 414. In one embodiment, only the lower heavy port 410 is machined for a tube fitting, while the lower inlet port 409 and the lower light port 412 are sealed to atmosphere. In other embodiments, various combinations of open and closed ports are available to those of ordinary skill in the art and adapted based on knowledge of the overall separation equipment configuration and routing of process gas flows.

When the nozzle plate assembly 414, the upper module end 401, and lower module end 402 are assembled in a suitable fashion to form the nozzle module 400, it can be seen that the inlet reservoir port 407, heavy reservoir port 408 and light reservoir port 411 are in direct fluid contact with inlet gas reservoir 106, deflection diffuser 104 and expansion diffuser 105 of the nozzle plate 300 that comprise the upper surface of the nozzle plate assembly 414. Similarly, the corresponding lower heavy port 410, lower light port 412, and lower inlet port 409 the lower module end 402 are also in direct fluid contact (i.e. fluidicly coupled) with inlet gas reservoir 106, deflection diffuser 104 and expansion diffuser 105 of the nozzle plate 300 that comprise the lower surface of the nozzle plate assembly 414. In this manner, inlet gas that enters the inlet reservoir port 407 of the upper module end 401, flows down the length of the upper module end 401 and feeds the inlet gas reservoir 106 of the nozzle plate assembly 414, and continues to fill the lower inlet port 409 of the lower module end 402. The combined volume of the lower inlet port 409, the inlet reservoir port 407 and the inlet gas reservoir 106 of the nozzle plate assembly 414 form a buffer for the inlet process gas flowing into the system. In operation, this volume of process gas is pressurized to the pressure level of the inlet gas, and is contained within a thermally conductive surrounding, and feeds the expansion nozzle 102 via the nozzle throat 108 within the nozzle plate assembly 414, formed of one or more nozzle plates 300. Gas from the inlet gas reservoir 106 flows through the separation nozzle formed within the nozzle plate 300 and is separated into two fraction flows, one at the deflection diffuser 104 and one at the expansion diffuser 105. The deflection diffuser 104, is fluidicly connected to the lower heavy port 410 and the heavy reservoir port 408, allowing the product collected from the separation nozzle to fill the space formed by these three elements. Similarly, the expansion diffuser 105 is fluidicly connected to the lower light port 412 and the light reservoir port 411, there the three elements of the nozzle module 400 form a chamber for collection of that portion of the process gas that is collected from the separation nozzle at the expansion diffuser 105. Fresh process gas is inlet into the nozzle module 400 via the inlet reservoir port 407. The products of the separation nozzle are collected via the respective light ports (411, 412) and heavy ports (408,410).

5 Nozzle Flow

There are multiple means known to those of ordinary skill in the art to estimate the performance of the present embodiments of separation nozzles. These means include use of first principles to estimate flow parameters, experimental methods and computational methods such as computational fluid dynamics (CFD) modeling. Persons of ordinary skill in the art utilize the results from this variety of sources to configure an embodiment of a separation nozzle to achieve desired expansion ratios and velocity by controlling separation nozzle configuration and separation nozzle state, and the state of the incoming gas. Provided herein are a series of results from CFD analysis to assist persons of ordinary skill in the art in understanding some elected embodiments of the present device, system and method.

5.1 Modes of Operation

The various embodiments of the present separation nozzle as described herein is adaptable for operation in two distinct modes of operation by adjustment of the separation nozzle design and the state of the process gas passing through the separation nozzle. As previously described the flow of the process gas through the separation nozzle can be adjusted by controlling various parameters or states of the separation nozzle itself such as the pressure applied to the process gas at the inlet gas reservoir 106 and the backpressure applied to the separation nozzle at the expansion diffuser 105 and deflection diffuser 104 as well as the temperature of the separation nozzle itself. In still other embodiments, the state of the process gas is also modulated by conditioning the process gas using various means, including mechanical filtration or by adding or removing heat from the process gas to adjust the process gas temperature. By adjusting these various parameters in consideration of the process gas state, one of ordinary skill in the art is allowed to control the modes of operation of the present system as well as modulating the separation performance of the separation nozzle and the fraction cut obtained from the skimmer 112. Significant variations in the performance of the separation nozzle are obtained by switching or adjusting between a first mode of operation, or aero-momentum mode of operation, and a second mode that utilizes condensation enhanced separation effects to improve separation performance. In the first mode of operation, the separation nozzle design and process gas state are modulated to achieve the desired expansion within the expansion nozzle 102 and desired velocity of the process gas along the separation flow path 130. In the first mode of operation, enhanced velocity and resulting separation effects are achieved via the thermal management of the nozzle plates 300, via control of the nozzle plate assembly 414.

Specifically, reducing the temperature of the nozzle plate 300 and bottom surface of the upper module end 401 and upper surface of the lower module end 402 result in improved aerodynamic performance and increases the overall velocity of the resulting flows thus improving separation performance for the various embodiments of the separation nozzles. See, for example, embodiments of the Type-1 nozzle 100 depicted in FIG. 5b and FIG. 5c, where the nozzle side and top walls are simulated cooled to minus twenty-five degrees centigrade (−25 C) with either ambient process gas (about 27 C) in the case of the embodiment results in FIG. 5b, or heated process gas (about 100 C). In both of these embodiment results, the overall velocity of the process gas through the Type-1 nozzle 100 were increased versus the results for the embodiment using an ambient nozzle and ambient process gas (temperature at the inlet gas reservoir 106 equals 549° R) shown in FIG. 5. Similar results are obtained and presented for the results for embodiments of the Type-2 nozzle 200, shown in FIGS. 7a, 7b, and 7c that correspond to the similar conditions as those found in FIGS. 5, 5b, and 5c respectively.

In still another embodiment of the present separation nozzle separation of the process gas is further enhanced with respect to certain constituents by applying an electro-magnetic field across the separation flow path 130. In one aspect, the electro-magnetic field is applied across the entire separation flow path 130 from the nozzle throat 108 to the separation skimmer 112. In another aspect the electro-magnetic field is applied across a select portion of the separation flow path 130. In either aspect the electro-magnetic field exerts a body force on one of the constituents that is oriented to further enhance the aerodynamic and centripetal forces applied to the constituent thereby further enhancing the separation of the constituents of the process gas.

5.2 CFD Analysis

The following sections present results from Computational Fluid Dynamics (CFD) analysis of Type-1 nozzle 100 and Type-2 nozzle 200 embodiments. These CFD results related to specific embodiments of the nozzles are to assist a person of ordinary skill in the art to understand the pertinent flow and temperature characteristics within some exemplary embodiments of the present separation device nozzles and related separation methods.

5.2.1 CFD Analysis of Embodiment of Type-1 Nozzle 100

Figure 5:
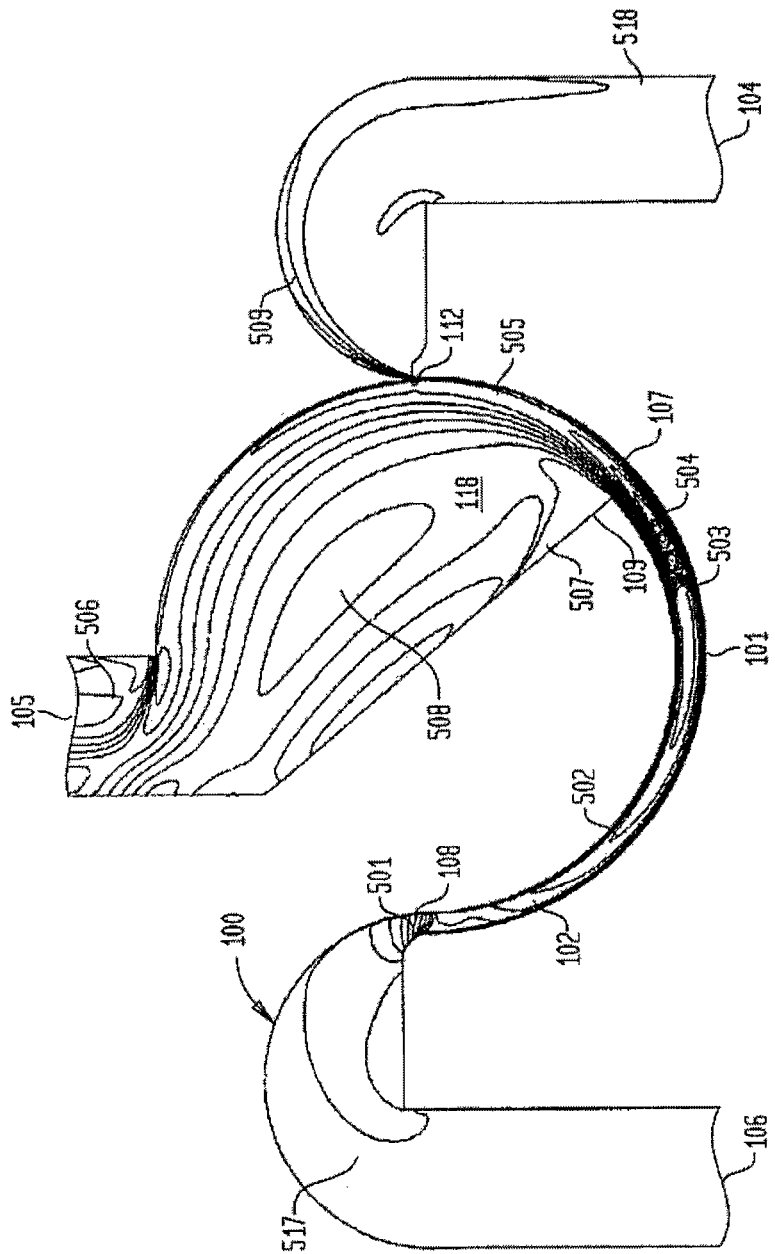
FIG. 5 is a view of the results of Computational Fluid Dynamics (CFD) analysis of gas flow mach velocity through an embodiment of a Type-1 nozzle with ambient process gas and ambient nozzle.

FIG. 5 is a depiction of the results of CFD analysis of gas flow velocity (mach) through an embodiment of a Type-1 nozzle 100 with the separation gas being standard air at an inlet pressure of 60 psig and diffuser outlet (both deflection diffuser 104 and expansion diffuser 105) pressures of 10 psig each. The nozzle is held at 549° R and the gas is held at 490° R, which with respect to all of the CFD analyses presented herein is considered to be ambient temperature for the nozzle and gas respectively. FIG. 6 is the same analysis of FIG. 5, however the results depict temperature contours and high-lighting the temperature drop within the expansion nozzle 102 and subsequent recovery in the over-expansion region 118 and expansion diffuser 105 and deflection diffuser 104.

The embodiment of the Type-1 nozzle 100 analyzed in this series of results, has an expansion nozzle exit 107 at an angle ($\alpha_{exit}$) of about 120° degrees. The gas expansion ratio for modeled expansion nozzle 102 of FIG. 5 is about 1.764. Other pertinent dimensions for the Type-1 nozzle 100 modeled in the CFD analysis detailed in FIG. 5 and FIG. 6 include the following: the nozzle throat 108 is 0.0178" wide; the expansion nozzle exit 107 is about 0.0314"; and, the height of the Type-1 nozzle 100 is about 0.025".

Referring now to FIG. 5, from the depiction, it can be seen that the gas entering the inlet gas reservoir 106 at the described temperature and pressure, has a mach velocity value M=0.05 at the gas inlet leading up to point 517. From the inlet gas reservoir 106 gas flows through the nozzle throat 108 at M=1.01 at point 501, and begins the expansion of the gas through the expansion nozzle 102, so that at point 502 the gas is M=1.46, and continuing to point 503 the gas attains the maximum mach value for the Type-1 nozzle 100 at M=1.68 where the gas flow encounters a shock front denoted by the rapid deceleration of the gas at point 504 M=1.21 just before the expansion nozzle exit 107 which is set at an angle ($\alpha_{exit}$) equal 130° in the nozzle. Shock generated in supersonic flows are thin pressure areas that develop through flow going through turbulent zones developed from gas friction on boundaries and downstream stagnation pressure before the gas flow. In the case of this particular depiction, the boundaries are the sidewalls comprised of the deflection wall 101 and the expansion wall 109, and the pressure downstream of the expansion nozzle exit 107 is a result of the slow gas in the stagnation zone or over-expanded region 118. This particular CFD depiction shows results of a two-dimensional simulation, where the boundary effects from the 'floor' and 'ceiling' are not taken into account in estimating the flow through the Type-1 nozzle 100.

In this particular embodiment of the Type-1 nozzle 100 at these flow conditions, the expansion nozzle 102 is not fully aerodynamically expanded through the entire length of nozzle as evidenced by the shock structures that form between point 503 and point 504 within the expansion nozzle 102 prior to the expansion nozzle exit 107. In this case, the gas expansion ratio for the modeled Type-1 nozzle 100 expansion nozzle 102 of FIG. 5 is about 1.764, which under this conditions results in a slightly under-expanded or choked aerodynamic flow condition within the extents of the geometric expansion nozzle 102 prior to the expansion nozzle exit 107. Although a portion of the flow of the process gas within the expansion nozzle 102 is somewhat choked or under-expanded, a majority of the process gas flow along the separation flow path 130 within expansion nozzle 102 is fully expanded.

Beyond the expansion nozzle exit 107, the mach value of the process gas flow further dissipates at point 505 to M=0.85, wherein a fraction of the gas flow goes through the skimmer 112 and slows at point 509 to M=0.40, and that fraction of gas is extracted from the Type-1 nozzle 100 through the deflection diffuser 104 where the mach velocity at point 518 is M=0.05. The other fraction of the gas flow that is deflected inside of the skimmer 112, enters the stagnation zone or over-expanded region 118 and circulates to the expansion diffuser 104 with a mach velocity at point 506 being M=0.65. It may be noted that a small-velocity zone centers around point 508 where M=0.10 in the over-expanded region 118, and a smaller-velocity pocket at point 507 being M=0.005 exists off of the edge of the expansion nozzle exit 107. The smaller-velocity pocket at point 507 is indicative of a flow separation region wherein the process gas continuing along the separation flow path 130 separates away from the expansion wall 109 after the sharp increase in the geometric expansion ratio after crossing the expansion nozzle exit 107.

FIG. 6 is a depiction of the CFD results of the process gas flow temperature values through this same embodiment of the Type-1 nozzle 100 correlating to the mach values, and process gas and nozzle states of the results shown in FIG. 5. In this depiction for static temperature in the Type-1 nozzle 100 for temperature values, it is shown that the static temperature changes through the nozzle and compares well to the mach velocity profile of FIG. 5. In this depiction in FIG. 6, gas flows into the inlet gas reservoir 106 at a temperature of 549° R and maintains that temperature through the separation nozzle between the inlet gas reservoir 106 to the nozzle throat 108, including at point 601. Just prior to the nozzle throat 108, the gas begins reducing in temperature at point 602 where T=459° R and begins expanding through the nozzle throat 108 where the gas further reduces in temperature at point 603 at T=449° R. As the expansion flow gains velocity (supersonic) beyond the nozzle throat 108, a large reduction in static temperature develops, where at point 604 being T=386° R and a super-cooled core region in the gas begins formation as seen at point 605 where T=373° R and the core is bordered on either side by fractions of the flow shown at point 604 being T=386° R.

Gas flow in the Type-1 nozzle 100 in the embodiment depicted encounters the shock front as shown at point 606 where T=494° R, a temperature recovery is shown, just before the expansion nozzle exit 107. Downstream of expansion nozzle exit 107, the gas flow largely increases in temperature as depicted at point 607 where T=517° R and continues through to the expansion diffuser 105 and to the deflection diffuser 104 where T=524 at both points 609 and 608.

5.2.2 CFD Analysis of Embodiment of Type-2 Nozzle 200

Figure 7A:
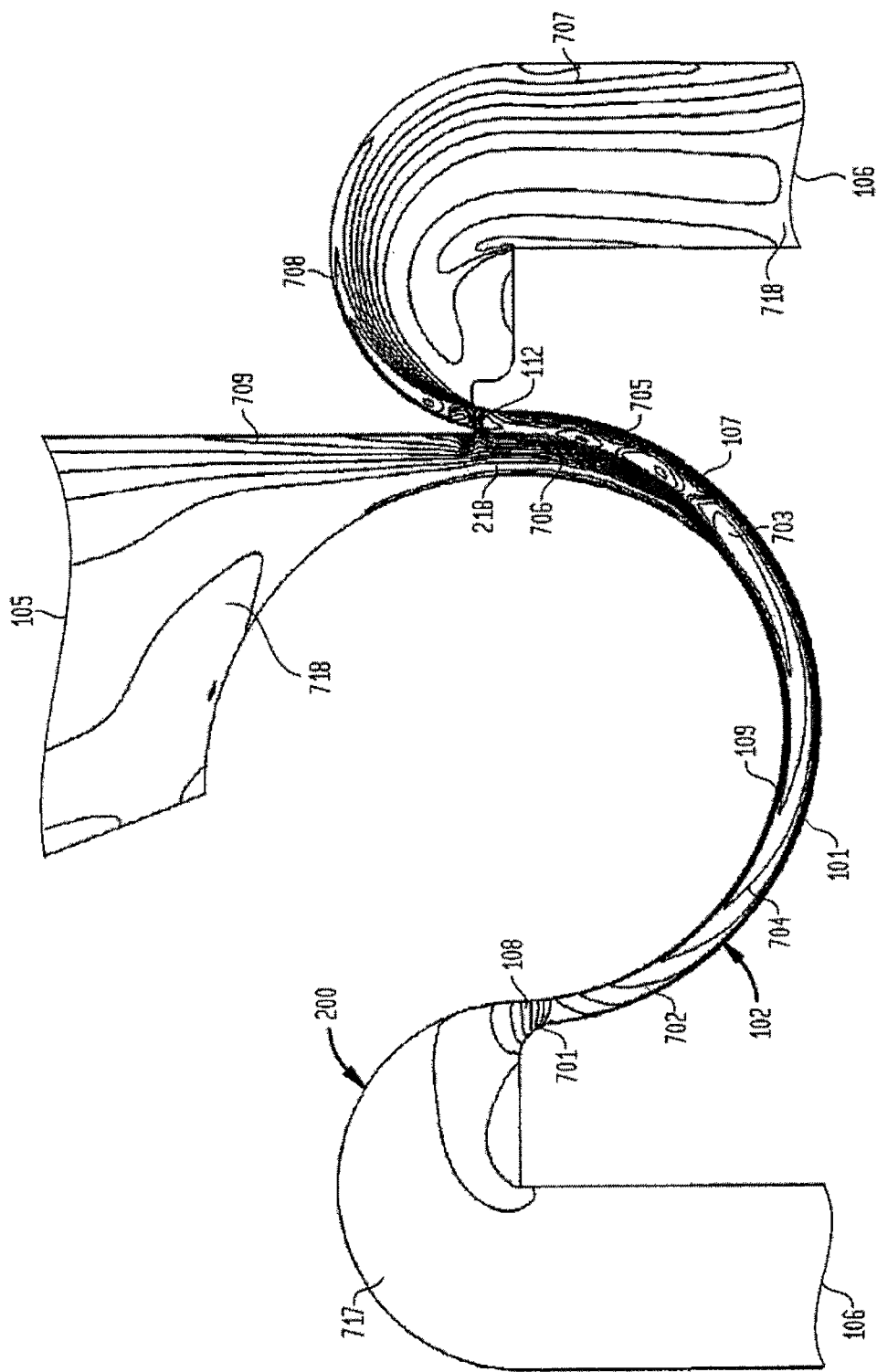
FIG. 7a is a view of the results of Computational Fluid Dynamics (CFD) analysis of gas flow mach velocity through an embodiment of a Type-2 nozzle with ambient process gas and ambient nozzle.
Figure 7B:
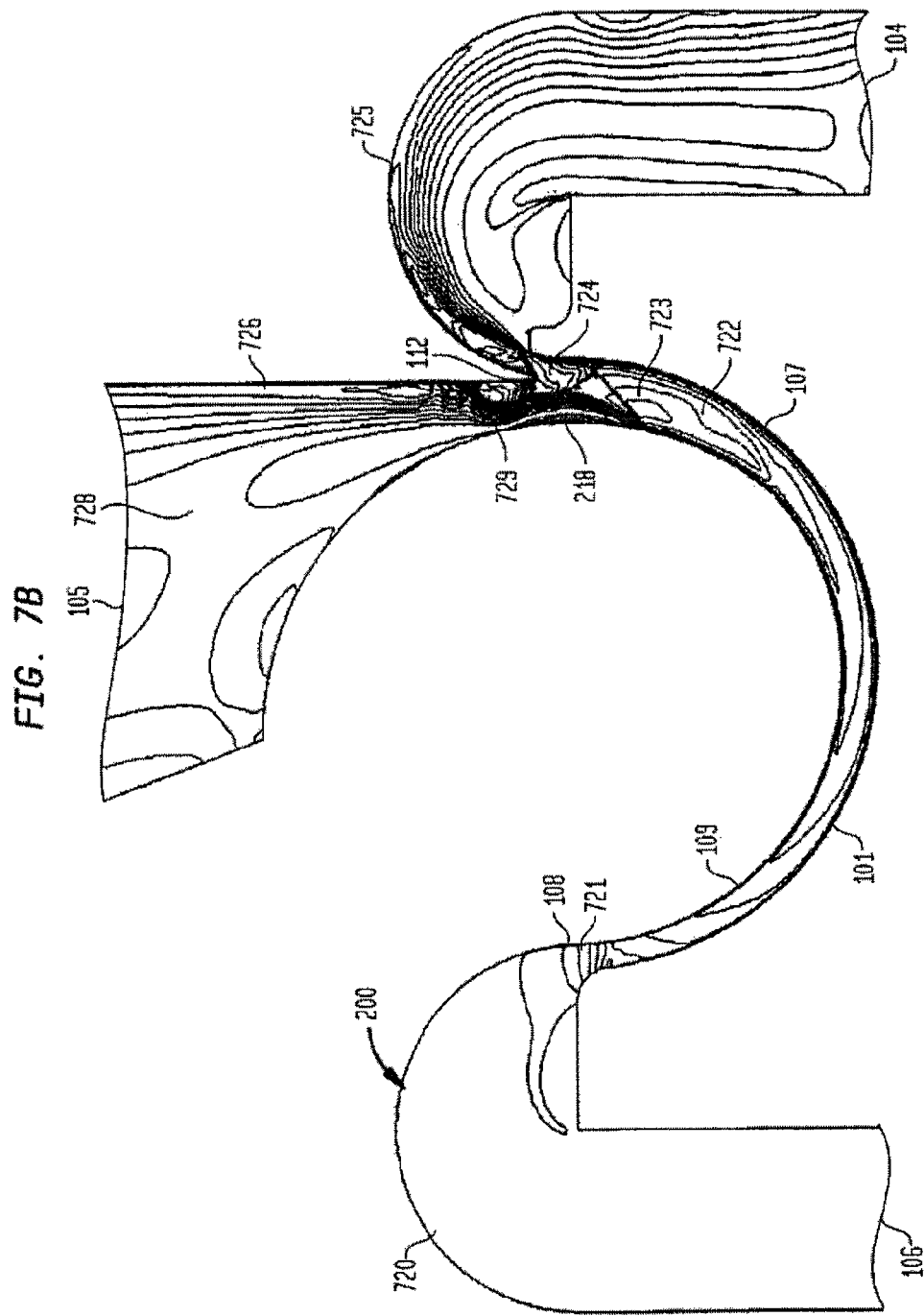
FIG. 7b is a view of the results of Computational Fluid Dynamics (CFD) analysis of gas flow mach velocity through an embodiment of a Type-2 nozzle with cooled nozzle and ambient process gas.

FIGS. 7a, 7b, 7c and 7d present the results of CFD analysis of gas flow velocity (mach) through an embodiment of a Type-2 nozzle 200 at four different nozzle and process gas states. A summary of the four different nozzle and process gas states, each representing a different simulation scenario, is provided in the table below:

| Figure # | Nozzle Temperature | Gas Temperature | Gas Composition | Inlet Gas Reservoir 106 Gas Pressure |
| --- | --- | --- | --- | --- |
| Fig. 7a | 549° R | 490° R | $O_2$ (20%) \| $N_2$ (80%) | 60 psig |
| Fig. 7b | 434° R | 490° R | $CH_4$ (58%) \| $CO_2$ (42%) | 1050 psig |
| Fig. 7c | 434° R | 556° R | $CH_4$ (58%) \| $CO_2$ (42%) | 1050 psig |
| Fig. 7d | 434° R | 468° R | $CH_4$ (58%) \| $CO_2$ (42%) | 551 psig |

In all of the preceding four scenarios depicted in FIGS. 7a-7d respectively are simulated with the deflection diffuser 104 and the expansion diffuser 105 held at 10 psig.

Figure 8A:
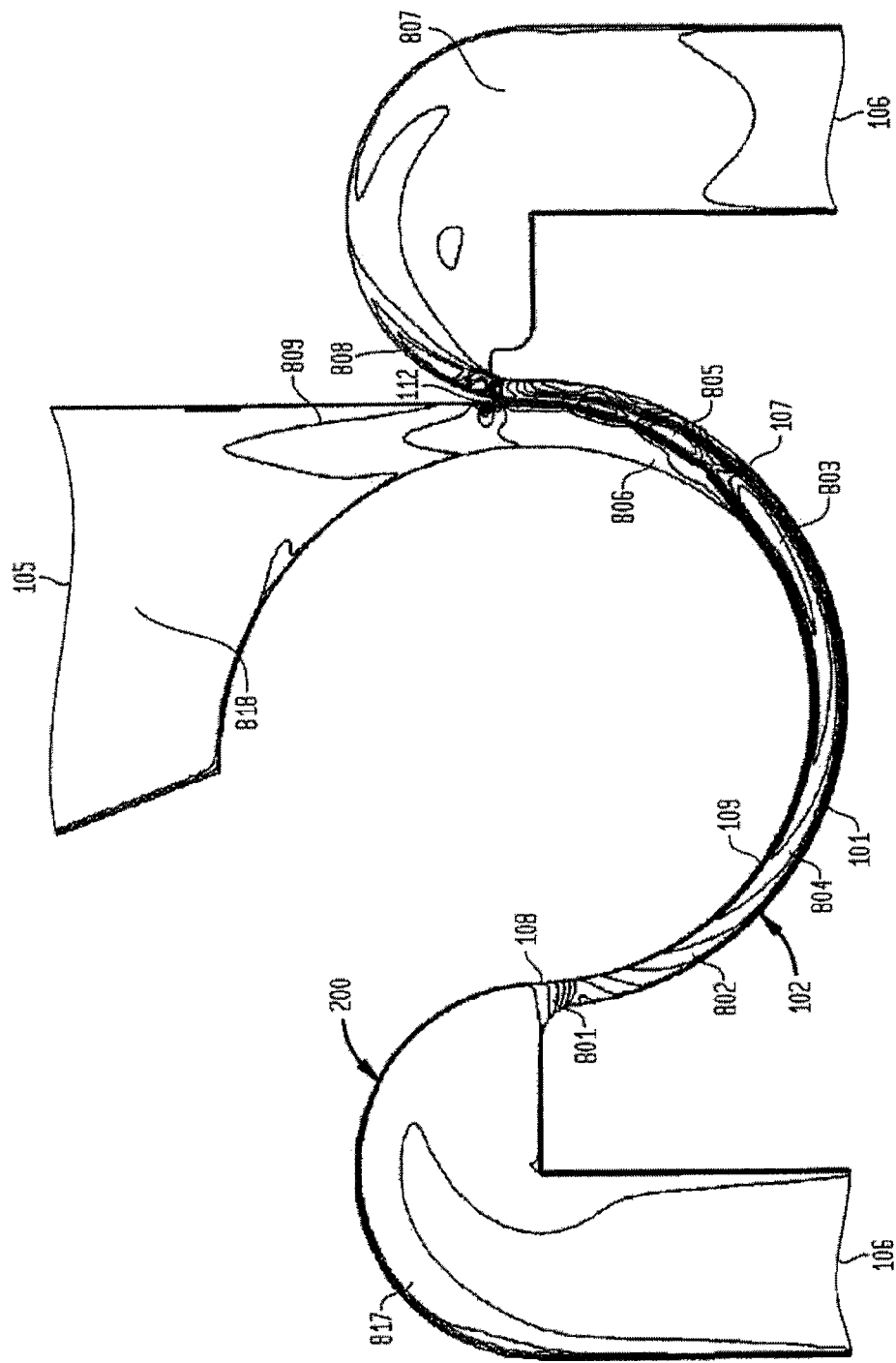
FIG. 8a is a three-dimensional CFD depiction of temperature through an embodiment of a Type-2 nozzle with ambient process gas and ambient nozzle.

FIG. 8a is the same analysis of FIG. 7a, depicting temperature contours and highlighting the temperature drop within the expansion nozzle 102 and subsequent recovery in the over-expansion region 118 and expansion diffuser 105 and deflection diffuser 104. The embodiment of the Type-2 nozzle 200 analyzed in this series of results, has an expansion nozzle exit 107 at an angle ($\alpha_{exit}$) of about 130° degrees. The use of computational fluid dynamics (CFD) software, allows the inspection of a configured geometry for anticipated flow effects that may then be seen in a fabricated device.

FIG. 7a is a three-dimensional CFD depiction for mach velocity of a simulation scenario for an embodiment of a Type-2 nozzle 200. This CFD simulation adjusts the thermodynamics of the depiction to have surface areas completely enclosing the nozzle geometry, in other words the simulation includes specific boundary effects caused by the upper module end 401 and lower module end 402 bounding the separation flow path 130. Type-2 nozzle 200 includes an inlet gas reservoir 106, a nozzle throat 108, an expansion nozzle 102, an expansion wall 109, a deflection wall 101, an expansion nozzle exit 107, a separation skimmer 112, an expansion diffuser 105, and a deflection diffuser 104.

It can be seen in the CFD depiction in FIG. 7a, that process gas enters the Type-2 nozzle 200 via the inlet gas reservoir 106 and at point 717 the gas has a velocity of M=0.092, indicating that the gas is nearing stagnation at its current pressure. Gas flow through the nozzle throat 108 at point 701 the gas is at M=1.01, or attains a sonic condition, and as the gas expands through the expansion nozzle 102, contained within the boundaries of the expansion wall 109 and the deflection wall 101 and having a 'floor' and ceiling' being considered, the process gas gains mach velocity at point 702 where M=1.42 and point 704 where M=1.46. The results show the process gas attaining its maximum velocity at point 703 where M=1.53, just before the expansion nozzle exit 107. It can be seen in the CFD results that mach velocity does not dissipate below sonic value due to developing shocks, but reduces in sonic condition as seen at point 705 where M=1.05, up to the separation skimmer 112, and remains in a transsonic condition through the separation skimmer 112 through point 708 where M=1.01. Concurrent with the flow following the deflection wall 101 remaining in a sonic condition, it can also be seen that the gas streamline deflected inward of the separation skimmer 112 is characteristically sub-sonic at point 706 where M=0.5 and in the expansion diffuser 105 at point 709 where M=0.45.

Compared in FIG. 5 (CFD Type-1 nozzle 100), where maximum mach velocity in the Type 1 nozzle 100 is M=1.68, and the flow velocity dissipates to below sonic value before the separation skimmer 112, the gas flow in FIG. 7a (CFD Type-2 nozzle 200), is at maximum mach velocity in the Type-2 nozzle 200, yet maintains sonic value up to and through the separation skimmer 112. The maximum mach velocity differential between the Type-1 nozzle 100 and the Type 2 nozzle 200 can be interpreted, in part, as the effect of additional surface friction in the three-dimensional depiction in FIG. 7a caused by the upper surface and lower surface boundaries added to the separation flow path 130, and the improvement in mach velocity after the expansion nozzle exit 107 of the Type-2 nozzle 200 is attributed to the differences between the over-expanded region 118 or the Type-1 nozzle 100 compared to the gentler transition, or smaller Type-2 over-expanded region 218 characteristic of the Type-2 nozzle 200 embodiment geometry.

FIG. 8a is a corresponding depiction of CFD results for static temperature for an embodiment of the Type-2 nozzle 200 corresponding to the flow conditions depicted in FIG. 7a. The process of developing the some of the embodiments of separation nozzle depicted herein includes in some embodiments the goal of using the separation nozzle itself and the gas expansion process to control the temperature of the process gas. The previous CFD depictions shown in FIG. 5 and FIG. 7a indicate gas velocity at or above sonic value can be improved through geometrically changing the nozzle, and this increase in mach velocity further enhances the length of cooling within a separation nozzle to include expansion cooling from the nozzle throat 108 of expansion nozzle 102, up to and through the separation skimmer 112 of the embodiment of the Type-2 separation nozzle 200 depicted on the CFD results shown in FIG. 8a.

In FIG. 8a, the three-dimensional aspects has the inlet gas entering the Type-2 nozzle 200 at T=550° R through the inlet gas reservoir 106 and the temperature at point 817 is T=550° R. Inlet gas through the inlet gas reservoir 106 expands through the nozzle throat 108, and with the geometry of this embodiment of the Type-2 nozzle 200 being the same the CFD depiction shown in FIG. 7a, where the mach velocity value at point 701 is M=1.01, the corresponding point 801 of FIG. 8a has a static temperature value of T=465° R. Continuing the gas expansion through the expansion nozzle 102, static temperature at point 802 is T=417° R (mach value at point 703 FIG. 7a is M=1.42), wherein a cold core of gas begins to be evident beginning at the expansion wall 109 and moving to the center of the expansion nozzle 102, and that core gas exhibits maximum mach value FIG. 7a point 703 being M=1.53, and static temperature at FIG. 8a point 803 being T=379° R. As the core flow along the flow separation path 130 establishes in both mach velocity and static temperature, it can be seen in FIG. 7a and in FIG. 8a, that those values are slightly different on either side of the core flow, where mach velocity toward the expansion wall 109 at point 703 is M=1.10, and static temperature at the same position is T=417° R, and mach velocity toward the deflection wall 101 where M=1.42 and the static temperature at the same position is T=417° R.

As the core flow establishes in FIG. 7a and FIG. 8a at the expansion wall 109, it can be seen in the depictions that up to the expansion nozzle exit 107, the core flow centers in the expansion nozzle 102 and is substantially aligned with the separation flow path 130. Beginning at the expansion nozzle exit 107, and continuing to the separation skimmer 112, the core flow continues its migration toward the deflection wall 101, where the flow has the maximum mach velocity and lowest static temperature. It can also be seen in the depictions that a smaller mach velocity of M=0.5 and higher static temperature T=509° R is near the expansion wall 109, establishing two distinct gas streamlines. The depictions of FIG. 7a and FIG. 8a also show that the higher velocity and colder gas flow proceeds through the separation skimmer 112, where the static temperature of the separation skimmer 112 flow at point 805 is T=476° R and mach velocity at point 705 is M=1.05. Concurrently, the static temperature of the expansion diffuser 105 is at point 806 being T=509° R and mach velocity at point 706 being M=0.5.

It can also be seen in FIG. 8a and FIG. 7a, that the depictions indicate that the separation skimmer 112 divides the overall process gas flow so that the separation skimmer 112 extracts the higher velocity and lower temperature fraction of the gas. Further, the expansion diffuser 105 extracts the lower velocity and higher temperature fraction of the gas.

FIG. 7b is another three-dimensional CFD depiction of mach velocity of a simulation scenario for an embodiment of a Type-2 nozzle 200. The CFD simulation in FIG. 7b depicts the performance of a relatively cool separation nozzle handling ambient process gas at a relatively higher inlet pressure.

As shown in the depiction of CFD results in FIG. 7b, the process gas enters the Type-2 nozzle 200 via the inlet gas reservoir 106 and maintains a relatively slow velocity prior to the nozzle throat 108, at point 720 of Mach=0.05. Crossing through the nozzle throat 108, the process gas attains supersonic velocity around point 721 where M=1.01. The velocity increases through the expansion nozzle 102 generating a relatively large, high-speed core of process gas at point 722 where M=2.45 and point 723 where M=2.36. As shown in the results for this simulation scenario depicted in FIG. 7b, the process gas remains in an under-expanded to critically expanded regime for a longer period of time and the Type-2 over-expanded region 218 is reduced. Further, the process gas maintains supersonic velocities into the deflection diffuser 104 at point 725 where M=1.69 and the expansion diffuser 105 at point 726 where M=1.25 and at point 729 where M=2.45, until slowing at point 728 to M=0.15. In the depiction of CFD results for the scenario shown in FIG. 7b, the supersonic flow of the process gas is continued well into and past the separation skimmer 112.

FIG. 7c is another three-dimensional CFD depiction of mach velocity of a simulation scenario for an embodiment of a Type-2 nozzle 200. The CFD simulation in FIG. 7c depicts the performance of a relatively cool separation nozzle handling relatively hot process gas at a relatively high inlet pressure.

The CFD results for the simulation of a Type-2 nozzle 200 for a scenario depicted in FIG. 7c has the process gas entering the Type-2 nozzle 200 via the inlet gas reservoir 106 where it maintains a relatively steady, relatively low velocity, prior to the nozzle throat 108, such as around point 730 where M=0.25. As the process gas crosses into the expansion nozzle 102 via the nozzle throat 108 the velocity rapidly accelerates into the sonic regime at point 731 where M=1.16. Similar to the Type-2 nozzle 200 scenario depicted in FIG. 7b, the velocity of the process gas remains in the supersonic regime past the nozzle exit 107 were the process gas remains aerodynamically under-expanded to critically expanded and a reduced Type-2 over-expanded region 218 is manifest and where the process gas at point 732 is M=2.40 and at point 733 is M=2.48. Similarly, after the separation skimmer 112, the process gas within the deflection diffuser 104 at point 734 is M=1.40 and the process gas within the expansion diffuser 105 at point 735 is M=1.24 and at point 736 is M=0.16. Similar to the results in FIG. 7b, the process gas at point 737 is M=2.58, near the separation skimmer 112, while the process gas within the Type-2 over-expanded region 218 at point 738 is M=0.082.

Referring now to FIG. 7d, CFD derived velocity results for another simulation scenario are depicted where the process gas is relatively cool at 468° R and the body of the Type-2 nozzle 200 is also relatively cool at 434° R while the inlet gas has in let pressure of 551 psig. Similar to the other Type-2 nozzle 200 results depicted in FIGS. 7a-7c previously, the process gas is at a relatively low velocity, at point 740 where M=0.14, within the inlet gas reservoir 106 prior to entering the separation nozzle throat 108. Immediately after passing through the nozzle throat 108, the process gas reaches supersonic velocities, such as at point 741 where M=1.14. As the process gas passes along the separation flow path 130 (not shown on FIG. 7d) the overall velocity of the gas increases to M=1.78 at point 742 and after passing through the expansion nozzle exit 107, where M=2.20 at point 743 and M=2.37 at point 744. As before, the process gas under the conditions present in this scenario maintains substantially supersonic velocity past the expansion nozzle exit 107 thus reducing the overall volume of the Type-2 over-expanded region 218 where the velocity of the process gas is substantially reduced, such as at point 748 where M=0.07. As a result, the process gas is substantially supersonic/trans-sonic as it passes over the separation skimmer 112 and in fact maintains supersonic velocities into the deflection diffuser 104 at point 745 where M=1.63 and within the expansion diffuser 105 at point 746 where M=1.28, prior to losing velocity and slowing around point 747 where M=0.22.

FIG. 8b is the corresponding CFD results for the Type-2 separation nozzle 200 also shown in FIG. 7c that depicts temperature profiles within the separation nozzle. The process gas is at 556° R at point 750 after entering the separation nozzle via the nozzle inlet gas reservoir 106 prior to reaching the separation nozzle throat 108. After the process gas passes through the separation nozzle throat 108, the process gas expansion results in an immediate drop in temperature such that at point 751, the temperature is 477° R. The temperature rapidly drops due to aerodynamic expansion driven cooling of the process gas passing along the separation flow path 130 through the expansion nozzle resulting in a reduced temperature of 346° R at point 752 prior to passing through the expansion nozzle exit 107. Even after passing through the expansion nozzle exit 107, the process gas continues accelerating and cooling such that at point 753 the temperature of the process gas is 302° R. After passing through the separation skimmer 112 into the deflection diffuser, partial pressure recovery and corresponding reduction in velocity and temperature increase the temperature of the process gas at point 754 to 477° R. Similarly, on the expansion diffuser 105, the process gas increases at point 755 to a temperature of 461° R and at point 756 to a temperature of 522° R. A slightly lower temperature recovery occurs within the reduced Type-2 over-expanded region 218 at point 757 where the process gas has a temperature of 447° R.

Figure 15:
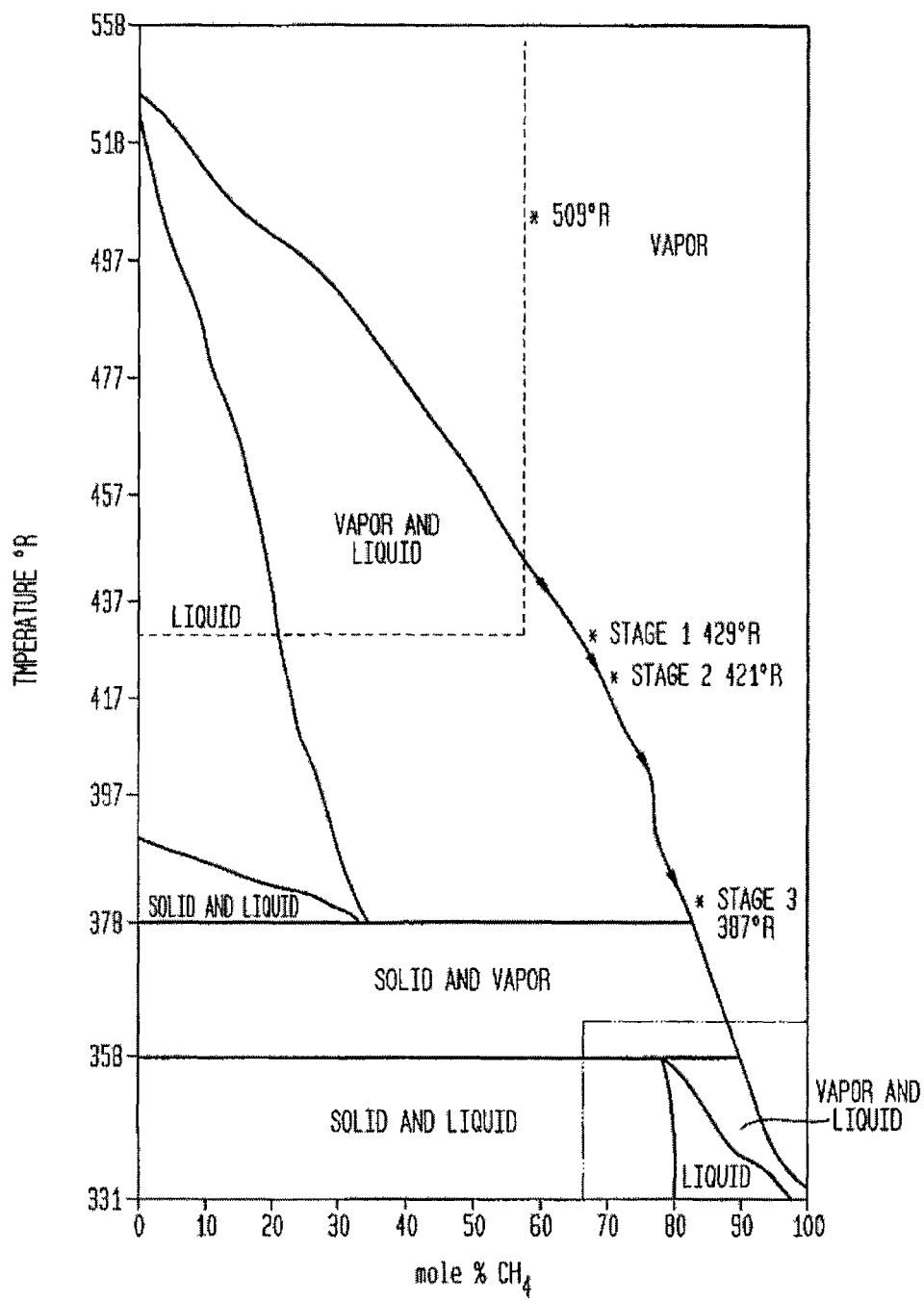
FIG. 15 is a phase diagram of a methane ($CH_4$) and carbon dioxide ($CO_2$) gas mixture.

Through the proceeding simulation results, separation processes, driven at least in part by higher velocity gas flow at the separation skimmer 112 is greater when the process gas temperature before the nozzle doesn't require extensive heat exchange, and that greater heat exchange is accomplished in the separation nozzle when the separation nozzle is refrigerated and held at a reduced temperature. Since in most applications, this separator nozzle will be used to condense a fraction of the flow, the nozzle in FIG. 8b has a tendency to provide a longer flow path at reduced temperatures, and the combination of the supersonic cooling with a refrigerated nozzle would likely reduce separation expense due to a smaller footprint that accomplishes the heat transfer. In the application for acid gas separation at elevated pressures with $CH_4$ as seen in FIG. 15, the heat-transfer within the nozzle over the entire range of the nozzle would produce condensing liquid, and between the nozzle throat 108 and the expansion nozzle exit 107 would result in fractions of the $CO_2$ forming solid particles. This degree of reduced temperature and phase onset allows the curvature of the nozzle necessary time to concentrate dense phase into the separation skimmer 112 flow and thus enhanced separation effects within the nozzle.

6 Nozzle Fabrication Method

FIG. 9 is a schematic view of a Type-2 nozzle 200 assembly, or more generally regardless of specific embodiment of separation nozzle utilized, an embodiment of a separation nozzle assembly 900, that is formed with several individual nozzle plates bonded together with an upper cover plate, or more generally an upper module end 401 and lower cover plate, or more generally a lower module end 402, to form a separator nozzle assembly 900. In this arrangement, several individual nozzle plates 300, being fabricated of a thin material, are stacked together, so that the geometry of each plate 300 is substantially aligned and positioned to form an nozzle plate assembly 414 comprising a number of nozzle plates 300 to form, in the embodiment depicted, a Type-2 nozzle 200 of greater depth than the thickness of any single nozzle plate 300.

In other embodiments, the nozzle plate 300 of the Type-2 nozzle 200 is fabricated from a single thicker material allowing the desired thickness Type-2 nozzle 200 to be formed as a completed nozzle plate assembly 414 comprising only a single nozzle plate 300.

An upper module end 401 is substantially aligned and positioned above the nozzle plate assembly 414, and a lower module end 402, is similarly centered and positioned below the nozzle plate assembly 414. In this arrangement, all of the nozzle plates 300 and the upper module end 401 and the lower module end 402, are assembled together to form the embodiment of the separation nozzle assembly 900 depicted in FIG. 9.

The various nozzle plates 300 and upper cover plate 401 and lower module end 402 are assembled by one of ordinary skill in the are using known processes, including for example, diffusion bonding, adhesives, welding in its various forms, brazing and sintering, among others to form a single sealed separation nozzle assembly 900. In some embodiments transverse bolts that compress the separation nozzle assembly 900 along its axis 904 further reinforce the separation nozzle assembly 900.

The formation of the separation nozzle assembly 900 is desirable when there is a need to have the tolerances of a nozzle very close. Using this assembly process, fabrication of nozzle plates 300 can be accomplished by photo-etching, or electron-discharge machining (i.e. EDM), or other technologies that work at thin material levels. In alternative embodiments, it is possible to use laser cutting, plasma etching or other cutting techniques known to persons having ordinary skills in the art appropriate for cutting parts as claimed herein to the designed geometry.

6.1 Heat Exchange Integration with Separation Nozzle Assembly 900

In some embodiments of the separation nozzle thermal management of the separation nozzles provides enhanced separation control as shown in the CFD analysis presented above, or as discussed below. In order to achieve this temperature control, a heat exchanger is useful. One embodiment of a heat exchanger is shown in relation to a nozzle module 400 in FIG. 10.

Figure 10:
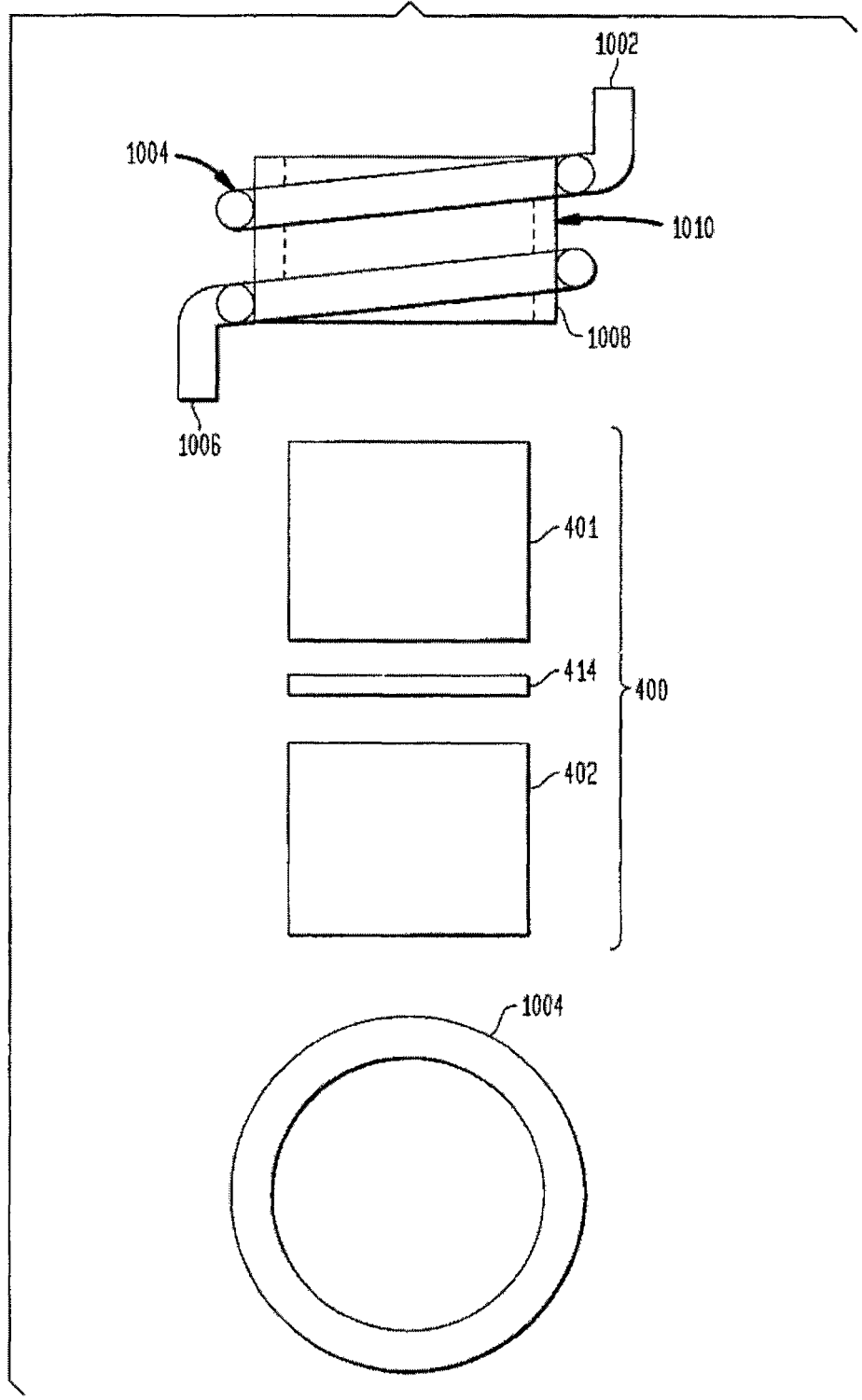
FIG. 10 is a schematic view of a nozzle module that has an integrated heat exchanger element.

The heat exchanger assembly 1010 in one embodiment is configured to slide over the outer surface of the nozzle module 400, such that the nozzle module 400 is in thermal contact with the heat exchanger assembly 1010 via multiple embodiments, including direct contact to the heat exchanger coils 1004, direct contact with a thermal diffuser sleeve 1008, shown in FIG. 10, or an intermediate layer such as a thermally conductive paste, thereby allowing heat to transfer between the nozzle module 400 and the heat exchanger coil 1004. The flow of refrigerant is inlet into the heat exchanger via the heat exchanger inlet 1006 and the warmed (or cooled depending on heat transfer direction) exits the heat exchanger via heat exchanger outlet 1002.

In this manner, adjusting either or both of the following two parameters, the temperature of a refrigerant that flows through the heat exchanger coil 1004 and the flow rate of the refrigerant allows the thermal regulation of the nozzle module 400 temperature. This allows the nozzle module 400 temperature to be lowered by removing heat via the heat exchanger coil 1004. In one aspect, the refrigerant flow through the heat exchanger coil 1004 is increased in flow, and the heat transferred from the nozzle module 400 to the refrigerant is increased by a temperature ratio.

In still another embodiment, not shown, the tubing the comprises the heat exchanger coil 1004 is replaced with integral cooling passages formed within the separation nozzle assembly 900 directly. In this embodiment, not shown, the nozzle plate 300 and upper module end 401 and lower module end 402 is fabricated with additional passages to enable the refrigerant to pass through the separation nozzle assembly 900 and remove heat directly without any need to establish a thermal contact between two discrete parts.

7 Materials

The separation nozzle disclosed herein are adaptable to fabrication using a number of different means by those of ordinary skill in the art based on the process gas, heat transfer, and thermal characteristics. In one embodiment various grades of stainless steel are adapted to form the separation nozzle based on the corrosion properties of the process gas, assembly process, desired outcome and other economic factors. In another embodiment, 316-series stainless steel is used to form the components of a separation nozzle.

In various embodiments disclosed herein, the fabrication of the nozzle plate 300 is performed using a variety of different processes known to those of ordinary skill in the art based on the necessary device tolerances, finish requirements, material qualities and other factors. In one embodiment the features of the separation nozzle are created in the nozzle plate 300 using electrical discharge machining (EDM). In another embodiment the features of the separation nozzle are created in the nozzle plate 300 using photolithic chemical etchant fabrication. In other embodiments fabrication processes of those of ordinary skill in the art include, but are not limited to: deep reactive ion etching, chemical etching, lithography, forging, punching, molding, laser cutting, water jet cutting, plasma cutting, mills, and saws.

8 Temperature Controlled Nozzle

As described above, FIG. 10 is a schematic of a nozzle module 400 that has an integrated heat exchanger element or more simply a heat exchanger assembly 1010. It can be seen in FIG. 10, that a nozzle module 400 is mounted and centered between an nozzle upper module end 401 and a nozzle lower module end 402, and that the nozzle module 400, comprising an upper module end 401, lower module end 402, and nozzle plate assembly 414. In the embodiment depicted all components of the nozzle module 400 are formed of a thermally conductive material to encourage the flow of heat from the nozzle module 400 to the heat exchanger assembly 1010. The heat exchanger assembly 1010 is fabricated to include a conductive surface or thermal diffuser sleeve 1008, and has a heat exchanger coil 1004, that has a heat exchanger inlet 1006 and a heat exchanger outlet 1002. The heat exchanger coil 1004 is in thermal contact with the thermal diffuser sleeve 1008 and in some embodiments is affixed to the thermal diffuser sleeve 1008 by means of brazing, welding, soldering, or adhesive.

The degree of available heat transfer leaving the nozzle module 400, being absorbed by the refrigerant and subsequently leaving with the refrigerant leaving the heat exchanger assembly 1010 through heat exchanger outlet 1002, is controllable by adjusting a number of refrigerant parameters and states, including, for example, the type of refrigerant used, the rate of flow of the refrigerant or the temperature of the refrigerant.

In one embodiment, a nozzle module 400 is held at a very low temperature. In this embodiment, the refrigerant flowing through the heat exchanger coil 1004 is a cryogenic gas or cryogenic liquid to maximize the heat flow from the nozzle module 400 to the heat exchanger assembly 1010. If the degree of cooling of the nozzle module 400 does not need to be in the cryogenic range, the refrigerant may be a condensed gas from the application process that is circulated from the separation process back to the nozzle module 400 via the heat exchanger assembly 1010.

Figure 11:
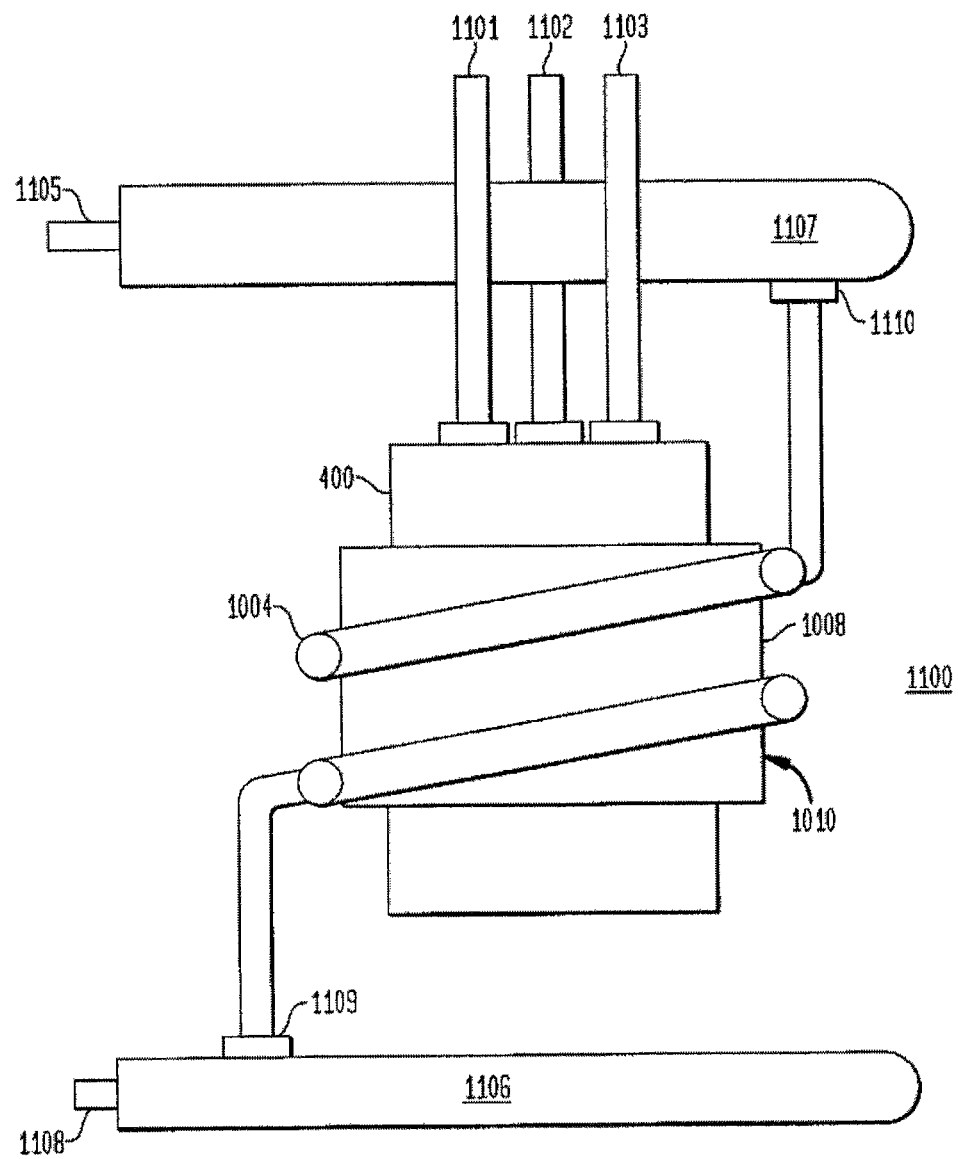
FIG. 11 is a view of an embodiment of a nozzle module/heat exchanger.

FIG. 11 is a view of a version of an embodiment of a nozzle module/heat exchanger assembly 1100 with recirculation of condensed gas. This drawing shows the nozzle module 400 assembled and with the heat exchanger assembly 1010 installed to the nozzle module 400. There is a refrigerant reservoir 1106 that has a refrigerant inlet 1108 and a refrigerant outlet 1109 that connects to the heat exchanger coil 1004 by its heat exchanger inlet 1006. The heat exchanger coil 1004 is attached to the thermal diffuser sleeve 1008 of the heat exchanger assembly 1010, and the coil's heat exchanger outlet 1002 is connected to the expended refrigerant reservoir 1107 at expended inlet end 1110, with the expended refrigerant reservoir 1107 further having an expended refrigerant outlet 1105. The stage nozzle module 2190 has an inlet gas inlet tube 1101, a light outlet tube 1102, and a heavy outlet tube 1103.

In FIG. 11, the refrigerant enters the inlet of the refrigerant reservoir 1106, filling that vessel. The refrigerant leaves the refrigerant reservoir 1106 through the refrigerant outlet 1109 and enters the heat exchanger inlet 1104 of the heat exchanger coil 1004, which wraps around and is attached to the thermal diffuser sleeve 1008. On the processing side, process gas inlet tube 1101 is fitted to the nozzle module 400 and receives the process gas. The process gas received in the process gas inlet tube 1101, in one embodiment, is pre-conditioned for temperature and pressure. In another embodiment, the process gas is at reservoir source pressure. The process gas flows through the separation nozzle fabricated within the nozzle plate 300 and is collected in the deflection diffuser 104 and expansion diffuser 105. The deflection diffuser 104 is fluidicly connected to the heavy outlet tube 1103 while the expansion diffuser 105 is fluidically connected to the light outlet tube 1102.

Initially, during start-up, the present heat-exchange/separation processing method, in some embodiments, depending upon the desired temperature that needs to be achieved to properly control the thermal properties of the nozzle module 400 and in the case of condensation enhanced separation processes, requires running both the refrigerant-side and process-gas side over some time prior to having the system reach the ideal temperature ratio for the method, particularly if low temperatures are desired.

During the transient mode in one embodiment, the material of the nozzle module 400 will gradually change temperature from ambient temperature to the desired temperature. A slow change in temperature reduces the potential for damaging thermal gradients developing across the nozzle module 400 and the nozzle module/heat exchanger assembly 1100 and allows the materials to expand or contract gradually, thereby reducing the likelihood of thermally induced damage or flaws. It has been found, that reducing the temperature of the nozzle module/heat exchanger assembly 1100 in a range of from 1-4° R/minute until reaching the desired set point is adequate for many embodiments. Continuing, as the inlet gas processes through the nozzle module 400, the refrigerant continues flowing through the heat exchanger coil 1004 at a rate determined by those of ordinary skill in the art to achieve the desired heat transfer to or from the nozzle module 400. The refrigerant then exits through the through the heat exchanger outlet 1002 and enter the expended inlet end 1110 of the expended refrigerant reservoir 1107. As the expended refrigerant fills the expended refrigerant reservoir 1107. The expended refrigerant exits through the expended refrigerant outlet 1105 at a variable flow rate, and it is either passed through a separate heat exchanger for recovery and recirculation, is contained, or vented. The ratio of temperature between the nozzle module 400 and the process gas entering the inlet gas inlet tube 1101 in part determines the amount of additional heat transfer from the separation that occurs in addition to the aerodynamically induced thermal cooling that occurs as a result of expansion within the separation nozzle.

8.1 Fine Temperature Control

In some embodiments, particularly those embodiments that are directed to the separation of two or more gaseous constituents or isotopes within the process gas, a variable or controllable temperature exchange is desirable, where the temperature of the nozzle module 400 and the inlet temperature of the process gas entering the inlet gas reservoir 106 is set at a ratio such that the process gas drops temperature to at least the temperature of the highest-boiling point constituent of the process gas when the process gas passed through the separation nozzle. In particular, when the gas constituents or isotopes have condensation points (i.e. dew points) that are in relatively close proximity it is necessary to have fine control of the incoming gas temperature.

Specifically, the process gas is pre-conditioned prior to entering the inlet gas reservoir 106 such that immediately prior to entry into the nozzle throat 108, the process gas is held at generally a first temperature. This first temperature is set based upon the aerodynamic characteristics of the separation nozzle 102 including the amount of expansion induced cooling that occurs within the extends of the separation nozzle 102. Thus, as the process gas that has been pre-conditioned to a first temperature enters the expansion nozzle 102, it is further cooled as it expands and accelerates along the separation flow path 130. At a point within the expansion nozzle 102, the process gas reaches a temperature that is below the boiling point (i.e. the condensation point) for at least one of the constituents of the process gas. At this point, and potentially beyond, the process gas becomes a two-phase flow wherein at least one constituent, at least in part, precipitates out of the flow in liquid form. The liquid phase of the constituent is significantly heavier and denser than the vapor phase. Thus, the centrifugal forces manifest on the constituents have stronger effects and are likely to further increase the concentration of the vapor phase constituent along the deflection wall 101. In this manner, with this embodiment of the separation nozzle, an enhanced separation effect is generated by condensing at least a portion of one of the constituents of the process gas within the expansion nozzle 102. In one embodiment, at least a portion of the process gas remains in liquid phase when the process gas passes the separation skimmer 112. The pressure and temperature recovery that occurs within the deflection diffuser 104 and the expansion diffuser 105 in some embodiments causes any remaining liquid phase constituents to fully recover back into pure gas phase flow.

In a second embodiment, the process gas is substantially gaseous upon impinging the separation skimmer 112, however during at least a portion of the flow along the separation flow path 130 the process gas was a two-phase flow with at least a portion of one of the constituents in a liquid phase. In this second embodiment, the liquid phase enhances the diffusion of the heavier, liquid phase constituents toward the deflection wall 101 while the process gas flows along the separation flow path 130. Further along the separation flow path 130, after the expansion nozzle exit 107, the temperature recovery in the over-expanded region (118 or 218 depending on the embodiment) causes the liquid phase constituent to re-vaporize or partially evaporate thus allowing only vapor form to impinge upon the separation skimmer 112 in a substantially gaseous state.

In a third embodiment, the process gas also includes a substantially liquid constituent that passes the skimmer 112 into the deflection diffuser 104 and remains liquid as it passes through the deflection diffuser 104 and passes external to the separation nozzle. In this manner a portion of the heavier species of the process gas that are separated by the separation nozzle are recovered in liquid form suitable for use as part of a refrigerant system.

The CFD results depicted in FIGS. 7d and 8b with respect to an embodiment of a type-2 nozzle 200 detail the effect of a pre-conditioned, or in this embodiment a cooled process gas entering a cooled type-2 nozzle 200. FIG. 8b is a depiction of CFD results of the static temperature of a process gas going through an embodiment of a Type-2 nozzle 200 having the inlet gas pressure of 29 psig and an inlet gas temperature of 434° R. It can be seen at point 827 where T=434°, that the gas enters the inlet gas reservoir 106 and continues to the nozzle throat 108, where it expands through the expansion nozzle 102 and at point 828 where T=376° R. Expansion continues through the expansion nozzle 102 where the process gas is reduced in temperature at point 829 to T=311° R, with a core temperature developing at point 830 where T=271° R. Just before the expansion nozzle exit 107, the process gas develops into a skimmer flow fraction where at point 831 T=386° R and a light diffuser flow at point 832 where T=416° R. Within the expansion diffuser 105, the gas temperature rises at point 833 where T=431° R, and within the deflection diffuser 104 at point 834 where T=426° R. This depiction describes having the process gas entering the separation nozzle at a reduced temperature before entering the separation nozzle. In one exemplary embodiment, the process gas is pre-conditioned by having the process gas pass through a cryogenic heat exchanger before entering the inlet gas reservoir 106 of the separation nozzle.

FIG. 7d is a CFD depiction of the results of the mach velocity of a Type-2 separation nozzle 200 with an inlet temperature of 434° R, a scenario corresponding to the temperature results depicted in FIG. 8b. In the result corresponding to this embodiment, the gas enters the inlet gas reservoir 106 at 434° R and is expanded through the nozzle throat 108 with a velocity at point 750 where M=1.05, and continues the expansion where at point 751 velocity is M=1.31 between the expansion wall 109 and the deflection wall 101. The flow, similar to earlier CFD results comprising the type-2 nozzle 200, in FIGS. 7a-7c, begins forming a core flow that at point 752 velocity is M=1.63, that reduces in velocity prior to the expansion nozzle exit 107 at point 753 where M=1.21. After the expansion nozzle exit 107, flow continues in velocity at point 754 where M=1.15, up to the separation skimmer 112 at point 755 where M=1.05.

The depiction shown in FIG. 7d shows that the process gas flow at the separation skimmer 112, and the separation skimmer throat 103, is at M=1.05. Within the expansion diffuser 105, the process gas flow at point 756 is M=0.52, showing a distinct velocity differential between the two curved streamlines. The velocity of the flow of the process gas at the expansion diffuser 105 is, at point 756 M=0.31, while the velocity of the flow within the deflection diffuser 104 at point 757 where M=0.31.

8.2 Nucleate Generation Conditioning

In another aspect, the separation of constituents from the process gas is further enhanced by another pre-conditioning technique applied to the flow prior to its entering the expansion nozzle. Since the separation effects of the separation nozzle are increased by greater mass ratio differences between the first constituent and the second constituent of the process gas, generating larger droplets of the condensed species within the process gas will further increase the separation efficiency of the separation nozzle. Pre-conditioning with nucleation enhancement forms the beginnings of molecular clusters and droplets of condensate of at least one of the constituents in the flow within the pre-conditioning section prior to the separation nozzle. When that constituent is subsequently exposed to the condensation effects of the separation nozzle caused by the expansion of the process gas, the resulting condensation droplets are of a larger size with a greater mass. The larger, more massive condensate results in an increased separation factor (i.e. increased separation efficiency) when exposed to the centrifugal force generated by the transit of the process gas through the curved geometry of the separation nozzle.

In one embodiment of pre-conditioning via nucleate generation, the heavy constituents of the process gas is subject to cooling and condensation in an separate nucleate generation pre-conditioning segment prior to the process gas entering the separation nozzle. In this manner the process gas entering the separation nozzle comprises substantially two-phase flow whereby the process gas contains at least a heavy constituent that is at least partially condensed into molecular clusters and droplets that are substantially suspended in the process gas flow. The subsequent effects of the separation nozzle with its ability to cause condensation of species are that the droplet size and mass difference of the condensate is substantially increased. In one embodiment a combination of cooling and expansion is used to condense at least a portion of one constituent of the process gas prior to the separation nozzle. In applications where the process gas is already compressed, such as chemical or natural gas processing, the process gas to be separated is already compressed by nature of the source, thereby allowing significant cooling to be performed using aerodynamic expansion. In this manner, the incoming process gas is a substantially single phase, gaseous, process gas flow. After passing through the nucleate generation segment the process gas comprises substantially two phase flow, wherein at least a first constituent remains gaseous while a second constituent (the heavier constituent in most applications) is at least partially condensed and the condensate of the second constituent is substantially entrained in the flow of the process gas. In applications such as natural gas processing, the desired product phase remains substantially gaseous throughout the process and is collected while the waste phase is typically liquid or solid particles that are suspended in a remaining gaseous component.

Figure 24:
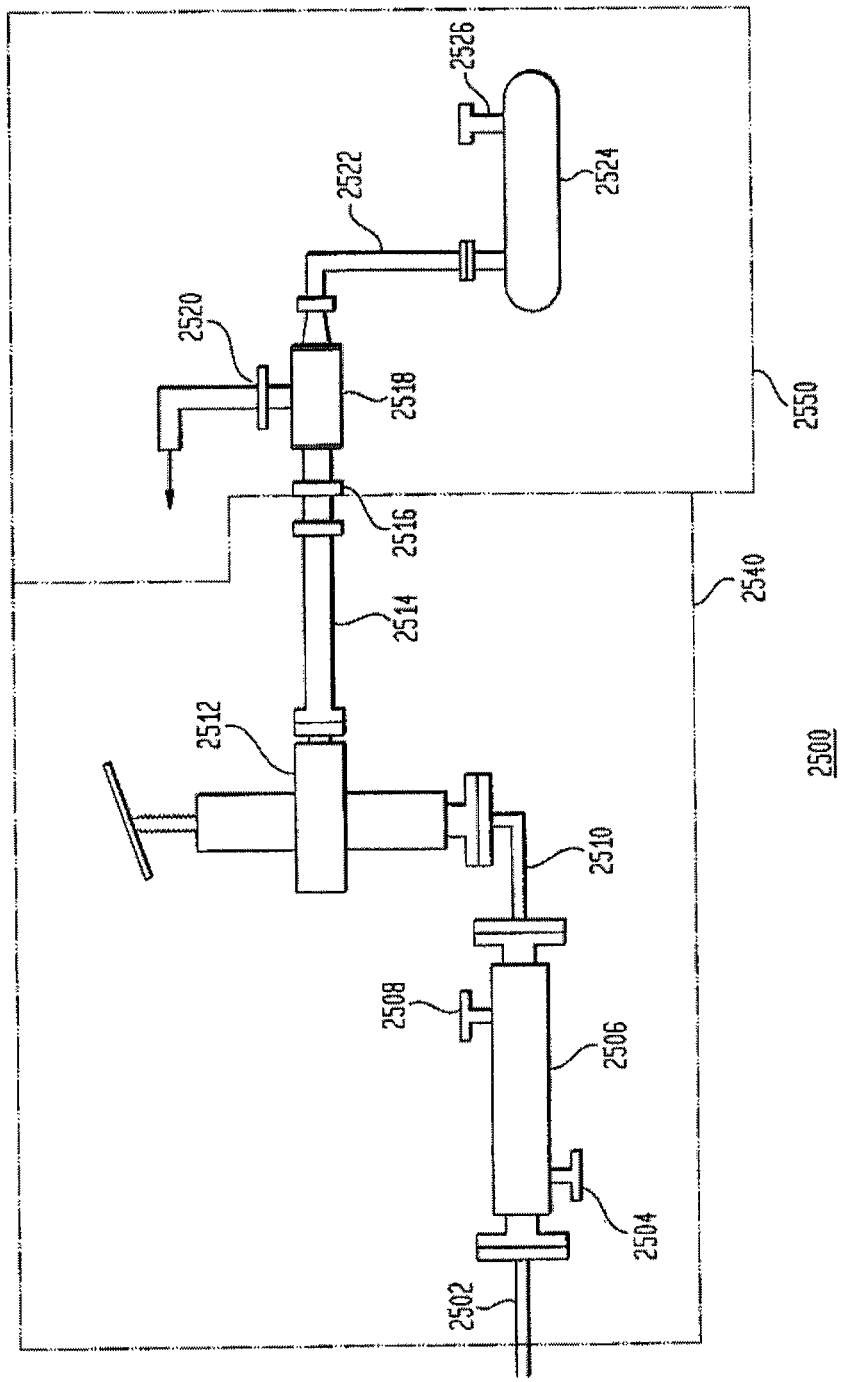
FIG. 24 is a depiction of an embodiment of a nucleate generation conditioning system.

Referring now to FIG. 24, an embodiment of nucleate generation conditioning and separation system 2500 is depicted. The nucleate generation conditioning and separation system 2500 comprises a nucleate conditioning stage 2560 and a separation stage 2550 arranged in series. The nucleate conditioning stage 2550 is adapted to provide the initial conditioning of the process gas. The nucleate conditioning stage 2550 receives the process for conditioning gas via the unconditioned process gas inlet 2502. The unconditioned process gas inlet 2502 is adapted to accept process gas from a variety of sources including, a natural gas field in natural gas processing applications, another pre-processing stage such as a dust filter, or in other embodiments from the H-V light gas outlet 2520 of an upstream nucleate generation conditioning and separation system 2500.

In the embodiment depicted in FIG. 24, the process gas is first cooled via a nucleate heat exchanger 2506. The nucleate heat exchanger 2506 is adapted to remove heat from the process gas thereby reducing the required expansion induced pressure drop necessary to condense at least a portion of the first constituent of the process gas. The nucleate heat exchanger 2506 in the embodiment depicted in FIG. 24 is a shell and tube heat exchanger, however other heat exchangers are readily available for use by those of ordinary skill in the art. The nucleate heat exchanger 2506 comprises a coolant inlet 2508 and coolant outlet 2504. In one embodiment the coolant medium is chilled water. In another embodiment the coolant medium comprises at least in part the partially condensed heavy constituents of the process gas collected in the condensate vessel 2524. The cooled process gas exits the nucleate heat exchanger 2506 via the cooled process gas line 2510 to the angle choke valve 2512.

As apparent to those of ordinary skill in the art, the nucleate heat exchanger 2506 to chill the incoming process gas is optional and in some embodiments the incoming process gas may be directly input to the angle choke valve 2512 thereby relying entirely on expansion induced aerodynamic cooling to condensate at least a first constituent of the process gas. Also apparent is the ability to effectively reduce the length of the cooled process gas line 2510 to a zero length such that the angle choke valve 2512 abuts the nucleate heat exchanger 2506.

The angle choke valve 2512 constricts the flow of the process gas passing into the condensate pipe 2514 thereby allowing the process gas to undergo a volumetric expansion. The resulting volumetric expansion of the process gas passing from the angled choke valve 2512 to the condensate pipe 2514 also resulting in an aerodynamic cooling of the process gas. The expansion ratio in one embodiment between the angle choke valve 2512 and the end of the condensate pipe 2514, namely the inlet the volume separation nozzle 2516, is between about 3 and about 8. The expansion ratio is selected by those of ordinary skill in the art based upon the temperature of incoming process gas entering the angle choke valve 2512 and selected to allow at least a portion of a first constituent of the process gas to at least partially condense within the condensate pipe 2514. In one alternative embodiment, the process gas temperature within the condensate pipe 2514 is controlled to reach a temperature such that the process gas is substantially gaseous, however the at least one constituent of the process gas will at least partially condense within the separation nozzle.

In the embodiment depicted the angle choke valve 2512 is adjustable to control the expansion ratio and flow rate of the process gas flowing into the inlet to the volume separation nozzle 2516. In this manner, a person of ordinary skill in the art is able to adjust the expansion of the process gas based upon the pressure of the process gas and the relatively temperature. In one embodiment sensors are used to measure the pressure and temperature of the process gas. The resulting measurements are used by a computer control system, an aspect of which is described in greater detail below, to determine the proper setting for the angle choke valve 2512 to cause the desired flow separation. In another embodiment temperature and optionally pressure measurements of the process gas at the inlet to the volume separation nozzle 2516 is used to adjust the angle choke valve 2512.

The process gas exiting the nucleate conditioning stage 2560 is at a reduced temperature as compared to the temperature of the incoming process gas 2502. In one embodiment the process gas is a two-phase flow comprising a first constituent that is at least partially condensed into molecular clusters and droplets that are entrained in the process gas flow. The resulting conditioned process gas passes from the nucleate conditioning stage 2560 to the separation stage 2550.

The separation stage 2550 comprises, in the embodiment depicted a high-volume (H-V) separation nozzle 2518. In one embodiment the H-V separation nozzle 2518 is a number of separation nozzles in parallel. In another embodiment the H-V separation nozzle 2518 is a scaled separation valve that has both overall planar dimensions and channel height scaled to increase the overall volume of H-V separation nozzle 2518. The H-V separation nozzle 2518, as typical of the aerodynamic separation nozzles comprises a deflection diffuser 104 and an expansion diffuser 105. In the separation stage 2550 depicted in FIG. 24, the expansion diffuser 105 collects the light constituents of the process gas and outputs the light constituents via the high-volume (H-V) light gas outlet 2520. In the case of natural gas processing the H-V light gas outlet 2520 is the primary product outlet, namely it is comprises substantially purified natural gas. Similarly the deflection diffuser 104 is fluidically coupled to the high-volume (H-V) heavy gas outlet 2522. The H-V heavy gas outlet 2522 collects the heavy constituents of the process gas exiting the H-V separation nozzle 2518. Due to the combination of nucleate generation conditioning and further expansion within the H-V separation nozzle 2518 itself, the component of the process gas within the H-V heavy gas outlet 2522 comprises a constituent of the process gas that is at least partially condensed. In the embodiment depicted, the H-V heavy gas outlet 2522 is fluidically coupled to a condensate vessel 2524 adapted to collect the condensate faction. The condensate vessel 2524 further comprises a condensate vessel vapor outlet 2526 to reduce pressure buildup within the condensate vessel 2524 that would result in increased pressure within the H-V heavy gas outlet 2522.

In another aspect, the nucleate heat exchanger 2506 includes a means for inducing a swirl or corkscrew motion in the incoming process gas flow passing through the nucleate heat exchanger 2506. In one embodiment for inducing swirl to the process gas, the unconditioned process gas inlet 2502 is oriented relative to the inner surface of the nucleate heat exchanger 2506 such that the incoming process gas is injected in a direction substantially tangential to the inner surface of the nucleate heat exchanger 2506 resulting a rotational velocity component to the process gas that is substantially aligned with the length axis of the nucleate heat exchanger 2506. In another embodiment, the unconditioned process gas inlet 2505 includes a swirl generation aerostructure, such as series of fins, ramps or wedges or a rotating element that impart a rotational velocity vector to the process gas entering the nucleate heat exchanger 2506. The induced swirl results in an increased dwell within the nucleate heat exchanger 2506 causes greater numbers and larger sized nucleates to form within the process gas.

As readily apparent to those of ordinary skill in the art the proceeding nucleate generation conditioning is adaptable to allow combinations with other pre-conditioning techniques such as fine temperature controlled pre-conditioning of the separation gas to achieve greater separation efficiency. In other embodiments, the nucleate conditioning stage is adapted to condense at least a first constituent of the process gas while the expansion induced cooling occurring within the high-volume separation nozzle 2518 causes a second constituent to at least partially condense from the process gas passing along the separation flow path 130 while a third constituent remains substantially gaseous.

In still another embodiment, the necessary geometry to provide nucleate generation conditioning is directly formed in the nozzle plate 300 and is formed during the fabrication process wherein the nozzle plates 300 are integrated into a nozzle module 400. In this manner, the nucleate generation conditioning is provided by structures formed in the nozzle module 400 to create a nucleate generation conditioning zone between the inlet gas reservoir 106 and the nozzle throat 108. In this manner, it is possible for one of skill in the art to fabricate a nozzle module 400 with integral nucleate generation conditioning capabilities as a monolithic component.

8.3 Temperature Control Heat Exchanger

In one embodiment, the separation nozzle is temperature controlled to a desired temperature. In another embodiment, the process gas is pre-conditioned prior to entering the separation nozzle to achieve a desired gas temperature. In another embodiment, both the process gas and the separation nozzle are temperature controlled to achieve a desired operating state. To facilitate these various temperature control embodiments, a temperature controller is used to both regulate the flow of coolant to the separation nozzle and for pre-conditioning the process gas. In one embodiment the temperature controller is a Cryo-Con Cryogenic Temperature Controller (Model 32/32B). The temperature controller in one embodiment regulates a heater that increases the temperature of the refrigerant or separation nozzle to maintain a desired set point. In another embodiment, the temperature controller regulates the temperature of the refrigerant to obtain the desired temperature control at the separation nozzle or within the incoming process gas pre-conditioning circuit.

8.3.1 Phase Tube

Figure 12:
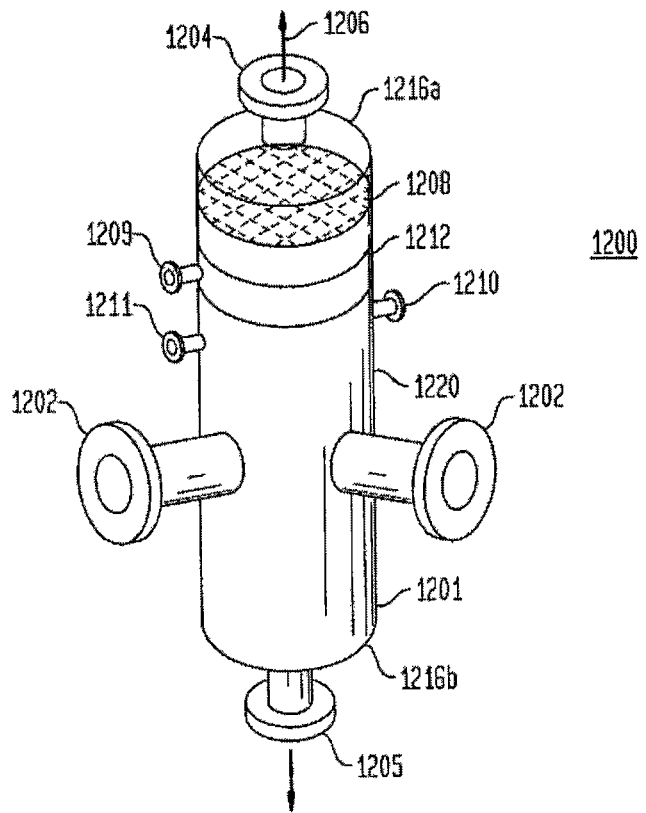
FIG. 12 is a profile view of an embodiment of a separation nozzle assembled into a phase tube assembly.
Figure 13:
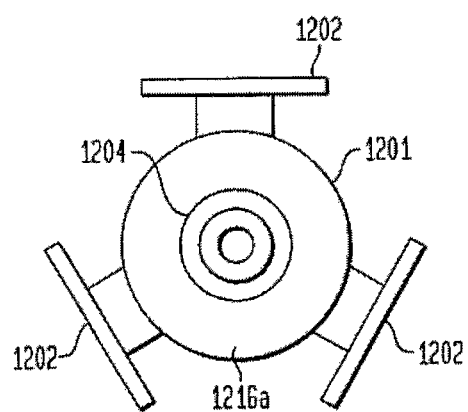
FIG. 13 is a top view of an embodiment of a phase tube assembly.

FIGS. 12 and 13 are schematic views of the profile and top view of an embodiment of a phase tube assembly or simply a phase tube 1200 for use in conjunction with the separation nozzles disclosed herein. The phase tube 1200 is configured to be a pressure vessel 1220 that is installed vertically and has a length-to-diameter ratio determined to have a liquid hold-up of between 3-5 minutes. The function of the phase tube 1200 in this process is to provide hold-up time of liquids/solids to make a separation between the various phases of a mixed process stream. The phase tube 1200 in the embodiment depicted is fabricated to have two elliptical ends 1216 that are bolted or welded to the phase tube shell 1201. The various embodiments of the phase tube 1200 have at least one, two, or more generally three, but can have more inlet flanges 1202 that are welded or attached to the side of the phase tube shell 1201, and the inlet flange 1202 provide mixed process stream inlet into the phase tube 1200.

Additionally, as seen in FIGS. 12 and 13, the phase tube 1200 also has a vapor outlet flange 1204 welded or attached to the upper elliptical end 1216a, and the phase tube 1200 has a liquid outlet flange 1205 welded or attached to the lower elliptical end 1216b. The phase tube shell 1201 of the phase tube 1200 also has a liquid antifreeze flange 1209 that is welded or attached to the phase tube shell 1201. Further, in the embodiment depicted, the phase tube shell 1201 has a pressure gauge flange 1210 welded or attached, and has a safety-pressure flange 1211 welded or attached to the phase tube shell 1201.

Internally, the phase tube 1200 has a demisting pad 1208 that is fitted near the internal top of the phase tube shell 1201, and below the demisting pad 1208 is mounted a liquid-film distribution manifold 1212 that is in connection with the liquid antifreeze flange 1209.

The phase tube 1200 operates with module/heat exchanger assembly 1100, where each module/heat exchanger assembly 1100 provides a vapor-liquid flow into the phase tube 1200 through the inlet flange 1202, wherein the vapor-liquid mixture is expanded or flashed, and the liquid fraction of the vapor-liquid mixture falls to the bottom of the phase tube 1200, and the vapor rises toward the top of the phase tube 1200. In this operation, both the vapor and the residual liquid are cooled to the saturation temperature of the liquid at the reduced operating pressure of the phase tube 1200. As the vapor-liquid is flashed into the phase tube 1200, a liquid antifreeze inlets the liquid antifreeze flange 1209 that is directly connected to the liquid-film distribution manifold 1212, and the liquid antifreeze, evenly coats the internal surface of the phase tube shell 1201, and flows in a film to the bottom of the phase tube 1200. In one embodiment, the liquid antifreeze is ethanol. The addition of the antifreeze keeps the internal phase tube shell 1201 from forming a frozen layer, keeps the condensed fraction from freezing at the bottom of the phase tube 1200. The antifreeze combined with the condensed fraction of the process gas in one embodiment forms a liquid refrigerant that is at the saturation temperature of the phase tube 1200. In another embodiment the antifreeze is at the saturation temperature of the phase tube 1200.

The flashing inlet of vapor-liquid into the phase tube 1200 allows liquid to fall to the bottom of the phase tube 1200 and allows the vapor fraction to rise to the top of the phase tube 1200. At least one, and in some embodiments multiple, demisting pad(s) 1208 are mounted in the top of the phase tube shell 1201, with the demisting pads 1208 generally being fabricated from stainless steel wires. Vapor rising in the phase tube 1200 at the operation pressure of the phase tube 1200, pressurizes the vapor through the demisting pad 1208, and due to the tangled formation of the demisting mat, causing entrained droplets to fall back toward the bottom of the phase tube 1200. Vapor rising from the demisting pad 1208 enters the upper head-space of the upper elliptical end 1416a, and outlets the phase tube 1200 through the vapor outlet flange 1204, as primarily single phase gas, also referred to as deliquified gas 1206.

In turn, liquid falling to the bottom of the phase tube 1200, mixes with the liquid antifreeze to form a liquid refrigerant, and the phase tube 1200 has a metering process from liquid outlet through the liquid outlet flange 1205, that allows the liquid content of the phase tube to reside in the lower portion of the phase tube shell 1201 and lower elliptical end 1216b for a period of time constituting the liquid hold-up of the phase tube 1200. In the embodiment depicted the liquid hold-up time is between about 3 and about 5 minutes. The metering process for liquid removal is generally regulated by a liquid valve (not shown) and a fill-level sensor (not shown), generally known in the industry. In other embodiments, the passage of the deliquified gas 1206 through the vapor outlet flange 1204 is controlled by a valve (not shown) that meters mass flow volume and flow pressure. The phase tube 1200 is also fitted with a safety-pressure flange 1211 that has a pressure sensitive valve (not shown), and is fitted with a pressure gauge flange 1210 that has a pressure valve (not shown), that is used in this embodiment to maintain the proper operating pressure of the phase tube 1200.

FIG. 13 depicts a top view of the same embodiment of a phase tube 1200 depicted in FIG. 12. In the depicted embodiment, the phase tube 1200 has three inlet flanges 1202 welded or attached to the phase tube 1200. This arrangement as used in this embodiment forms a parallel connection between three-stages of a separation cascade to a single secondary separator, or phase tube 1200. Mounted to each individual inlet flange 1202, is a nozzle separator/heat exchanger 1100, which constitutes a separation stage. Each of the stages are series connected via the light fraction process gas process stream, and parallel connected via the heavy fraction process gas process stream. In addition to this example of three separation stage configuration, other embodiments are available for adaptation by those of ordinary skill in the art to have as few as one stage, or as many stages as is feasible for mounting to a phase tube 1200.

FIG. 14 is an assembly view of a module/heat exchanger assembly 1100 configured with an inlet distribution tube to form a nozzle module distribution tube assembly 1400, adapted to be mounted in a phase tube 1200 assembly via the inlet flange 1202. In this depiction, the nozzle module 400 has the heat exchanger assembly 1010 with its heat exchanger coil 1004 assembled, and the distribution manifold 1412 is mounted with its orifice plate 1422 to the lower end of the nozzle module 400. In this arrangement, the heavy reservoir port 408 is plugged while the lower heavy port is open to empty the heavy flow fraction gathered in the deflection diffuser 104 into the head-space of the orifice plate 1422. The nozzle module 400 is mounted between outer flange plate 1419 and inner flange plate 1418, and the entire nozzle module distribution tube assembly 1400 is adapted to be mounted to the inlet flange 1202 via the inner flange plate 1418, with the distribution manifold 1412 inside the phase tube 1200. The outer flange plate 1419 has a flange inlet nozzle 1420 that directly attaches to the inlet reservoir port 407, and a light flange outlet nozzle 1421 that directly attaches to the light reservoir port 411. As described earlier, the inlet flange 1202 is welded or attached to the phase tube shell 1201 of the phase tube 1200.

FIG. 14 is a depiction of an embodiment of the distribution manifold 1412 integral with its orifice plate 1422. The orifice plate 1422 is fabricated to have an open head-space above it and has an orifice flange 1423 to attach to the bottom of the nozzle module 400. The orifice plate also has numerous orifices drilled through its surface to allow flow passage from the nozzle module 400 to inside the distribution manifold 1412. The embodiment of the distribution manifold 1412 depicted is a thin-walled tube comprising a number of separate lower orifices 1424 on its lower side for vapor-liquid flashing, and a smaller number of upper orifices 1425 on its upper side, primarily for vapor flashing.

In operation of the embodiment depicted, the distribution manifold 1412 receives vapor-liquid flow from the nozzle module 400 on the high pressure side of the orifice plate 1422. Flow through the orifice plate is metered as to the desired specifications, including flow rate and gas state for the particular application, so that the vapor-liquid enters the distribution manifold 1412 at a desired pressure, and fills and pressurizes the distribution manifold 1412. Once inside the manifold, the vapor-liquid expands or flashes at a desired pressure into the phase tube 1200 via the upper orifices 1425. The lower side of the distribution manifold 1412 has numerous lower orifices 1424 that primarily eject both vapor and liquids, and the upper side of the manifold has a fewer number of smaller upper orifices 1425 that primarily flash vapor. Upon expansion into the phase tube 1200, liquid droplets and solid particles tend to fall due to gravity, and vaporous or gaseous fractions rise toward the top of the phase tube 1200 from the distribution manifold 1412.

FIG. 15 is a phase diagram of methane (CH4), and carbon dioxide (CO2) gas mixture. In this depiction, the two-component gas mixture is at a pressure of 700-1050 psig. In the application of the various embodiments of the separator nozzle for separating acid gas from natural gas, the system receives the gas to be separated at a beginning temperature of 509° R and a beginning pressure of 1050 psig, with the gas being cooled from a temperature of 558° R in the example for natural gas. The gas has a mole percentage of methane of 58.3%, and in the first stage of expansion and separation, the gas further decreases in temperature to 429° R, producing a heavy outlet to the phase tube that is vapor and liquid. In the second stage of expansion and separation, the produced heavy outlet into the phase tube is at a temperature of 421° R and is vapor and liquid. The third and final separation stage for CO2 expansion and separation produces a heavy outlet into the phase tube that is at a temperature of 387° and is vapor and liquid.

9 Separation Cascade

Figure 16:
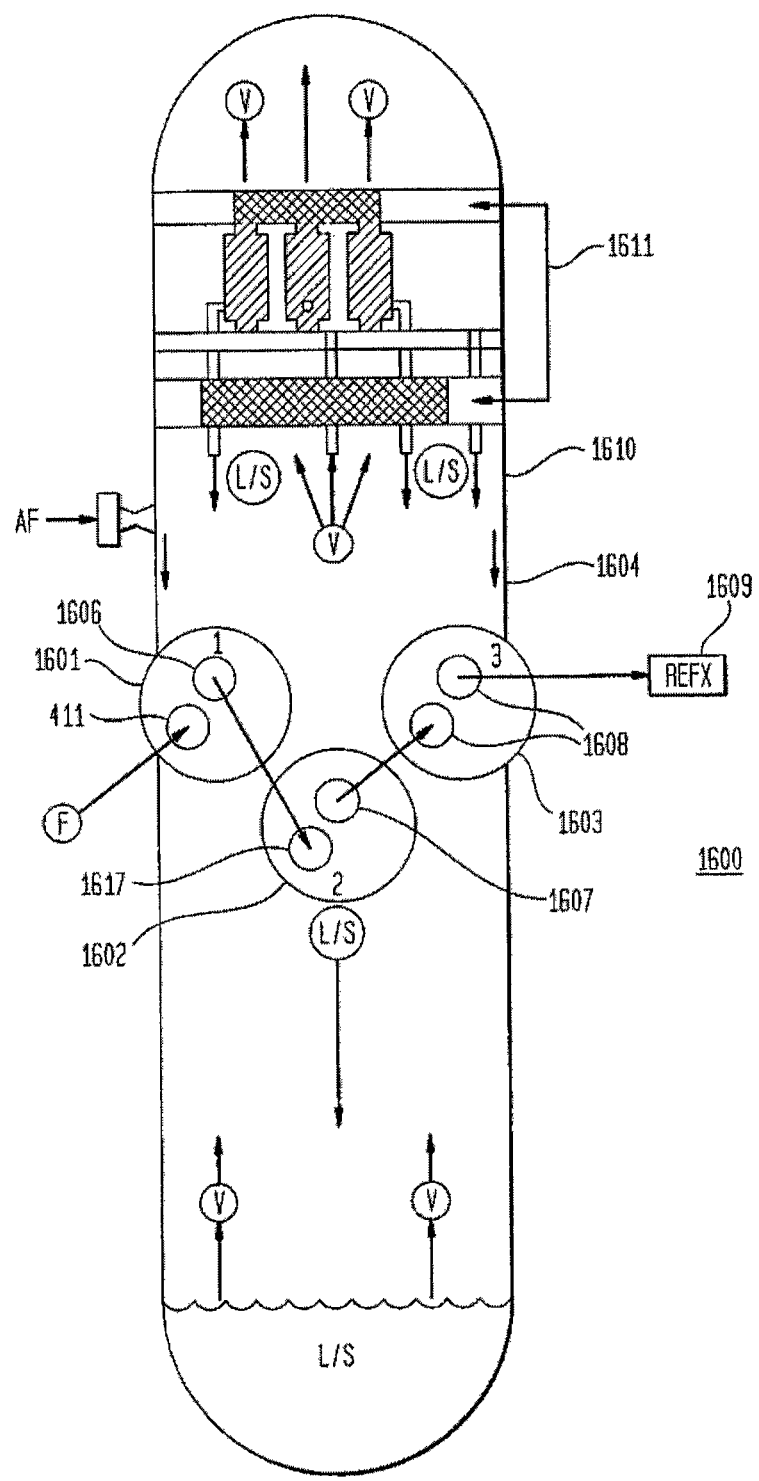
FIG. 16 is a depiction of a cascade using an embodiment of a separation nozzle.

FIG. 16 generally depicts an embodiment of a separation cascade 1600 arranged in three connected stages, with a joined parallel connection for heavy fraction separation. The cascade is comprised of the $1^{st}$ nozzle separator stage 1601, the 2" separation nozzle stage 1602, the $3^{rd}$ separation nozzle stage 1603, all three separator nozzle stages (1601, 1602, 1603) being in series-connection, and attached to and provide a fluid inlet to the phase tube assembly 1604. In this arrangement, the primary feed inlet for the process gas to the separation cascade 1600 enters the 1st nozzle separator stage 1601 through its inlet port 411, and proceeds in series from the light outlet 1606 of the $1^{st}$ stage separator nozzle 1601 to the 2nd stage feed injector 1617 of the 2" stage separator nozzle 1602, and continues from the 2nd stage light outlet 1607 of the 2" stage separator nozzle 1602 to the feed injector 1608 of the 3rd stage separator nozzle 1603. The light fraction output of the preliminary feed of process gas into the cascade, leaves the 3rd stage light outlet 1608 of the 3rd stage separator nozzle 1603 as the cascade's reflux stream (REFX) 1609, that is used to operate as a coolant for a heat exchanger before re-entry to the process stream before the cascade. For example in embodiments where the separation cascade 1600 is used as a fuel for the natural gas processing plant operation.

Each of the separator nozzle stages, 1601, 1602, and 1603 will generally have the exact same nozzle geometry based upon supersonic flow calculations, but will also generally be fabricated into plates that are reducing in thickness, so that the $1^{st}$ stage 1601 will have the greatest thickness, and the $2^{nd}$ stage 1602 will be a fraction of the first, and the $3^{rd}$ stage 1603 will be a smaller fraction of the first. This function may be defined as a tapering sequence cascade, where the geometry of the nozzle plates 300 reduce from the start of the cascade to the outlet of the cascade, due to dropping operating pressure from one stage of the cascade to the next, and due to reducing inlet volumes to each separator nozzle stage (1601, 1602, 1603), from the first stage beginning to the last stage. In this manner the pressure required to achieve the separation dynamics of each nozzle stage is maintained.

The embodiment of a phase tube 1610 of the separation cascade 1600, in the embodiment depicted in FIG. 16 is singular. However alternative embodiments and applications as understood by those of ordinary skill in the art may include multiple phase tubes 1610 each possessing one or more separation nozzle stages 1601, 1602, 1603. As seen in FIG. 16, the embodiment of a phase tube 1610 has three connected separation nozzle stages (1601, 1602, 1603) fluidically connected. The embodiment of the phase tube 1610 operates in the separation cascade 1600 as a modified vapor-liquid separator. As such, the embodiment of a phase tube 1610 operates to separate condensed or frozen gas by gravity, from gaseous or vapor fractions of the heavy streams coming from the separation nozzle stages 1601, 1602, and 1603. As condensing fractions drop by gravity, vapor or gas rises to the top of the embodiment of a phase tube 1610 to be removed. The condensing fraction for most applications falls into a liquid volume at the bottom of the embodiment of a phase tube 1610, where it is mixed with an antifreeze/refrigerant liquid that is metered out of the embodiment of a phase tube 1610 with some hold-up time in the embodiment of a phase tube 1610. The embodiment of a phase tube 1610 at its upper end has demisting apparatus 1610 similar to the embodiments of the demisting pad 1208 described in FIG. 12, that further separates condensate from gas, before the gas leaves the phase tube assembly 1610.

In an embodiment adapted for acid gas removal, the separation cascade 1600 receives the separation gas or process gas at its $1^{st}$ nozzle separator stage 1601, where the gas has a stagnation pressure and temperature, and the mass of the separation nozzle separator stage 1601 is refrigerated to a desired temperature that is lower than the stagnation temperature of the gas, so as to cause the separator nozzle stage 1601 to act as a heat sink for the stagnation temperature of the separation gas. In this manner, the separation nozzle stage 1601 pre-conditions, at least in part, the incoming separation gas to reduce the temperature of the process prior to entering the inlet gas reservoir 106 of the separation nozzle. Upon expansion of the gas through the nozzle throat 108, within the expansion nozzle 102, both of the stagnation temperature and pressure of the gas is reduced, with the pressure transferring to velocity gain, and temperature transfer to the material of the nozzle occurring. In various embodiments of the separation nozzle, a specified expansion ratio is implemented in the nozzle geometry that dictates the degree of velocity that can be attained, and that degree of expansion also dictates the reduction of temperature that is available. By additionally decreasing the temperature of the separation nozzle module 400 below that of the initial gas feed stagnation temperature, a higher degree of gas expansion reduction is generated, with the excess heat of the separation nozzle found being transferred via heat transfer to the flowing refrigerant that removes heat from the nozzle module/heat exchanger assembly 1100.

Once the expansion ratio has been met in the expansion nozzle 102, the gas reduces fractionally in velocity, yet is in a sonic condition for part of its flow near the deflection wall 101, and is largely lower in temperature in its static temperature condition. Due to the construction of the separation nozzle being a curved expansion nozzle 102, extra force is developed in the gas flow where if the temperature of the gas has been reduced enough, condensation of the highest-boiling point fraction of the gas occurs and concentrates in the highest-velocity/lowest temperature streamline of the gas flow. In this condition, that fraction is separated from the remainder of the gas flow by a skimmer 112 assembly, causing the heavy flow fraction, due to its velocity and temperature, to leave through the deflection diffuser 104 i.e., the heavy outlet stream. Similarly, the lower velocity and higher temperature gas fraction to leave via the expansion diffuser 105, i.e., the light outlet stream.

The light outlet stream is to be processed another time through the $2^{nd}$ separation nozzle stage 1602 through its $2^{nd}$ stage feed injector 1617, where that gas fraction will repeat the preceding process through the $2^{nd}$ separator nozzle stage 1602. The heavy fraction flow of separation nozzle stage 1601 is to be expanded into the phase tube assembly 1604. The heavy fraction flow of separation nozzle stage 1601 is about 70% of the original inlet feed stagnation pressure, and is reduced in temperature through supersonic expansion and by heat transfer to the refrigerated nozzle, and the heavy fraction flow coming from the $1^{st}$ nozzle separator stage 1601 is expanded into the phase tube assembly 1604 by a large pressure ratio difference. This expansion flashes the heavy fraction flow into a gas and condensate flow, where the condensate falls to the bottom of the embodiment of a phase tube 1610, and the gas rises to the top of the embodiment of a phase tube 1610, and both phase fractions are lowered in both temperature and pressure, with the temperature going to equilibrium temperature with the accumulated liquid held up in the bottom of the embodiment of a phase tube 1610.

This process through the stages and the phase tube is repeated three times, in the example of FIG. 16. As the light fraction goes from $1^{st}$ nozzle separator stage 1601 to the $2^{nd}$ separation nozzle stage 1602, and from the $2^{nd}$ separation nozzle stage 1602 to the $3^{rd}$ separation nozzle stage 1603, the progressing gas fraction reduces in both temperature and pressure. And as the separator nozzle stages 1601, 1602, and 1603 operate with tapering temperature and pressure, the heavy fraction flows resulting from each of the nozzle separator stages 1601, 1602, and 1603 expand and flash into the embodiment of a phase tube 1610 at reducing flash pressure differential. Stage 1601 has a large pressure differential, stage 1602 has a significant pressure differential, yet is smaller than stage 1601, and stage 1603 has a small pressure differential, but is significantly higher in non-compressible components and is lower in temperature compared to the previous nozzle separator stages 1601 and 1602.

Figure 17:
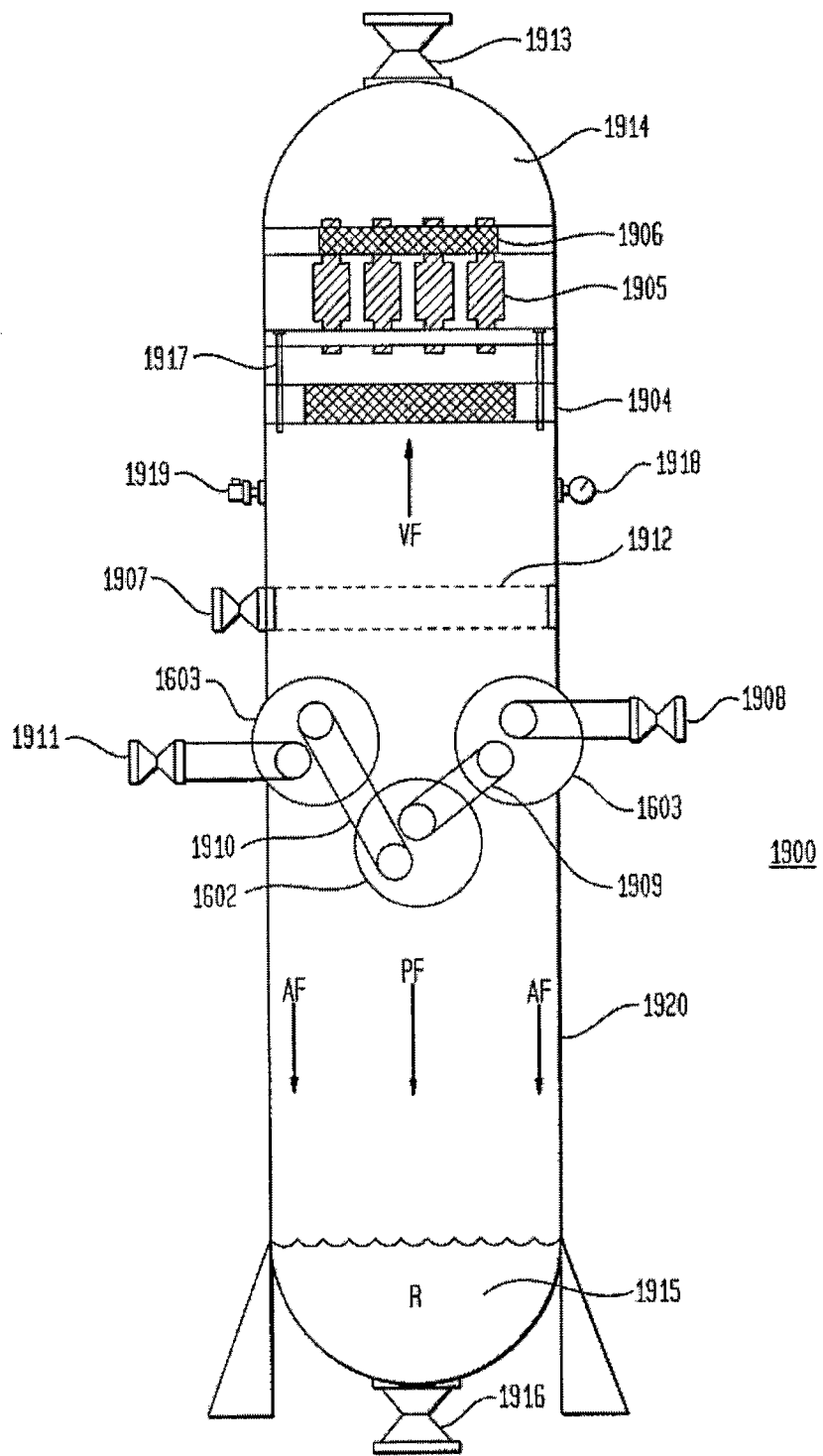
FIG. 17 is a second embodiment of a three-stage separation nozzle cascade configured to a central phase tube.

FIG. 17 depicts another embodiment of an operational separator assembly 1900, having three separation nozzle stages 1601, 1602, 1603 mounted to a central phase tube 1920, with the central phase tube 1920 having a demisting assembly to yield a high purity product gas with contaminants removed. This embodiment of the operational separator assembly 1900 has three separator nozzle stages; the first separator nozzle stage 1601, the second separator nozzle stage 1602, and the third separator nozzle stage 1603. The $1^{st}$ separator nozzle stage 1901 has a raw gas feed inlet 1911 into its inlet reservoir 106, and has a crossover pipe 1910 that connects the light or expansion diffuser 105 outlet reservoir from the nozzle module 400 within the $1^{st}$ separation nozzle stage 1901 to the inlet gas reservoir 106 of the $2^{nd}$ separator nozzle stage 1902. The $2^{nd}$ separator stage 1902 has a $2^{nd}$ crossover pipe 1909 that connects its light outlet reservoir to the feed reservoir of stage 1903, and stage 1903 has a reflux outlet 1808 from its light outlet reservoir.

The operational separator assembly 1900 has a central phase tube 1920 that is the parallel connection for the separator nozzle stages 1901, 1902, and 1903, receiving the heavy outlet fractions from the respective stages. The central phase tube 1920 is a tall vertical vapor-liquid separator, that is configured to process large flows of two-phase mixtures where solid and liquid particles fall by gravity to the liquid holdup 1915 at the bottom of the central phase tube 1920, and gaseous fractions rise within the central phase tube 1920 to eventually reach the head-space 1914 of the central phase tube 1920.

The two-phase fraction flows entering the central phase tube 1920 from the separator nozzle stages 1901, 1902, and 1903, are pressurized and cold through the operation occurring in the three stages, and upon entry into the central phase tube 1920 via the distribution manifolds 1412 shown in FIG. 14a, the flow from each distribution manifold 1412 immediately flashes due to the lowered operating pressure of the central phase tube 1920. The flash expansion lowers the temperature of the incoming gas and may further condense fractions within the gas due to their boiling-point temperature. In this operation, particles fall to the liquid holdup 1915, and gas rises to the primary demisting deck 1904.

The primary demisting deck 1904 operation is to further separate micro-droplets from the rising gas due to its construction have woven and twisted metal fibers that have torturous gas flow paths for gas to continue to rise, but a large overall surface area that is cold, where condensed fractions in the gas initially adhere to and eventually drop to the liquid holdup 1915 of the central phase tube 1920. Demisting mats are known in the industry, and can be easily fabricated to work inside of the central phase tube 1920. Specifications for the primary demisting deck 1904 require for this operation, that metal fibers be stainless steel, used for its thermal conductivity and for its anti-corrosion value.

Mounted above the primary demister deck 1904 in the embodiment depicted, is a swirl-generation deck 1905, to further reduce any droplets within the rising gas. The swirl-generation deck 1905 consists of several individual units that have their inlet in a headspace above the primary demisting deck, and their outlet into the secondary demisting plate 1906. Each separate unit of the swirl-generation deck has a torturous pathway assemblage with in each unit that swirls and counter-swirls the pressurized gas flow over convoluted and cold surfaces wherein the condensate attaches and flows to drain outlets in each unit housing. Draining condensate from the swirl-generation deck enters condensate drains 1917 that lead liquid and particle flow to the liquid hold-up 1915. Gas that has had condensate removed, leaves the top of the individual units of the swirl-generation deck 1905, to filter through the secondary demister deck 1906 and enters the central phase tube 1920 headspace 1914 to be extracted through the phase tube gas outlet 1913.

The central phase tube 1920 also has an internal assembly, the liquid-film manifold 1912, that receives liquid refrigerant from its inlet valve 1907, and the liquid-film manifold 1912 sprays the pumped liquid refrigerant along the inner surface of the central phase tube 1920, coating the surface with a down-flowing liquid that prevents surface fouling by ice under sub-temperature conditions within the central phase tube 1920. The liquid refrigerant, such as ethanol, eventually reaches the liquid holdup 1915 zone, where it is retained for a period of time, and the liquid refrigerant mixes with condensing specie like carbon dioxide and hydrogen sulfide and water, to form a cold-liquid in the bottom of the central phase tube 1920, to be metered and pumped through the liquid valve 1916, to be cycled to the individual nozzle stages 1901, 1902, and 1903 to cool them.

The liquid refrigerant mixture will, with most embodiments, be in a range of from 409° R to 339° R, and should be flowable liquid. Eventually, the carbon dioxide and hydrogen sulfide will be vaporized from the liquid in an external separator, where these gas species will be extracted and contained, and the liquid refrigerant will be recovered, and recycled back to the liquid-film manifold.

The operating temperature and operating pressure of the central phase tube 1920 is controlled through the process compressor suction that is supplied at the phase tube gas outlet 1913. The temperature of the central phase tube 1920 will approach the temperature of the liquid in the liquid holdup 1915, and will usually range from 389° R to 329° R, and the pressure will be lower than the heavy gas entering from nozzle stages 1901, 1902, and 1903. The degree of vacuum applied at phase tube outlet 1913 can be controlled and modulated by a vacuum control valve (not shown), and can be shown by the central phase tube 1920 pressure gauge 1918. Additionally, a gas pressure safety valve 1919 is set to activate upon a maximum pressure value. Overall, the integrated separation nozzle stages 1901, 1902, and 1903 mounted to the central phase tube 1920, provide an operational separation assembly 1900 that is considered to be a Low Temperature Separation (LTS) process, where the materials involved in the fabrication support having low temperatures and elevated pressures within the operational separator assembly 1900 confines.

Figure 18:
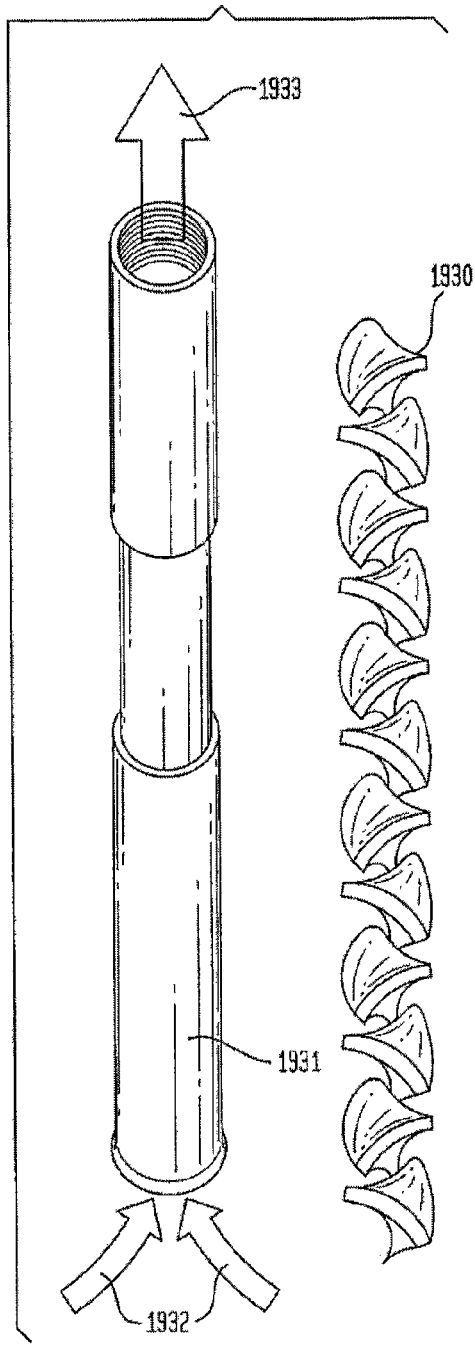
FIG. 18 is a depiction of an embodiment of an individual swirl generation unit for the phase tube.
Figure 19:
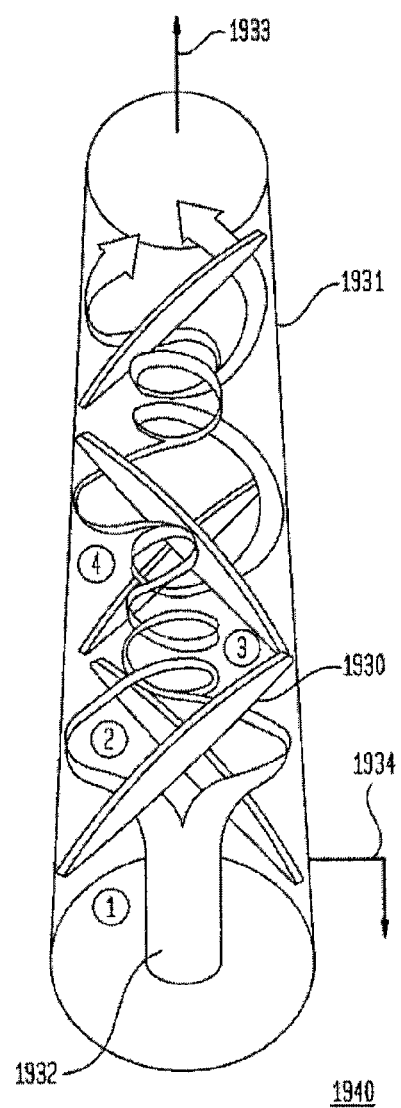
FIG. 19 is a depiction of another embodiment of an individual swirl generation unit for the phase tube with details of internal features provided.

FIGS. 18 and 19 are depictions of an individual swirl generation unit for inducing droplet separation from gas. The swirl generation unit 1940 is configured to be an outer tube 1931 having a convoluted insert 1930 as its working component. The swirl generation unit 1940 receives the pressurized gas feed 1932 at its one end, and causes the gas flow to turn and twist, 1, 2, 3, 4, when flowing from the feed 1932 to the gas outlet 1933 and the end of the swirl generation unit 1934. In many applications, this would be seen as a mixing action upon the gas, but in this embodiment and particularly in the central phase tube 1920 described in FIG. 19, due to the cold temperature of the central phase tube 1920, the insert 1930 and the tube 1931 are at sub-temperatures. In this format, entrained particles and liquid droplets will attach and condense to the swirl tube surfaces, removing them from the moving gas.

It can be seen in the schematic, that the insert 1930 is comprised of many individual twisted components. The insert 1930 is assembled by attaching the individual pieces through brazing, welding, or other means, so that a leading trough is formed that will direct condensate flow to the inner tube 1931 wall. The wall is perforated so that liquid removes itself from inside of the swirl generation unit 1940, and eventually drained away.

10 Multi-Stage Assembly

Figure 21:
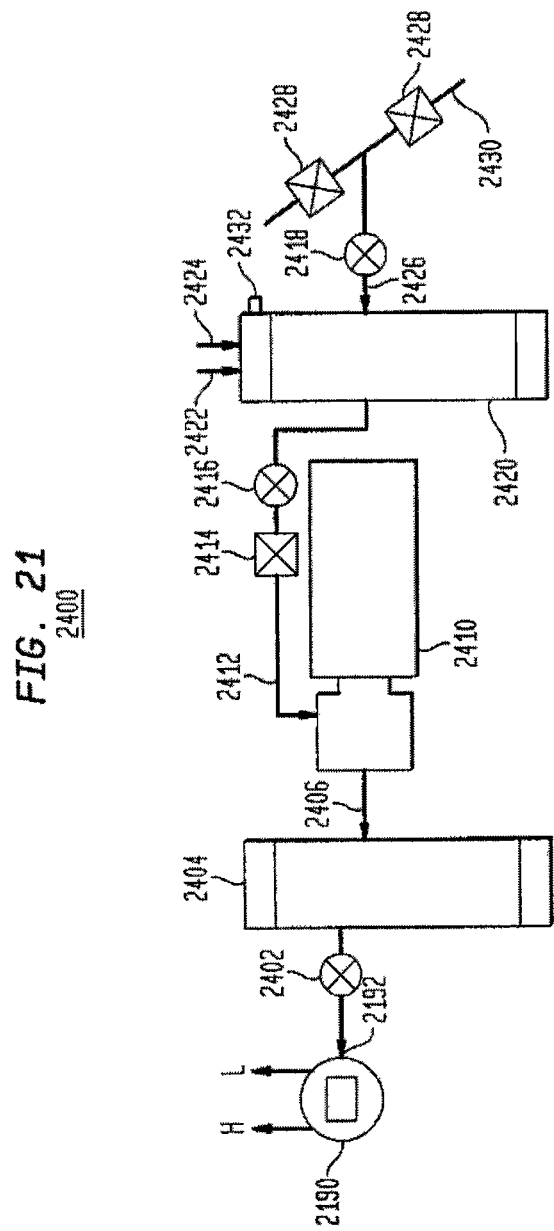
FIG. 21 is a schematic of an embodiment of a separation stage.

In one embodiment, a stage nozzle module 2190 is integrated with supporting equipment to form a modular stage 2400, as shown in FIG. 21. A stage 2400 comprises a number of separate elements that are adapted to operate together to operate the stage 2400 and supply the proper quantities and pressure of gas for separation to the stage nozzle module 2190. The stage nozzle module 2190 in this embodiment is a nozzle module 400 adapted by those of ordinary skill in the art to be fluidicly coupled to the other elements of the stage 2400. In the embodiment of the stage 2400 shown in FIG. 21, the stage nozzle module 2190 accepts pressurized gas for separation via its stage nozzle inlet 2192. The stage nozzle inlet 2192 is coupled via a nozzle valve 2402 to a pulse vessel 2404. In the embodiment depicted in FIGS. 21-24, the stage nozzle module 2190 comprises a separation nozzle assembly 900 formed of one or more twin skimmer nozzles 260. In other embodiments, not shown Type-1 separation nozzle 100 and Type-2 separation nozzle 200 contained within the stage nozzle module 2190 or the twin skimmer nozzle 260 comprises the same.

10.1 Exemplary Scaling Embodiment for the Stage Configuration

As used herein, when referring to elements of the twin skimmer nozzles 330, elements call out those depicted in FIG. 3b. Each of the following stage 2400 elements is described generally and then exemplary embodiments of each stage 2400 element adapted for separation of silane isotopes is provided. In the exemplary embodiments, the stage 2400 is adapted to maintain a throughput of 1.32 grams/sec, with a total throughput of 2.2 cf/minute at 60 psig. The separation nozzle of the stage nozzle module 2190, adapted to accept in this embodiment a Type-1 nozzle 100 are sized to match this combined throughput with each separation nozzle operating at approximately Mach 1.68 average through the expansion nozzle exit 107. In this embodiment, the stage nozzle module 2190 and its corresponding Type-1 nozzle 100 is adapted to fractionate the gas flow such that 0.5 (50%) of the flow is deflected into the light stream (L stream) that is directed to one gas collector or diffuser, while the remaining 0.5 (50%) of the flow is deflected into the heavy stream (H stream) that is directed to the other gas collector or diffuser, expansion diffuser 105 and deflection diffuser 104, respectively.

The separation nozzle provides a mass-ratio change between the L stream exiting via the expansion diffuser 105 and the H stream exiting through the deflection diffuser 104 of approximately 1.0177. The mass ratio change is estimated by the velocity of the gas along the separation flow path 130 and more specifically near the expansion nozzle exit 107 to the over-expanded region 118. The velocity, coupled with the radius of curvature of the deflection wall 101 of the Type-1 nozzle 100 along the separation flow path 130 prior to the expansion nozzle exit 107 and the over-expanded regions 118, provides an estimate of the effective acceleration applied to the gas, which results in a different force being applied to the different species of gas based on the relative molecular weights.

10.2 Stage Configuration Elements 10.2.1 Pulse Vessel 2404

A pulse vessel 2404 is provided to dampen and minimize pressure pulses caused by the compressor 2410. The pulse vessel 2404 is sized to provide a buffer between the compressor 2410 and the stage nozzle module 2190. The pulse vessel 2404 serves to dampen any pressure pulses in the gas exiting the compressor 2410 and also provides a short duration buffer to dampen other fluctuations in the flow of gas through the stage 2400, including those fluctuations caused by a short duration inability to maintain gas in the compressor vessel 2420 that would otherwise reduce the flow of gas through the compressor 2410. The pulse vessel 2404, in the embodiment shown in FIG. 21, possesses an output port connected to the nozzle valve 2402 that allows the stage nozzle module 2190 to be disconnected and separated from the pulse vessel 2404. Similarly, the inlet connection to the pulse vessel 2404 to the compressor 2410 outlet possesses a compressor valve 2406 that enables the compressor 2410 to be fluidicly isolated from the pulse vessel 2404. Using the nozzle valve 2402 and the compressor valve 2406 in combination allows the pulse tank to be isolated from the rest of the stage 2400 to facilitate start-up, shut-down, and maintenance operations.

In one embodiment, the nozzle valve 2402 and the compressor valve 2406 are manually controlled. In another embodiment, the nozzle valve 2402 and the compressor valve 2406 are adapted to be electronically controlled, thereby enabling automated or semi-automated operation of the stage 2400 via an electronic controller. In yet another embodiment, the nozzle valve 2402 and the compressor valve 2406 are check valves. In still another embodiment, the nozzle valve 2402 and the compressor valve 2406 are each selected from the group valves including: gate or stop, needle, solenoid, and ball valves.

In other embodiments of the stage 2400, one or more sensors (not shown) are associated with either the pulse vessel 2404 itself or in the connections between the pulse vessel 2404 to the stage nozzle module 2190 or the compressor 2410. In one embodiment, a sensor includes a mass flow rate sensor that monitors the flow of gas into, out of, or both into and out of the pulse vessel 2404. In still another embodiment, a pressure sensor is included to monitor the pressure within the pulse vessel 2404.

For the exemplary silane separation stage 2400, the pulse vessel 2404 is sized with a total capacity of approximately 13.2 grams at approximately 60 psig.

10.2.2 Compressor 2410

A compressor 2410 is provided to increase the pressure of the incoming gas prior to injection in the stage nozzle module 2190. As discussed previously, the acceleration of the gas is important to achieve aerodynamic separation in a separation nozzle. The compressor 2410 provides sufficient compression of the gas to be separated prior to entry in the stage nozzle module 2190 to ensure the gas passes through the separation nozzle at the desired velocity in order to achieve the desired separation effects.

In one embodiment the compressor 2410 is a diaphragm compressor. A diaphragm compressor 2410 allows separation of the compressor elements, including lubricants or other motive elements from the gas stream, thereby reducing the potential for contamination of the gas to be separated from elements of the compressor 2410. The diaphragm compressor 2410 also creates, due to the nature of a diaphragm compressor 2410, a significant vacuum at the compressor inlet 2412. This vacuum is useful when operating in some embodiments of a multi-stage configuration, such as the source separation loop 2500, shown on FIG. 22, since the vacuum created by the compressor 2410 enables the deflection diffuser 104 and the expansion diffuser 105 to operate at a vacuum, thereby increasing separation efficiency and enabling more precise control of separation within a given separation nozzle by adjusting the separation nozzle state.

The compressor 2410 is selected or adapted by one of ordinary skill in the art based on the following parameters. First the compressor 2410 is sized to provide sufficient flow rates and pressure head to maintain velocity of the gas into stage nozzle module 2190. Appropriate sizing of the compressor 2410 enables the flow through the separation nozzle to be controlled merely by controlling the pressure at the inlet to the stage nozzle module 2190. The controlled pressure at the inlet to the stage nozzle module 2190 is a design factor to be considered when scaling the compressor 2410. In certain embodiments, a pressure sensor (not shown) located at one of the following locations: pulse vessel 2404, nozzle valve 2402, inlet to the stage nozzle module 2190, or between the preceding elements, is used to control the pressure at the inlet to the stage nozzle module 2190 by providing a feedback signal that is used by a stage controller (not shown) to modulate the operation of the compressor 2410. In still another embodiment, a check valve (not shown) is placed between the pulse vessel 2404 and the inlet to the stage nozzle module 2190 to allow overpressure to vent either to a separate collection tank or back to the compressor vessel 2420.

In an embodiment adapted for processing silane, the compressor 2410 is a KNF compressor with a continuous flow of 2.2 cf/minute at 60 psig, that induces a vacuum of 27 in/hg. This compressor 2410 is adapted to provide sufficient pressure, about 60 psig and vacuum to allow flow of the gas through the separation nozzle to be at the desired flow rate.

10.2.3 Compressor Vessel 2420

The compressor vessel 2420 provides an input buffer to the compressor 410. The compressor vessel 420 in the embodiment depicted possesses three separate inlet ports:

(1) an L stream or depleted gas stream inlet 2422;

(2) an H stream or enriched gas stream inlet 2424; and, (3) a raw, or separation, gas inlet 2426.

The three separate inlet ports enable the compressor vessel 2420 to accept the output of a prior stage nozzle module 2190 which is arranged in series, via that stage nozzle module 2190 outlet manifold or to accept raw gas from a raw gas inlet 2426 which is a separate feed that has yet to pass through a single stage 2400. The raw gas inlet 2426 also posses a pair of raw gas cut-off valves 2428 located on the raw gas supply manifold or the inlet manifold 2430, the inlet manifold 2430 is part of an external fluid handling assembly. As used herein the term external fluid handling assembly refers to fluidic connections that are formed external to a nozzle module 400 that allow process gas to pass into a given nozzle module 400 or from the nozzle module 400 as well as transport of the process from pre-conditioning elements or stages. The operation of the raw gas cut-off valves 2428 enables the system to selectively feed quantities of raw gas to be separated, i.e., process gas, into the compressor vessel 2420. The raw gas is then mixed with the gas entering the compressor vessel 2420 from the depleted and enriched gas stream inlets 2422, 2424, thereby allowing the raw feed gas to mix prior to entering the compressor 2410.

The compressor vessel 2420 is separated from the compressor 2410 by a pressure vessel valve 2414. The pressure vessel valve 2414 enables the fluidic isolation of the compressor vessel 2420 from the compressor 2410. In the embodiment depicted, a mass sensor 416 is located between the compressor vessel 2420 and the compressor 2410 to monitor the mass flow into the compressor 2410.

In one embodiment, the raw gas cut-off valves 2428 and the pressure vessel valve 2414 are manually controlled. In another embodiment, the raw gas cut-off valves 2428 and the pressure vessel valve 2414 are adapted to be electronically controlled, thereby enabling automated or semi-automated operation of the stage 2400 via an electronic controller. In yet another embodiment, the raw gas cut-off valves 2428 and the pressure vessel valve 2414 are check valves. In still another embodiment, the raw gas cut-off valves 2428 and the pressure vessel valve 2414 are each selected from the group valves including: gate or stop, needle, solenoid, and ball valves.

In an embodiment adapted for processing silane, the compressor vessel 420 is sized with a total capacity of approximately 13.2 grams ($9.04 \times 10^{-4}$ slugs) of silane at approximately 14 psig (96 Pa). The nominal operating temperature of the compressor vessel 2420 is approximately 70° F. (21.1° C.).

In other embodiments of the stage 2400, one or more sensors are associated with either the compressor vessel 420 itself or in the connections to and from the compressor vessel 2420 to the compressor 410 or gas input lines. In one embodiment, depicted in FIG. 21, a mass flow sensor 2416 is located between the compressor vessel 420 and the compressor 2410 to monitor the mass transfer from the vessel into the compressor 2410 and hence the stage nozzle module 2190. Also shown in the embodiment shown, a inlet mass flow sensor 2418 is provided to measure the input of raw gas for separation into the stage 2400. Also depicted in the embodiment shown, a temperature sensor 432 is provided to monitor the temperature within the compressor vessel 2420. In other embodiments, additional mass sensors are placed to monitor the L stream input 2422 and H stream input 2424 to the compressor vessel 2420. In still another embodiment, the incoming L steam and H stream are estimated based on the mass flow from the prior stage 2400. In still another embodiment, a pressure sensor is included to monitor the pressure within the compressor vessel 2420.

10.3 Connection of Elements

Techniques for coupling the multiple elements of a stage 2400 to each other are well known to those of ordinary skill in the art. For example, in the case of an embodiment adapted for use enriching silane, the coupling elements require substantially complete sealing through the entire range of expected operating pressures to avoid incidental exposure of the silane to oxygen or venting to the case surrounding the stage 2400. These couplings between the multiple elements of a stage 2400, when considered together with the control valves present in the stage 2400, enable individual elements or the entire stage 2400 to be separated from the other elements of the stage 2400 and adjoining elements for removal. In one embodiment, the individual elements of the stage 2400 are connected using metallic tubes terminated with tube fittings, such as compression tube fitting, flare fittings, bite-type tube fittings, mechanical grip-type fittings, and two-ferrule or Swagelok® type tube fittings. The tube fittings enable the tubing to be removably connected to the various elements of the stage 2400, including the sensors such as the compressor vessel temperature sensor 2432, active elements such as the compressor 2410 or nozzle valve 402, and the other elements such as the pulse vessel 2404 or the stage nozzle module 2190. The tube fittings allow elements to be rapidly removed from a stage as desired.

10.3.1 Source Separation Loop

Figure 22:
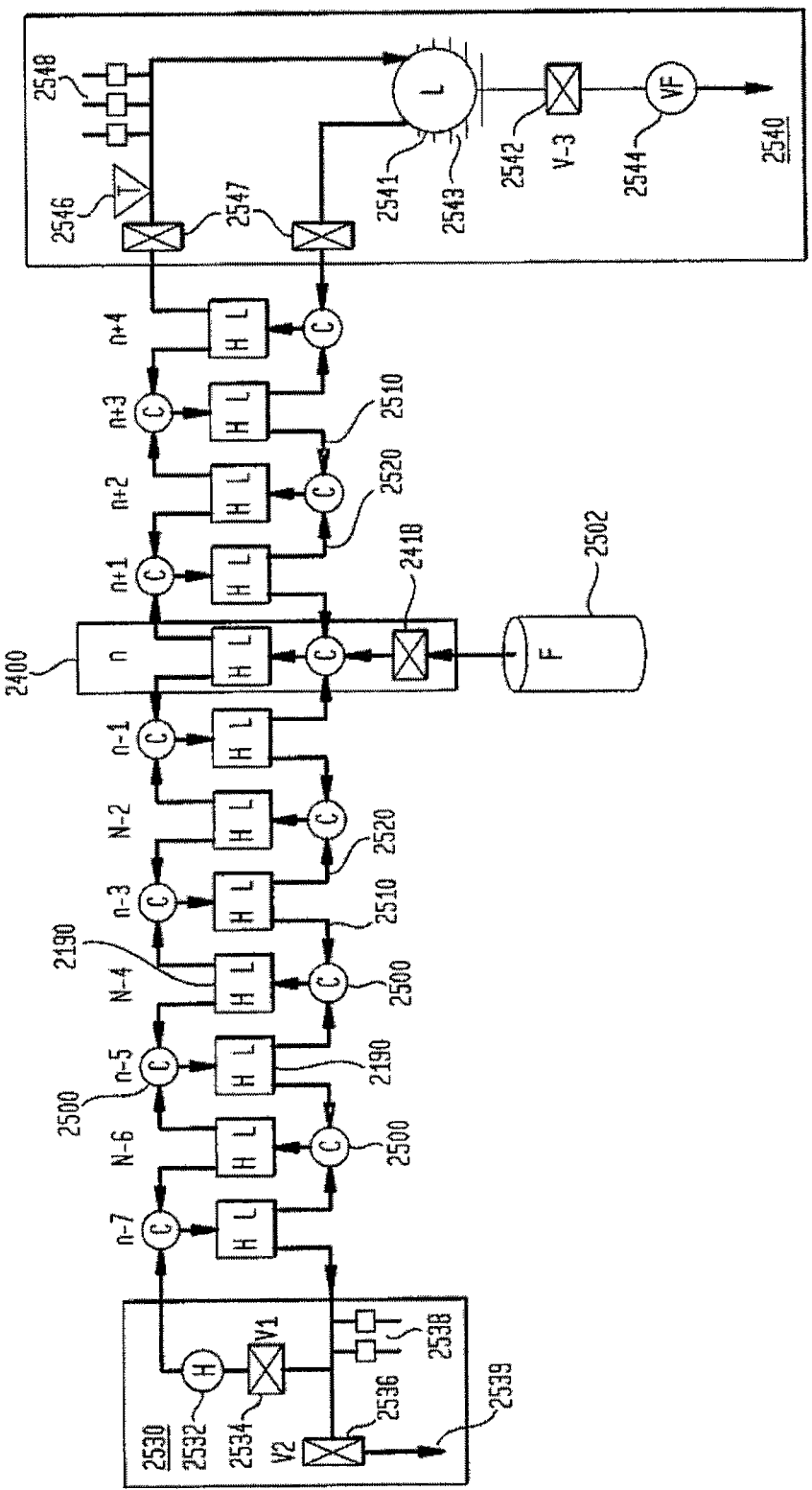
FIG. 22 is a schematic depiction of an embodiment of a twelve stage separation system.

A first embodiment of a multi-stage, single source, separation loop assembly whereby raw feed gas is introduced at only a single stage 2400, also described as a source separation loop 2500, is depicted in FIG. 22. In the schematic of the source separation loop 2500, the elements of the stage 2400 are simplified into a schematic compressor 2502 and a the stage nozzle module 2190. The schematic compressor 2502 generally in the case of the stage 2400 embodiment described in FIG. 21, comprises the following elements: (a) compressor vessel 2420; (b) compressor 2410; (c) pulse vessel 2404; (d) the valves interconnected each of the aforementioned elements (e.g., the nozzle valve 2402); and, (e) sensors (e.g., the temperature sensor 2432). Effectively, the schematic compressor 2502 represents all elements of the stage 2400 external to the stage nozzle module 2190 or the outlet manifold of the stage nozzle module 2190. Each stage 2400 present in the source separation loop 2500 is labeled from the stage 2400 adapted to accept the source gas from the raw process gas inlet 2502.

The stage nozzle module 2190 of each stage outputs an enriched or H stream and a depleted or L stream. In the case of the embodiment of the invention adapted for processing silane, the H stream represents the stream of separate gas that has a greater mass fraction percentage of heavier isotopes (Si-29 and Si-30) based silane isotopes while the L stream represents the stream of separated gas with a greater mass fraction of the lighter Si-28 based silane isotope relative to the baseline mass fractions present in the raw, unprocessed source gas input from the process gas inlet 2502. As previously discussed, in the example of the Type-1 separation nozzle 1 shown in FIG. 1, the heavy constituents (H stream) is collected via the enriched gas collector, or the deflection diffuser 104 while the light constituents (L stream) is collected via the depleted gas collector or the expansion diffuser 105. The H stream output is thus routed in the schematic of FIG. 22, via the H stream connection 2510 that is fluidicly coupled to the deflection diffuser 104 on the stage nozzle module 2190. Similarly, the L stream output is routed in the schematic of FIG. 22, via the L stream connection 2520, which is fluidicly coupled to the expansion diffuser 105 on the stage nozzle module 2190. In one embodiment, the L stream connection 2520 and the H stream connection 2510 form a first fluid rail and a second fluid rail that provide fluidic connections between the stage nozzle modules 2190.

10.3.1.1 Stage to Stage Interconnections

Each stage 2400 of the source separation loop 2500 is connected to adjoining stages 2400, or, in the case of the last stage 2400 of the source separation loop 2500 to the enriched gas collector 2530 and the depleted gas collector 2540. The outlet of each stage nozzle module 2190 is connected via the H stream connection 2510 to the input of the next stage 2400 in direction of the enriched collector assembly (i-1). Conversely the outlet of each stage nozzle module 2190 connected to the L stream connection 2520 is connected to the inlet of the next stage 2400 in the direction of the depleted gas collector 2540. The effect of the successive separation occurring in each stage 2400 and the piping via the L stream connections 2520 to direct depleted or L stream through the stages 2400 toward the end of the source separation loop 2500 with the depleted gas collector 2540, while the H stream connections 2510 direct the enriched or H stream through the stages 2400 toward the enriched gas collector 2530 causes, over time, the separation and migration of the heavier species of the source gas away toward the enriched gas collector 2530 and the lighter species toward the depleted gas collector 2540.

In the case of an embodiment depicted for the separation of silane isotopes, twelve stages 2400 are used in the system.

10.3.1.2 Gas Collector Assemblies

The source separation loop 2500 is terminated at one end by an enriched gas collector 2530 and the opposing end by a depleted gas collector 2540.

10.3.1.3 Enriched Gas Collector Assembly

The enriched gas collector 2530, terminates the one end of the source separation loop 2500. Enriched gas collects in the enriched gas collection tank 2532. In the case of an embodiment adapted for separation of silane isotopes, the enriched gas collection tank 2532 collects Si-29 and Si-30 silane ($SiH_4$). A pair of valves preferably are used to separate the enriched gas collection tank 2532 from the rest of the source separation loop 500. The enriched tank inlet valve 2534, coupled with the pressure vessel valve 2414, enables the enriched gas collection tank 2532 to be cut off and isolated from the remainder of the source separation loop 2500.

An enriched gas exhaust valve 2536 is provided to allow enriched gas from the source separation loop 2500 to be drained from the system via the enriched gas outlet 2539. Enriched gas sensors and enriched gas test ports 2538 are provided in the enriched gas collector 2530 to monitor aspects of the temperature, pressure, mass flow, and in the case of the gas test ports 2538 in some embodiments lead to an external mass spectrometer for measurement of isotope ratios or chemical composition thereby allowing measurement of separation performance.

In an embodiment adapted for processing silane, the enriched gas collection tank 2532 operates at approximately 14 psig, 70° F. and is sized for a total capacity of approximately 79.2 grams of silane. These parameters for the enriched gas collection tank 2532, coupled with the 0.66 g/sec inlet and 0.66 g/sec outlet (dictated by the performance of the stage nozzle module 2190 and the twin separation nozzles s260 being sized for a 0.5 mass fraction separation and flow rates at the design pressure for the separation silane). The resulting residence time within the enriched gas collection tank 2532 with these parameters in a source separation loop 2500 configured with the parameters above is approximately 60 seconds.

10.3.1.4 Depleted Gas Collector Assembly

The other end of the source separation loop 2500 is terminated by a depleted gas collector assembly, or simply, a depleted gas collector 2540. The depleted gas collects in the depleted gas collection tank 2541. In the case of an embodiment of the source separation loop 2500 adapted for separation of silane isotopes, the depleted gas collection tank 2541 collects Si-28 silane ($SiH_4$). In the embodiment shown in FIG. 22, the depleted gas collection tank 2541 include a cooler 2543. The cooler 2543 in one case is a radiative cooling system, exemplified by a set of passive, buoyancy-driven, cooling fins. In other embodiments, the cooler 2543 is selected by one of ordinary skill in the art to remove heat from the gas within the depleted gas collection tank 2541 and reduce residual heat buildup within the system due to frictional heating induced by the successive compressor 2410 stages. Some examples of active coolers 2543 available to those of ordinary skill in the art include: fans, blown cooling fins, mechanical or evaporator-condenser loop refrigeration, cryogenic, evaporative, heat transfer tubes, water cooling, and solid state or peltier coolers.

A pair of depleted gas valves 2547 disposed at both the inlet to and the outlet from the depleted gas collector 2540 are used to separate the depleted gas collection tank 2541 from the rest of the source separation loop 2500 in the embodiment depicted. The depleted gas valves 2547 enable the enriched gas collection tank 2532 to be cut off and isolated from the remainder of the source separation loop 2500. A deleted gas exhaust valve 2542 is provided to allow enriched gas from the source separation loop 2500 collected in the depleted gas collection tank 2541 to be drained from the system into a depleted gas outlet 2544. Depleted gas sensors 2546 and depleted gas test ports 2548 are provided in the depleted gas collector 2540 to monitor aspects of the temperature, pressure, mass flow. In certain embodiment, the test ports 2548 provide access for routing samples of the depleted gas, or L stream, into a mass spectrometer for measurement of isotope ratios of chemical composition to measure separation performance and determine when or how long it is appropriate to drain depleted gas from the depleted gas collection tank 2541.

In an embodiment adapted for processing silane, the depleted gas collection tank 2541 operates at approximately 14 psig, 70° F. and is sized for a total capacity of approximately 79.2 grams. These parameters for the depleted gas collection tank 2541, coupled with the 0.66 g/sec inlet and 0.66 g/sec outlet (dictated by the performance of the stage nozzle module 2190 and the twin separation nozzles 260 being sized for a 0.5 mass fraction separation at the design pressure for silane). The residence time within the depleted gas collection tank 2541 with these parameters in a source separation loop 2500 configured with the parameters above is approximately 60 seconds.

10.4 Enclosure

An enclosure (not shown) is used to cover the entire source separation loop 2500 and reduce potential exposure to the outside environment. In the case of an embodiment of a source separation loop 2500 adapted for use separating silane, the enclosure is airtight thereby enabling the entire enclosure to be filled with a substantially inert gas, such as Argon (Ar) or Nitrogen ($N_2$), to reduce the risk of fire or explosion if silane escapes from the source separation loop 2500.

10.5 Inlet Manifold Separation Assembly

Figure 23:
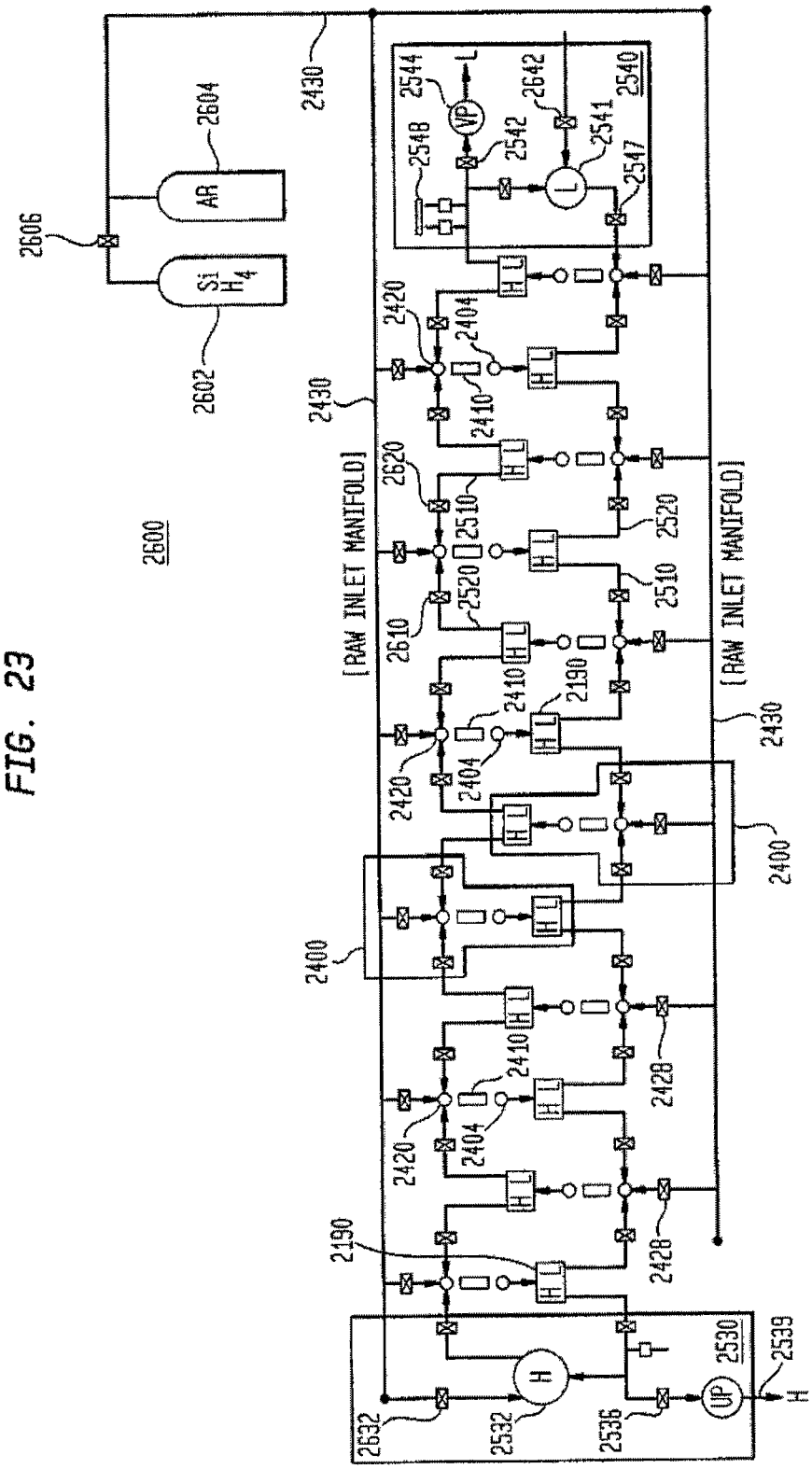
FIG. 23 is a detailed schematic depiction of a second embodiment of a twelve stage separation system.

Another embodiment of a multi-stage assembly is depicted in FIG. 23 and is referred to as an inlet manifold loop 2600. This embodiment also utilizes an embodiment of a stage 2400 in a repeating configuration to provide successive concentration of time through the cascade to separate and urge the migration, over time, of the gas species to the depleted gas collector 2540 and enriched gas collector 2530. While there are a number of minor differences between the inlet manifold loop 2600 and the source separation loop 2500 embodiments, these are apparent to one of ordinary skill in the art. The following description shall highlight some of the more significant variations between the two embodiments.

The inlet manifold loop 2600 uses a raw inlet manifold 2430 that is connected in parallel to each stage 2400, the depleted gas collector 2540, and the enriched gas collector 2530. The inlet manifold loop 2600 is supplied, in the embodiment depicted in FIG. 23, with a raw gas supply 2602 and a balance gas supply 2604. The balance gas supply 2604 provides a balance gas that enhances the separation performance of the inlet manifold loop 2600. A manifold regulator 2606 controls the relative ratios of raw gas to balance gas in the raw inlet manifold 2430 by controlling the flow from the raw gas supply 2602. In other alternative embodiments, a separate valve is used on both the raw gas supply 2602 and the balance gas supply 2604 to more precisely modulate the relative ratios of the raw gas and balance gas in the gas supply.

Since the inlet manifold 2430 is connected in parallel to each stage 2400, the depleted gas collector 2540, and the enriched gas collector 2530, it is possible to rapidly flood fill the inlet manifold loop 2600 with the raw gas to be separated by simultaneously opening all of the open valves between the inlet manifold 430 and the respective elements of the inlet manifold loop 2600. In this embodiment, a depleted gas collector inlet valve 2642 regulates the flow of gas into the depleted gas collection tank 2541. Similarly, an enriched gas collector inlet valve 2632 regulates the flow of raw gas into the enriched gas collection tank 2532.

In still another embodiment, the valves regulating the flow from the inlet manifold 2430 into the stages 2400, the depleted gas collector 2440, and the raw inlet manifold 2430 enable local depletion zones created by pressure asymmetries or due to the withdraw of gas from the system to be replaced while the system is operating.

11 Rotating Wall for Enhanced Separation

In yet another embodiment of a multi-stage assembly, the assembly incorporates a rotating wall to enhance centrifugal acceleration applied to the assembly and improve separation performance. In this embodiment, a multi-stage separation assembly, such as the source separation loop 2500, is mounted on a rotating platform. The orientation of the source separation loop 2500 is aligned such that the nozzle throat 108 of a Type-1 nozzle 100 is oriented along a radius between the center of the rotation of the rotating platform with the deflection wall 101 of the nozzle throat 108 further from the center of rotation. The rotation of the rotating platform imparts an additional angular momentum to the gas flowing through the Type-1 nozzle 100 thereby increasing the mass separation effects due to the applied forces from both a change the Type-1 nozzle 100 effects as well as the additional acceleration caused by the mechanical rotation of the system. In one embodiment the rotation of the rotor is above about 18,000 rotations per minute (rpm).

In another embodiment that utilizes a separation nozzle design that collects heavy constituents of the gas in the expansion diffuser 105, the separation nozzle is oriented such that the acceleration impacted by the rotor is used to further enhance the aerodynamic separation occurring in the nozzle.

12 Electronic Control System

One embodiment of the present system includes an electronic control system (not shown) that controls the operation of the individuals stages 2400 and the multi-stage assembly, such as the source separation loop 2500.

The electronic control system in several embodiments comprises a controller or processor, software and/or firmware for operating the electronic control system, inputs and outputs. The controller in various embodiments is implemented using a microprocessor, microcontroller, or central processor unit (CPU) chip and printed circuit board (PCB). In alternative embodiments, the controller is an application specific integrated circuit (ASIC), programmable logic controller (PLC), programmable logic device (PLD), digital signal processor (DSP), or the like. In addition, the electronic control system in other embodiments includes memory, whether dynamic memory or static memory such as erasable programmable read only memory (EPROM), electronically erasable programmable read only memory (EEPROM), flash or bubble memory, hard disk drive, tape drive or any combination of static memory and dynamic memory. In other embodiments, the electronic control system utilizes software, control algorithms, and operating parameters stored in the memory. In still other embodiments, such software is uploaded to the electronic control system electronically whereby the control software is refreshed or reprogrammed or specific operating parameters are updated to modify the algorithms and/or parameters used to control the operation of the separation system and ancillary components.

12.1.1 Sensor Data

The sensor data from any of all of these aforementioned sensors are, in one embodiment, provided to the user for monitoring the performance of the system. In another embodiment, the information is provided to the electronic control system via a digital interface between the sensor and the electronic control system. The digital interface in various embodiments is selected by those of ordinary skill in the art from options such as the following: Ethernet, CAN-bus (Car Area Network), TCP/IP, SCADA, serial (e.g. RS-232/RS-485), GPIB (General Purpose Instrumentation Bus), IEEE 1451.4 (Smart Transducer Interface Standard), IEEE 802.11 (x) (Wireless Ethernet), 802.15 (Bluetooth), USB, or IEEE-1394 (Firewire). In alternative embodiments the electronic control system samples the incoming analogue sensor data and performs an analogue to digital conversion (A/D) on the incoming sensor signal.

In one embodiment, the electronic control system performs only sampling and recording of sensor data for monitoring and reporting separation system performance.

12.2 Actuator Signals

In yet another embodiment, the electronic control system provides actuator signals to cause the various actuators, such as valves and compressors 2410 present on the stages 2400 or the multi-stage separation assembly, such as the source separation loop 2500, to operate or to adjust their operation. The actuator interface of the electronic control system in various embodiments is selected by of ordinary skill in the art from options such as the following: Ethernet, CAN-bus (Car Area Network), TCP/IP, SCADA, serial (e.g. RS-232/RS-485), GPIB (General Purpose Instrumentation Bus), IEEE 1451.4 (Smart Transducer Interface Standard), IEEE 802.11(x) (Wireless Ethernet), 802.15 (Bluetooth), USB, or IEEE-1394 (Firewire). In alternative embodiments, the electronic control system provides analogue commands via a digital to analogue converter (D/A) or transistor-transistor logic (TTL) signals to the actuators causing the actuators to respond to the command outputs from the electronic control system.

13 Gas Separation Process

Figure 20:
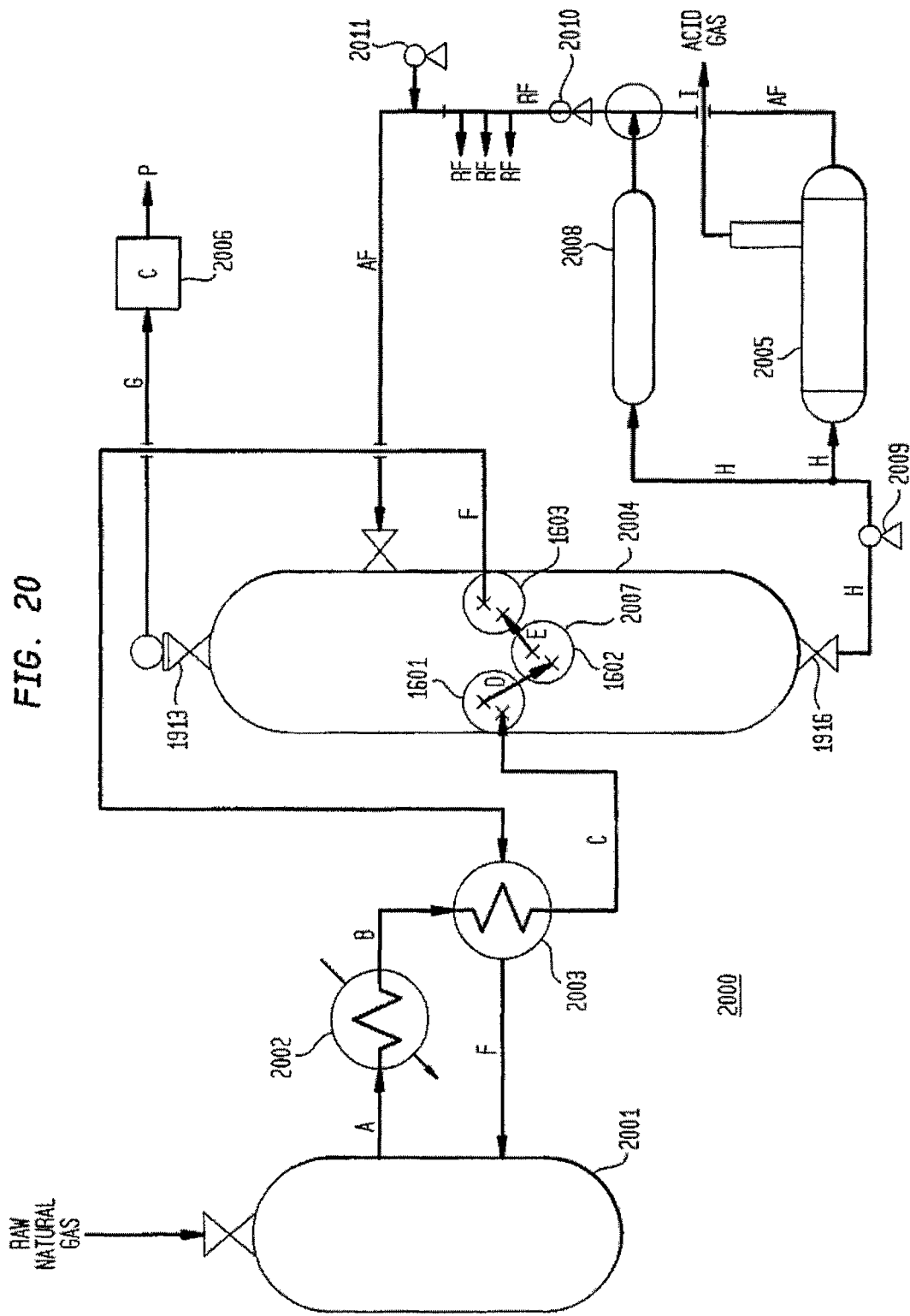
FIG. 20 is a basic process flow path for acid gas removal.

FIG. 20 is an embodiment of the basic process flow path for acid gas removal from a natural gas stream (i.e. process or process gas) using the embodiments disclosed herein. As can be seen in the flow circuit 2000, raw gas enters the process through a pressure vessel 2001, and flow from the pressure vessel is through line A, which is initially cooled, or pre-conditioned, by a water-cooled heat exchanger 2002 from a temperature of the prevailing production temperature to about 549° R and the gas is at pressure at 1050 psig. Gas leaving the water-cooled heat exchanger 2002 via line B enters a gas-gas heat exchanger 2003 where its temperature is reduced from about 549° R to about 509° R against a processed gas stream coming from the phase tube 2004 via line F, that is at about T=379° R.

Gas leaving the gas-gas exchanger 2003 via line C is the raw feed to the separator nozzle s that is mounted on the phase tube 2004. The raw feed via line C is at about T=509° R and about P=1050 psig and enters the feed reservoir of the first stage and divides into a heavy fraction entering the phase tube 2004, and a light fraction leaving the first stage via crossover pipe D. Crossover pipe D is the feed inlet for the second stage, which repeats the flow fractionation, with its heavy fraction entering the phase tube 2004, and its light fraction going via crossover pipe E to the feed inlet of the third stage of the separator nozzle cascade 2007. In the third stage of the separator nozzle cascade 2007, the process again repeats itself, with the light fraction leaving the separator nozzle cascade 2007 via line F, with the flow volume being at a reduced temperature and pressure, and the flow volume in Line F being approximately 10% of the original raw inlet flow entering the separator nozzle cascade 2007. As mentioned earlier, the gas flow in line F goes through the gas-gas heat exchanger 2003 to transfer heat from the inlet gas in line B, and once that is accomplished, the gas in line F enters the pressure vessel 2001 to remix with the original raw natural gas. An option for line F gas is to act as fuel for the processing plant, as it is largely a methane flow with a minor acid gas content.

The other gas path portion of the flow circuit, is the heavy fraction from the cascade that has entered the phase tube 2004. Since it is overall, the majority flow in the flow circuit 2000, the processing of the two phase flow in the phase tube 2004 largely purifies the non-condensable flow, and high concentrates the condensable flow from the original gas. For the gas end of the phase tube 2004, along with the condensed fraction of the inlet gas flow being flashed into the phase tube, 2004, a large fraction of the non-condensed gas acts as a carrier for the condensate, and is process under low-temperature conditions to further extract condensate within the phase tube. Gaseous fractions of the phase tube are removed from the phase tube 2004 by the process compressor 2006 suction side through line G. This flow via line G is a majority flow (about 63%) of the original gas flow, and has been purified to be the product flow. Going through the process compressor 2006, the gas flow in line G is brought up to transportation pressure and is ready for sale.

The other (lower end) of the phase tube 2004 provides the removal system of the acid gas (condensate) from the system, and circulates and/or regenerates the liquid refrigerant. The lower end of the phase tube is drawn down of its liquid content in a metered fashion by pump 2009 via line H. The extraction rate of pump 2009 is to allow liquid holdup in the phase tube to be in a range of from 3-5 minutes, allowing the liquid mixture to equalize in its temperature. Pump 2009 further splits line H so that a fraction of the flow goes through a heated accumulator 2005, and the other fraction of the flow into pressure vessel 2008. The heated accumulator 2005 is heated by a variable resistive tank heater, and through this device, condensed gases (carbon dioxide, hydrogen sulfides) rise in the riser stack of the accumulator to be released via line I for sequester or containment. The degassed liquid refrigerant from the accumulator leaves via line AF by pump 2011 to return to the phase tube 2004 as a regenerated liquid. The liquid refrigerant from pressure vessel 2008 is pumped by pump 2010 via lines RF to serve as the liquid refrigerant for the nozzle cascade, and eventually will circulate to the heated accumulator 2005 to be degasified and recycled. It might be noted that the acid gas extraction from the heated accumulator 2005 will be a majority of the acid gas content in the post-phase tube process, with the flow leaving the accumulator at a rate of about 18-22% of the original raw gas flow.

14 Operation of Separation Device

The gas separation device and method disclosed herein utilized an aerodynamic separation method. The gas separation device and method is developed to; purify a gas, or separate condensable gases from a multi-component gas mixture that are generated for commercial use. An application of interest for this gas separation device and method is for the removal of acid gases from natural gas. Conventional natural gas production has methane as the major gas mixture constituent, and natural gas may additionally contain water, carbon dioxide, sulfur-containing gases, and heavier hydrocarbons. Some of these components in natural gas may freeze in processing, causing plugging problems in the process system equipment. Sulfur compounds are typically removed to meet gas sale specifications. To accomplish the purification of natural gas for sale, conventional gas processing refineries require acid gas removal units that will separate carbon dioxide and sulfur gas from the hydrocarbon flow. Typical acid gas removal (AGR) unit processes use chemical and/or physical solvent regenerative processes, and these technologies often require significant capital investment and high operating expenses. There is a need in the natural gas industry for an improved method and device for the removal of acid gases, and at the same time having power requirements that are small, and limit the amount of pollutants emitted to the air.

Even with current high prices, the exploration and development of future natural gas reservoirs is continuing, with the demand for natural gas exceeding the supply. As a result, it is becoming a fact that less-pure natural gas resources will need to be processed and delivered. For an example of an embodiment of the gas separation device and method being used for acid gas removal for natural gas, the Gwillim natural gas reservoir in Canada may be used as the raw source:

TABLE 1

| Gas Characteristics of Gwillim Reserve | | | |
|---|---|---|---|
| Estimated CH4 resource: | | Approximately 1 TCF | |
| Reservoir pressure: | | 4500 psig | |
| Reservoir temperature: | | 662° R | |
| Gas composition | mol. % | molecular weight | boiling point ° R |
| Methane | 58.3 | 16.0425 | 200 |
| H2S | 24.5 | 34.082 | 383 |
| CO2 | 16.8 | 44.0095 | 351 |
| Ethane, Propane | .08 | 30.07/44.096 | 332/416 |
| N2 | .3 | 28.014 | 113 |

For this example of acid gas removal, the gas separation device and method is configured in its preferred embodiment, where three separate separation stages are series-connected for the raw source inlet, and parallel-connected for the refrigerated phase separation stage, with all three stages integrated to a single phase tube. FIG. 16 is a schematic depiction of the example dynamic cascade for the acid gas removal from natural gas.

As can be seen in FIG. 16 and for this example, the natural gas having the characteristics displayed in the previous table for the Gwillim field, is at a high reservoir pressure and elevated temperature. For this example, a slip-stream of the produced gas is taken where the inlet pressure before the separation is about 1050 psig and the produced temperature is about 564° R, and the gas can either have a water vapor content or be previously dried. To simplify the separation stream description, for this example all condensable fractions will be concentrated, and all non-condensable fractions at the operating pressures will remain gaseous. In working with the condensable fraction, it is preferable for this embodiment of the separation cascade to have a non-freezing liquid diluent acting as an anti-freeze component and as the refrigerant liquid for the separation nozzles. In this case, ethanol alcohol has been chosen due to its high boiling point and its freezing point being lower than the operating conditions of the gas separation device and method separation process. Conditions for commercial use may dictate using a closed-cycle refrigeration circuit for cooling the nozzles, and any other antifreeze liquid that exhibits similar attributes compared to ethanol.

For this example application, the separator nozzles are constructed to have a 5.0" radius of curvature, which indicates that the separator nozzle plate would be a 13.0" diameter. It can also be noted that the separation cascade has three series connected stages for gaseous transport, and three parallel connected condensate (heavy) inlets to the phase tube, and that the three successive nozzle plates taper or reduce in thickness so that the series connection is designed to be a tapering cascade in terms of volume and of pressure. Further, the light species outlets are connected in series from separation nozzle stage to separation nozzle stage for light species transport and separation. In addition on the parallel connected phase tube, the phase tube is fitted with a primary demisting mat, followed by a bank of swirl-generator tubes, that are followed by a secondary demisting mat. Demisting mats (both primary and secondary), and the swirl generator tube bank have condensate drains that empty to the bottom of the phase tube into the condensate/antifreeze holdup, and have vertical vapor paths leading to the upper head-space of the phase tube.

Further operating parameters for the separation cascade is that the vapor outlet is controlled by a vacuum regulator valve that maintains the phase tube at an operating pressure P°, and the operating temperature T°=382, which is the saturated liquid temperature at the bottom of the phase tube. The liquid content is a combined ethanol-condensate mixture, and the ordinary hold-up time for the liquid is in a range of from 3-5 minutes. Further, the liquid is withdrawn through the bottom of the phase tube by a variable pump, that injects the pressurized fluid through a flash vessel to separate condensed gas content for collection, and further circulates the liquid from the flash vessel to be used as an antifreeze at mid-phase tube, and as a liquid refrigerant for the nozzle stages. In its operation overall, the phase tube is operating in an autorefrigeration state, and the refrigerant supplied to the nozzle stages can be conceived as being a closed-cycle refrigeration process. With this explained, the description of the separation process continues.

The primary condensable gas fractions at the operation temperature in the example are carbon dioxide, hydrogen sulfide, and ethane and propane. These components of the gas have a distinct higher-boiling point when compared to the methane product that is the desirable product stream. In this processing step, it has been determined that the separation cascade will be three separating nozzle stages, and a single phase tube. This configuration allows that the separation can be accomplished with fractional condensation steps, so that the source pressure of 1050 psig is able to run the process, of course, higher pressure levels can be used to the benefit of the gas separation device and method, with higher stagnation pressure, each successive separation stage will produce a larger volume of flow throughput, based upon known supersonic flow calculations. As known to those of ordinary skill in the art, the present system and method using one or more separation nozzles to separation gas species from a process gas is readily adaptable to a wide range of process gas states (i.e. pressure and temperature,) and process gas characteristics.

The separation process disclosed herein does use, in one embodiment, an initial startup stage is performed, so that materials within the nozzles and the phase tube have time to come into equilibrium, and that thermal stresses on the materials are minimized. It has been found that figuring for a 2° R/minute transition from ambient conditions is the minimum allowable run-in time, so that in most applications, the run-in time would be in a range of from 1-3 hours to bring the nozzles to their approximate 434° R average temperature, and the phase tube to its approximate 382° R average liquid temperature, with allowance being made for heat transfer between ambient and gas condition and the system components. For the startup time, the separation cascade has a by-pass circuit that recycles the process streams back to the inlet to the cascade, which can be stopped when the cascade nears its overall operation conditions.

With the startup operation completed, and referring to FIG. 20 as a process map, the processing of the Gwillen example begins. The cascade separator nozzles have been brought to their process temperature of 434° R, and the gas entering the pressure vessel 2001 is at 1050 psig and 559° R at a flow rate of 704.496 lb/min via line A at the original gas specifications as seen in the Table-Gwillen. Line A enters a water-cooled heat exchanger, common in the industry, to reduce the temperature of the gas from 549° R, and gas leaves the heat exchanger via line B at 1050 psig at T=509° R. Line B subsequently further reduces the gas temperature through gas-gas heat exchanger 2003 against line F where T=379° R, leaving the gas flowing via line C at T=489° R, ready to enter the separator nozzle cascade 2007 at 1050 psig and the original specification for the gas in-place.

As mentioned, the separator nozzle cascade 2007 has been maintained at T=434° R by circulation of liquid refrigerant that is at T=382° R via lines RF. In this embodiment, the gas entering the system reduced in temperature from its origination, but not reduced to an extent where it is required to run the gas-gas heat exchanger 2003 to a level that reduces the gas itself to say, 434°, is that it does not require a high level of heat exchange to occur in the heat exchanger 2003. In the separator nozzle process disclosed herein, the gas thermal effect of expanding the gas produces a high degree of cooling and is combined with the refrigerant step to further transfer heat solely based upon the expansion step of pressure transition. The following Table (process flow), details the flow conditions at any one step in the process:

TABLE 2

| | Process Flow | | | | | | | | | |
|---|---|---|---|---|---|---|---|---|---|---|
| | L-A | L-B | L-C | L-D | L-E | L-F | L-G | L-H | 1-H | 2-H | 3-H |
| Flow/rate Lb/minute | 704.5 | 704.5 | 704.5 | 331.1 | 155.6 | 72.2 | 444.7 | 202.4 | 373.4 | 175.5 | 83.4 |
| P° | 1050 | 1050 | 1050 | 752 | 551 | 396 | 200 | n/a | 397 | 290 | 209 |
| T° R | 549 | 509 | 489 | 430 | 421 | 379 | 382 | 382 | 387 | 379 | 341 |
| Gas Characteristics: non-condensable %/condensable % | 58.6/41.4 | 58.6/41.4 | 58.6/41.4 | 78/22 | 91.9/8.1 | 96.9/3.1 | 99.3/0.7 | n/a | 28/72 | 52.1/47.9 | 80.1/19.9 |

For most applications of this gas separation device and method, the various embodiments have been developed to minimize power consumption, and yet yield saleable gas of high purity. Since the method uses a recycling liquid refrigerant to concentrate the condensable fraction and to control the temperature of the process through the auto-refrigeration aspect of the phase tube, cooling energy is reduced. The energy expenditure for running the process involves using the separation gas stagnation pressure as the motive drive. In this regard, the improved pressure recovery amongst three stages of separation can be exemplified by the production of high purity product gas at pressure. Minimizing the known expenses generally seen in cryogenic separation may compensate the expense of bringing the gas back to its original pressure.

In yet another embodiment, the light fraction (L) of natural gas, if cleansed to the appropriate level by one nozzle pass or a series cascade consisting of the lights (L) fraction from each previous separation nozzle under ambient conditions is diverted directly into the natural gas distribution pipe line. The heavy (H) fraction resulting from this first separation process, containing incompletely processed natural gas is then re-circulated in one aspect in the original cascade (i.e. mixed with new incoming gas) for further cleansing. In another aspect, the heavy (H) fraction is circulated in a second separation array that is adapted to achieve greater separation of the heavy (H) fraction. In another embodiment leveraging the foregoing the user optionally diverts the incompletely processed heavy fraction (H) to conventional acid gas removal (AGR) systems for treatment. In still another embodiment the heavy fraction (H) is tailored by operation of the separation nozzle such that the heavy fraction (H) is within the range of contaminates suitable for treatment by an AGR system, such as no more than 10% to 20% acid. In most commercial operations, the practical limits of the heavy fraction (H) suitable for treatment by an AGR system is no more than about 10% acid. In another embodiment the heavy fraction (H) is re-injected into the gas reservoir. In this embodiments, the initial clean light fraction (L) of natural gas, although only comprising a portion of the total flow, substantially lessens the total cost of treatment by AGR methods due by reducing the total volume of gas passing the AGR system.

15 System Operation

In one embodiment of the separation nozzle adapted for use in a multi-stage separation system enabling the concentration of constituent gases to a high degree of purity. A multi-stage separation nozzle assembly, such as the inlet manifold loop 2600 or the source separation loop 2500, has multiple logical operational phases, procedures or operating modes in normal operation.

15.1 Startup Procedure

For an arbitrary embodiment of a multi-stage separation system, such as the inlet manifold loop 2600, all of the stages 2400, the enriched gas collector 2530, and the depleted gas collector 2540 are filled with the raw gas to be separated with all valves opened to allow the raw gas to spread throughout the system. In one embodiment, the system is purged with the gas to be separated from the inlet to one or both the depleted gas outlet 2544 and the enriched gas outlet 2539 or various test ports, such as the enriched gas test ports 2538 or the depleted test ports 2548, until it is determined the entire inlet manifold loop 2600 assembly is filled with the raw gas to be separated.

In the case of embodiments where atmospheric gases have a deleterious effect, including applications involving silane whereby exposure to oxygen in the ambient environment would likely trigger a somewhat destructive event, the separation system, such as the inlet manifold loop 2600, is first purged with an inert gas or balance gas. In the case of the embodiment of the inlet manifold loop 2600 adapted for the separation of silane, Argon (Ar) is used as both a balance gas and as a purge gas to ensure all traces of oxygen and other ambient gases are removed from the system prior to introducing the raw gas to be separated. The purging process in one embodiment uses a time and volume approach to verify that the purge gas has passed through the entire system. In one embodiment of this method, sensor information from the mass flow rate sensors located in the stages 2400 are used to provide feedback to the electronic control unit to verify that sufficient volume of purge gas has passed through a stage 2400 to purge the stage 2400. In another embodiment, measurements of the gas properties are taken at the test ports, such as the depleted test ports 2548 or the enriched gas test ports 2538, and measured using sensors to determine the prevalence of the purge gas, such as a mass spectrograph.

In one embodiment adapted to the separation of silane isotopes, after the purge is completed, it is possible to verify the purging.

15.2 Batch Process Operation

After the system has gone through its initial start up and operation over time processes the gas to be separated through the source separation loop 2500, the system will reach a near steady state condition whereby the enriched gas collector 2530 and the depleted gas collector 2540 exceed the desired purity of the separated gas species. For example, in the case of silane, a target depleted gas purity level might be greater than 99.99% Si-28 silane.

Once the system reaches this point, it is possible to retrieve the separated gas from either or both the depleted gas collector 2540 and enriched gas collector 2530, depending on the application. When operating the system in a batch process mode, the embodiments of the system, such as the inlet manifold loop 2600 and the source separation loop 2500, are shut down and the depleted gas is removed from the depleted gas collection tank 2541 via the depleted gas outlet valve 2542. In another alternative embodiment of the system, either or both the depleted gas collection tank 2541 or the enriched gas collection tank 2532 are temporarily by-passed using bypass valves to temporarily remove them from the source separation loop 2500, thereby allowing the tanks 2541, 2532 to be drawn down independently from the remainder of the system.

15.3 Quasi-Steady State Operation

In another operational mode, the separated gas is removed from the source separation loop 2500, when the separated gas collected in either or both the depleted gas collection tank 2541 or the enriched gas collection tank 2532 reach the desired purity levels. For example for some applications of silane, when sampling of the separated gas from the depleted gas test ports 2548 indicate that the depleted gas collection tank 2541 has reaches a stable isotope separation level greater than the desired amount, such as great than 99.99% Si-28 silane, the depleted silane is drawn off via the depleted gas outlet 2544. A mass flow measurement sensor measures the amount of depleted silane removed via the depleted gas outlet 2544. This information is used by the electronic control system to introduce more raw gas to be separated into the source separation loop 2500 via the raw gas inlet 2426 to the module from the raw, unprocessed gas supply, i.e. the process gas inlet 2502. The inlet mass flow sensor 2418 is used by the electronic control system to match up the amount of replacement raw gas introduced into the source separation loop 2500 to balance the depleted gas removed from the depleted gas outlet 2544. In this manner, the total mass of silane in the system is maintained. During the draw-off process, the depleted gas test ports 2538 are used to continue pulling small quantities of the separated gas for measurement with the mass spectrograph. When the purity of the measurement drops below the threshold value, then the draw off the depleted gas will stop, the depleted gas outlet 2544 will be closed, and if the mass balance has been matched, the raw gas inlet valve 2426 also will close. After these valves are closed, the system will continue operating until once the desired separation ratios are achieved and the draw off occurs again.

In one embodiment, the separation process for the process gas starts with filling the separation cascade. After operating the cascade for a period of time, the system will begin to approach steady state, and the desired purity is obtained for the desired gas (Si-28 in the embodiment described above) is draw down 'desired gas' (Si-28) while adding raw gas; (3) close desired gas outlet; (4) draw down undesired gas while adding raw gas; (5) operate as normal until ratios reach desired levels again? In another embodiment, a first draw down of the desirable gas is performed, then run until separation ratios reach the desired levels we want again and draw down the undesirable gas as part of the next iteration.

15.4 Emergency Stop

In one embodiment of the system, if an emergency situation is detected, such as a sudden failure of one of the stages 2400, or rupture of an H stream connection or an L stream connection, the electronic control system commands all of the valves in the system to immediately close. In this manner, the amount of process gas that would escape from the system is minimized and an operator may trouble shoot the system independently. By immediately stopping the system in this manner, it is possible to reduce the risk of external contamination. Once the failed component(s) is fixed, the system may be restarted with no significant loss of separated product. Thus, the emergency stop procedure effectively freezes the separation process at whatever stage the process is currently at, thereby allowing the system to restart in nearly the same configuration as when it was stopped with no need to separate previously separated gas species.

16 Industrial Applications

The present separation nozzle and system and method disclosed herein possesses a number of unique attributes and industrial applicability as further detailed herein beyond those that are presented in greater detail above.

16.1 Silane Isotopic Separation

Silane ($SiH_4$) is a pyrophoric chemical compound that decomposes into silicon and hydrogen. The decomposition process makes Silane particularly useful for the chemical vapor deposition (CVD) of silicon on substrates. For microelectronics, the use of CVD to deposit fine layers of high purity silicon is critical for the fabrication of high performance semi-conductor microelectronics. Silicon is naturally found in three primary stable isotopes, Si-28 (about 92.2%), Si-29 (about 4.7%) and Si-30 (about 3.1%). Most traditional CVD processes for depositing silicon use Silane to deposit all isotopes to form a poly-isotope silicon layer. Recent research has demonstrated that deposition of isotopically-enriched or nearly isotopically-pure silicon enables higher performance, and greater stability micro-electronics. Specifically a single crystal silicon fabricated from isotopically enriched silicon displays a number of beneficial properties, including enhanced carrier mobility and improved thermal conductivity that renders it useful for a variety of different applications.

16.1.1 Other Isotopically Enriched Semiconductor Materials

In additional to silicon, other isotopically-enriched materials suitable for use in semiconductor fabrication include:

Germanium (Ge)

Germanium-Silicide (Ge—Si)

Gallium-Arsenide (Ga—As)

Other combinations and single elements as known to those of ordinary skill in the art of semiconductor fabrication show unique properties when isotopically-enriched materials are deposited to form the substrate structures.

16.1.2 Isotope Enrichment

In addition to the separation of semiconductor materials, other isotopes that are suitable for separation using the present system and method include isotopes of oxygen, carbon, nitrogen, and helium.

16.1.3 Structure Adapted to Gas Species

The physical structure of the separation nozzle designs are adapted to the specification of the gas, and more specifically the process gas, and in some circumstances the separation and balance gases in specific proportions to each other. This prevents the use of a separation system, such as a first embodiment of a separation loop 500, from achieving comparable separation efficient (if at all) without relying upon the designed process gas, and if applicable the same desired balance gas. In addition to the uses of the described system and method for treating natural gas, the present system and method are also suitable to remove acid gas from natural gas and syngas as well as purification of hydrogen produced using industrial cracking processes.

17 Conclusion

While various embodiments of the present system and method for measuring aerodynamic separation and concentration of the constituents of a gas have been described above, it should be understood that the embodiments have been presented by the way of example only, and not limitation. It will be understood by those skilled in the art that various changes in form and details may be made therein without departing from the spirit and scope of the invention as defined. Thus, the breadth and scope of the present invention should not be limited by any of the above described exemplary embodiments.

What is claimed is:

1. A device for separating constituents of a flow comprising:
   an inlet adapted to receive the flow;
   a throat fluidicly coupled to said inlet and adapted to receive the flow from the inlet;
   a skimmer fluidicly coupled to said throat via a separation flow path and adapted to separate the flow into a first stream and a second stream; and
   a curved expansion nozzle disposed within at least a portion of said separation flow path,
   wherein said separation flow path extends from said throat through said curved expansion nozzle along a gradually tapering over expansion zone to said skimmer and defines a geometric expansion ratio between about 1.5 to about 4.5.

2. The device of claim 1, further comprising:
   a nucleate pre-conditioning segment upstream of said curved expansion nozzle.

3. The device of claim 2, wherein said nucleate pre-conditioning segment comprises:
   a nucleate heat exchanger adapted to cool the flow having an unconditioned process gas inlet and an inner surface; and
   a nucleate pre-conditioning expansion adapted to partially condense the flow.

4. The device of claim 3, wherein said nucleate pre-conditioning expansion is a choke valve.

5. The device of claim 3, wherein said nucleate heat exchanger includes a means for inducing a swirl motion in the flow.

6. The device of claim 5, wherein said swirl inducing means comprises said unconditioned process gas inlet oriented relative to the inner surface of the nucleate heat exchanger such that the flow is injected in a direction substantially tangential to said inner surface.

7. The device of claim 5, wherein said swirl inducing means comprises a swirl generation aerostructure.

8. The device of claim 5, wherein said swirl inducing means comprises a rotating element that imparts a rotational velocity vector to the flow.

9. The device of claim 2, wherein said nucleate pre-conditioning segment comprises:
   a temperature controller adapted to regulate a heater.

10. The device of claim 2, wherein said nucleate pre-conditioning segment comprises:
    a temperature controller adapted to regulate a flow of coolant.

11. A device for separating constituents of a flow comprising:
    an inlet adapted to receive the flow;
    a throat fluidicly coupled to said inlet and adapted to receive the flow from the inlet;
    a skimmer fluidicly coupled to said throat via a separation flow path and adapted to separate the flow into a first stream and a second stream;
    a curved expansion nozzle disposed within at least a portion of said separation flow path,
    a nucleate pre-conditioning segment upstream of said curved expansion nozzle, and
    wherein said separation flow path extends from said throat through said curved expansion nozzle along an abrupt over expansion zone to said skimmer.

12. A method for separating constituents of a flow, comprising:
    receiving the flow through an inlet;
    generating nucleates within the flow in a nucleate pre-conditioning segment;
    inputting the flow into a curved expansion nozzle at a throat;
    passing the flow along a separation flow path between said throat, a nozzle exit, and a skimmer;
    expanding and accelerating the flow [0095] along said flow path;
    passing the flow past said nozzle exit;
    overexpanding the flow along said separation flow path; and
    separating the flow into a first stream and a second stream by said skimmer.

13. The method of claim 12, wherein said nucleate pre-conditioning segment comprises:
    a nucleate heat exchanger adapted to cool the flow having an unconditioned process gas inlet and an inner surface; and
    a nucleate pre-conditioning expansion adapted to partially condense the flow.

14. The method of claim 13, wherein said nucleate pre-conditioning expansion is a choke valve.

15. The method of claim 13, wherein said nucleate heat exchanger includes a means for inducing a swirl motion in the flow.

16. The method of claim 15, wherein said swirl inducing means comprises said unconditioned process gas inlet oriented relative to the inner surface of the nucleate heat exchanger such that the flow is injected in a direction substantially tangential to said inner surface.

17. The method of claim 15, wherein said swirl inducing means comprises a swirl generation aerostructure.

18. The method of claim 15, wherein said swirl inducing means comprises a rotating element that imparts a rotational velocity vector to the flow.

19. The method of claim 12, wherein said nucleate pre-conditioning segment comprises:
    a temperature controller adapted to regulate a heater.

20. The method of claim 12, wherein said nucleate pre-conditioning segment comprises:
    a temperature controller adapted to regulate a flow of coolant.

* * * * *